(12) United States Patent
Miller et al.

(10) Patent No.: US 9,839,859 B2
(45) Date of Patent: Dec. 12, 2017

(54) THROW-AND-CATCH BASED TOY WITH FREE FALL SENSING, IMPACT SENSING, AND SPEAKER OUTPUT

(71) Applicant: SKWRL Design, Inc, Woodside, CA (US)

(72) Inventors: John Hunter Miller, Woodside, CA (US); Brenden Taylor McMorrow, Woodside, CA (US)

(73) Assignee: SKWRL Design Inc., Newport Beach, CA (US)

( * ) Notice: Subject to any disclaimer, the term of this patent is extended or adjusted under 35 U.S.C. 154(b) by 0 days.

(21) Appl. No.: 15/258,935

(22) Filed: Sep. 7, 2016

(65) Prior Publication Data

US 2017/0065898 A1    Mar. 9, 2017

Related U.S. Application Data

(60) Provisional application No. 62/215,680, filed on Sep. 8, 2015.

(51) Int. Cl.
| | |
|---|---|
| *A63H 3/00* | (2006.01) |
| *A63H 5/00* | (2006.01) |
| *H04W 4/00* | (2009.01) |
| *H04L 29/06* | (2006.01) |
| *A63B 67/00* | (2006.01) |
| *A63H 33/18* | (2006.01) |

(52) U.S. Cl.
CPC ............ *A63H 5/00* (2013.01); *A63B 67/002* (2013.01); *A63H 33/18* (2013.01); *H04L 67/42* (2013.01); *H04W 4/008* (2013.01); *A63H 2200/00* (2013.01)

(58) Field of Classification Search
None
See application file for complete search history.

(56) References Cited

U.S. PATENT DOCUMENTS

| | | | | |
|---|---|---|---|---|
| 6,150,947 | A  * | 11/2000 | Shima ..................... | A63H 5/00 340/692 |
| 9,370,727 | B2 * | 6/2016 | Deluz .................... | A63H 33/26 |
| 2006/0189386 | A1 * | 8/2006 | Rosenberg .............. | A63F 13/12 463/37 |
| 2007/0178967 | A1 * | 8/2007 | Rosenberg ......... | A63B 24/0087 463/39 |
| 2011/0250819 | A1 * | 10/2011 | Tashman ................ | A63H 33/18 446/46 |
| 2012/0244969 | A1 * | 9/2012 | Binder ................... | A63H 33/18 473/570 |
| 2013/0225037 | A1 * | 8/2013 | Deluz .................... | A63H 33/26 446/242 |
| 2013/0303314 | A1 * | 11/2013 | Tackett .................. | A63B 67/06 473/571 |
| 2014/0290360 | A1 * | 10/2014 | Binder ................... | A63H 33/18 73/493 |

* cited by examiner

*Primary Examiner* — Jay Liddle
*Assistant Examiner* — Alex F. R. P. Rada, II
(74) *Attorney, Agent, or Firm* — Peter Tormey; Antero & Tormey, PC

(57) ABSTRACT

A throw-and-catch based toy with free fall sensing, impact sensing, and speaker output which includes a system, method and device for detecting a pre-determined motion from an accelerometer, comparing a sensed accelerometer information to a pre-determined accelerometer signature information, producing a sound based on the comparison of sensed accelerometer information to a pre-determined accelerometer signature information.

14 Claims, 46 Drawing Sheets

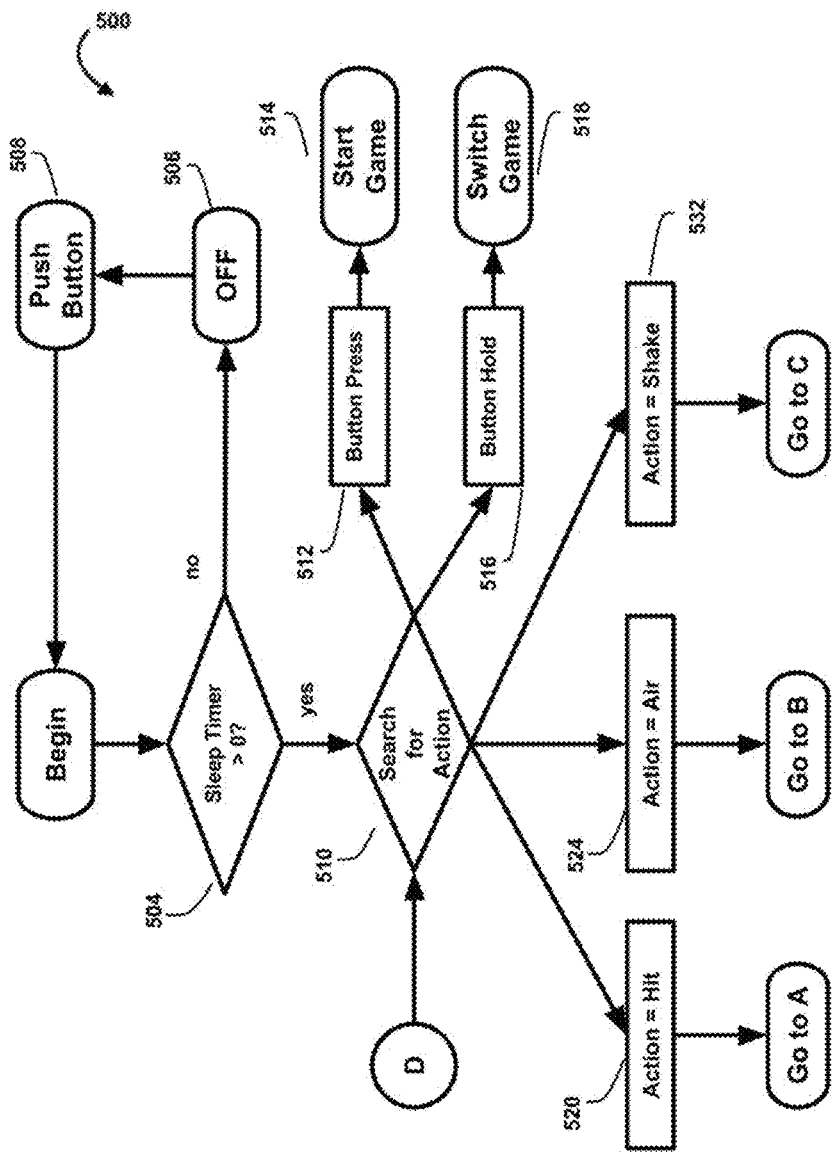

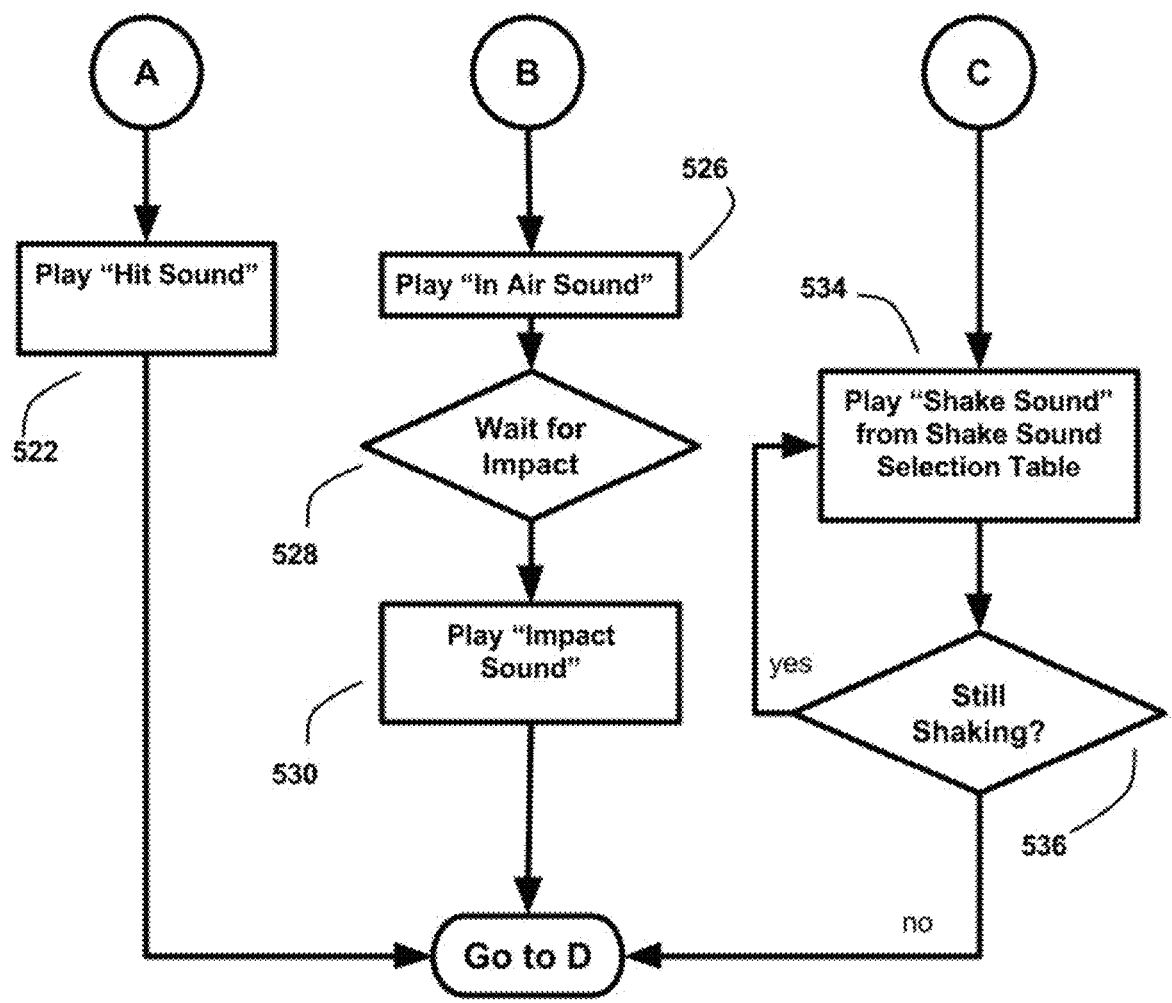

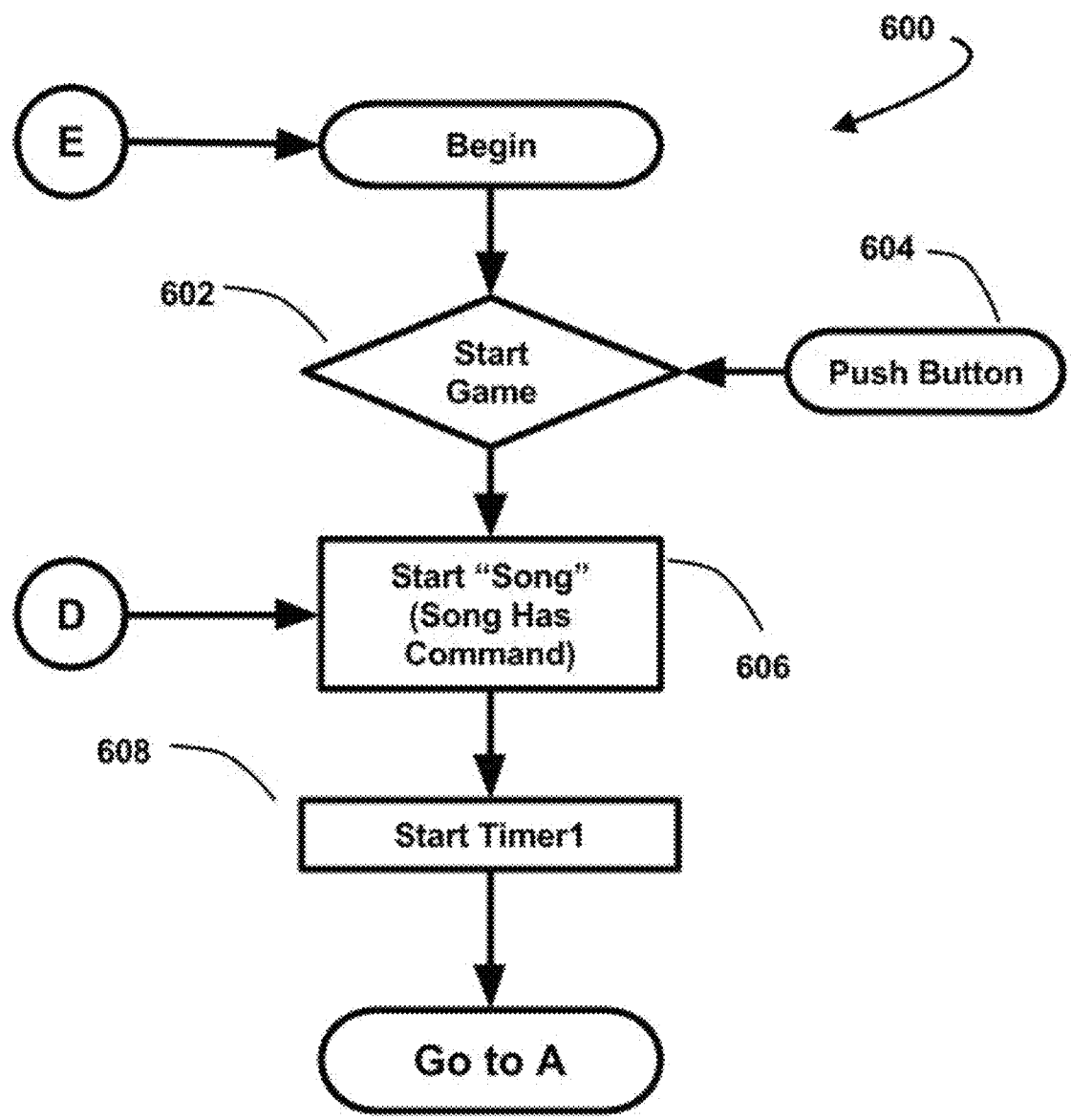

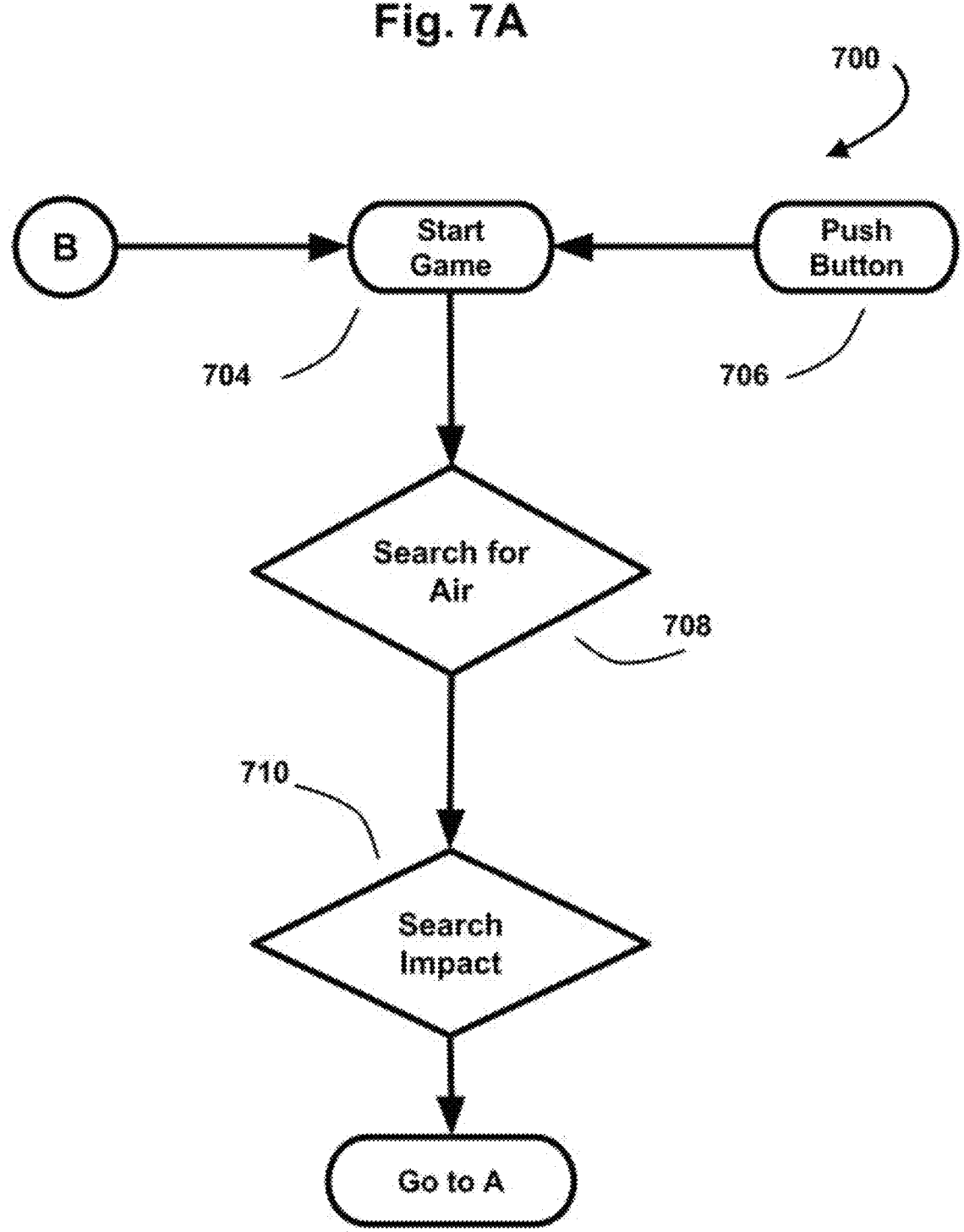

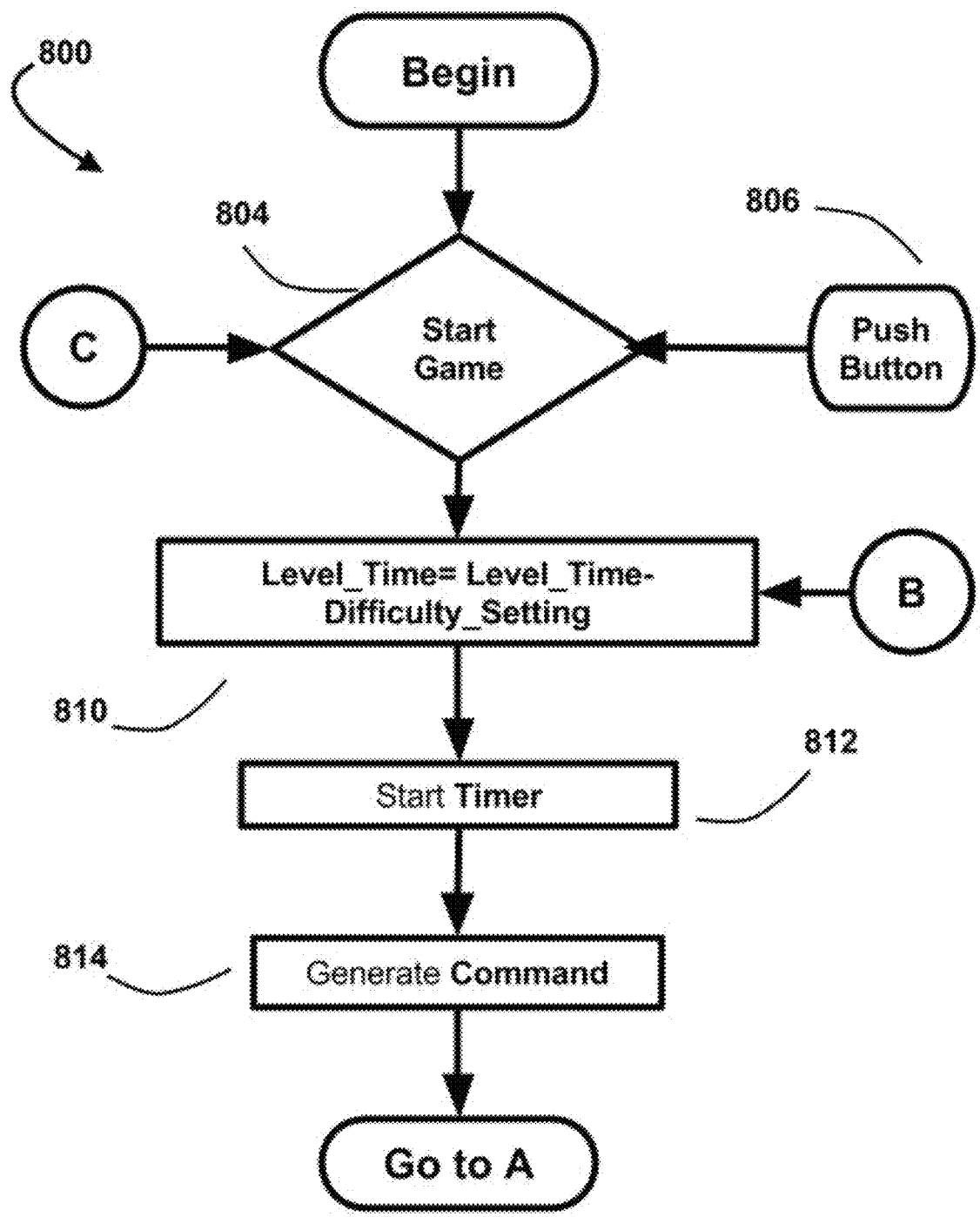

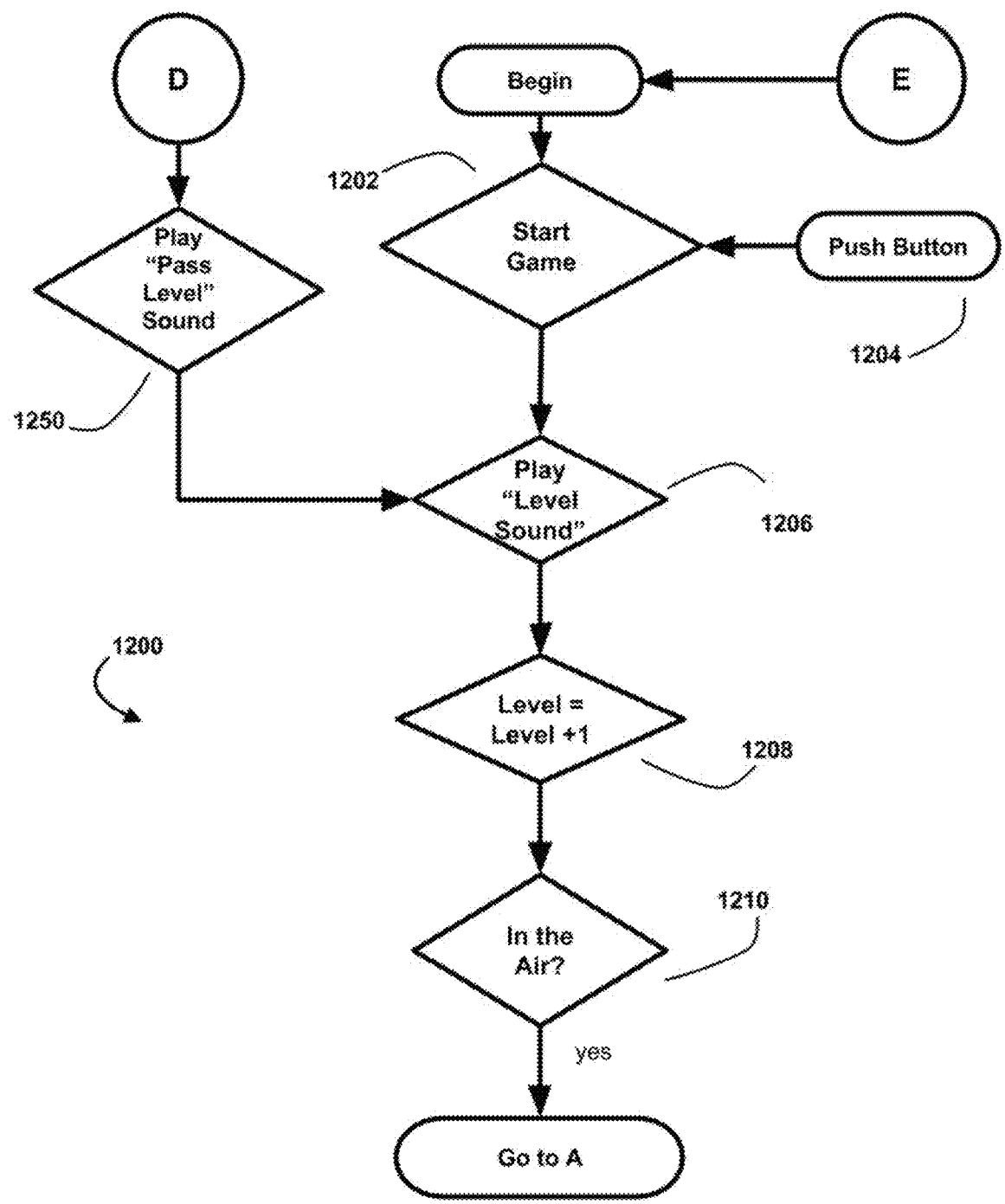

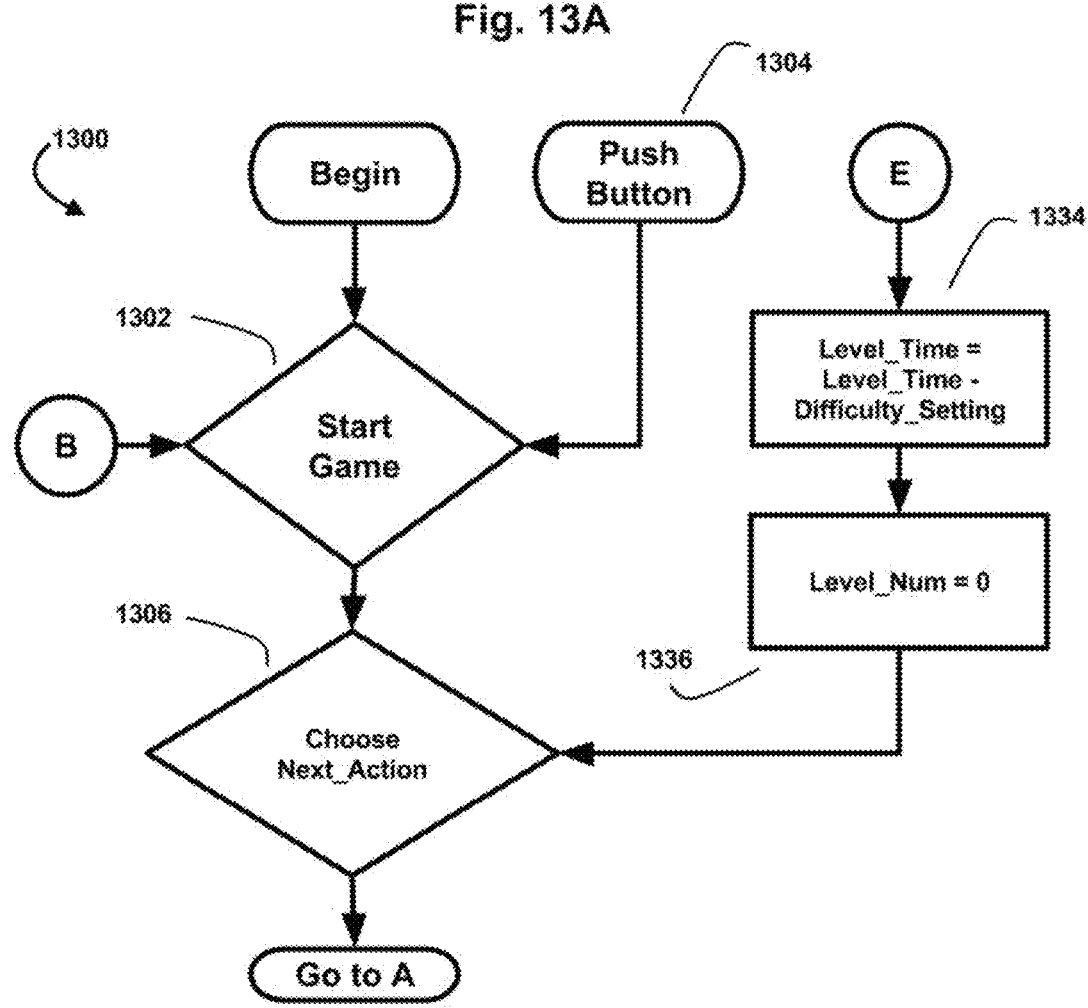

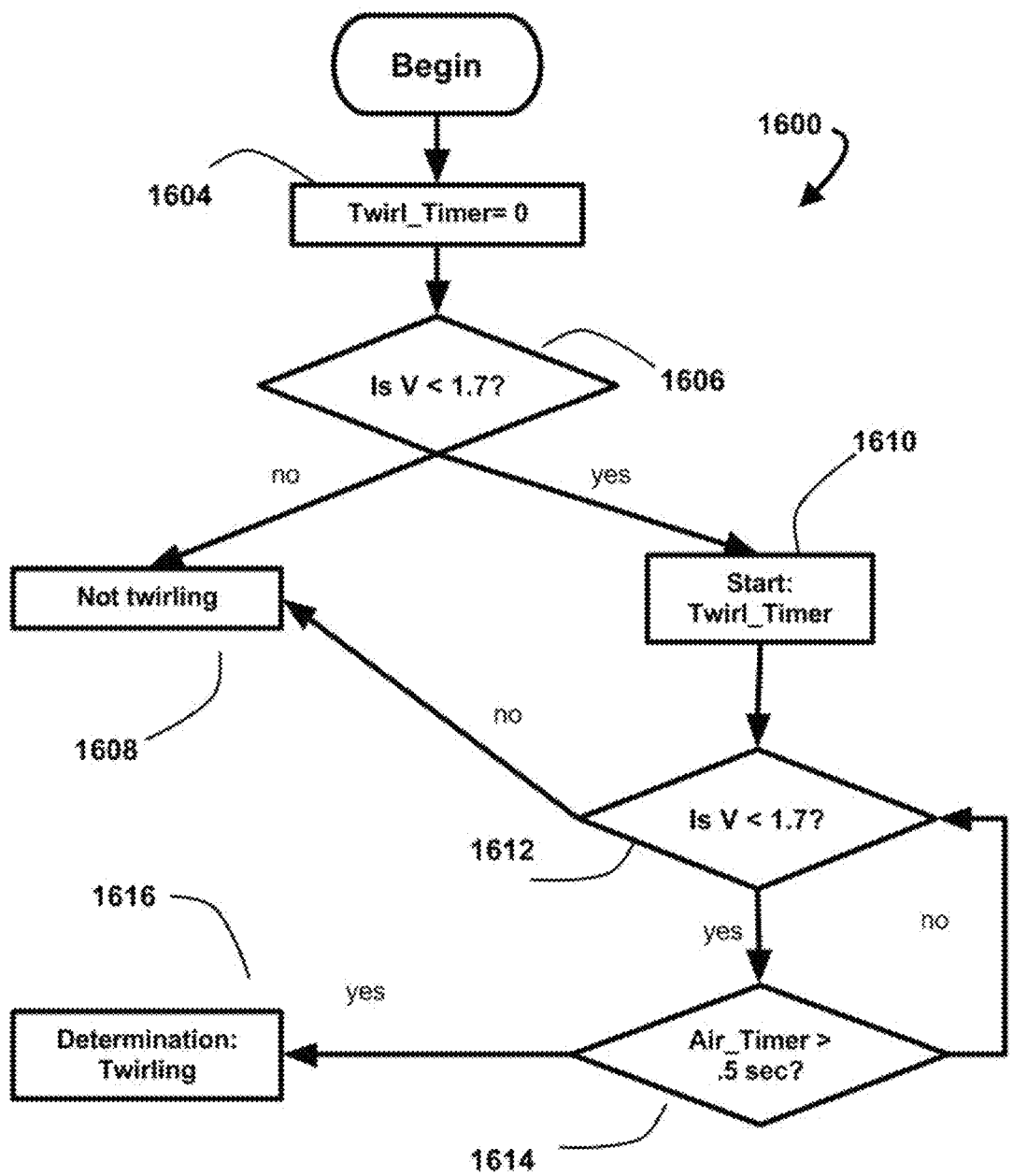

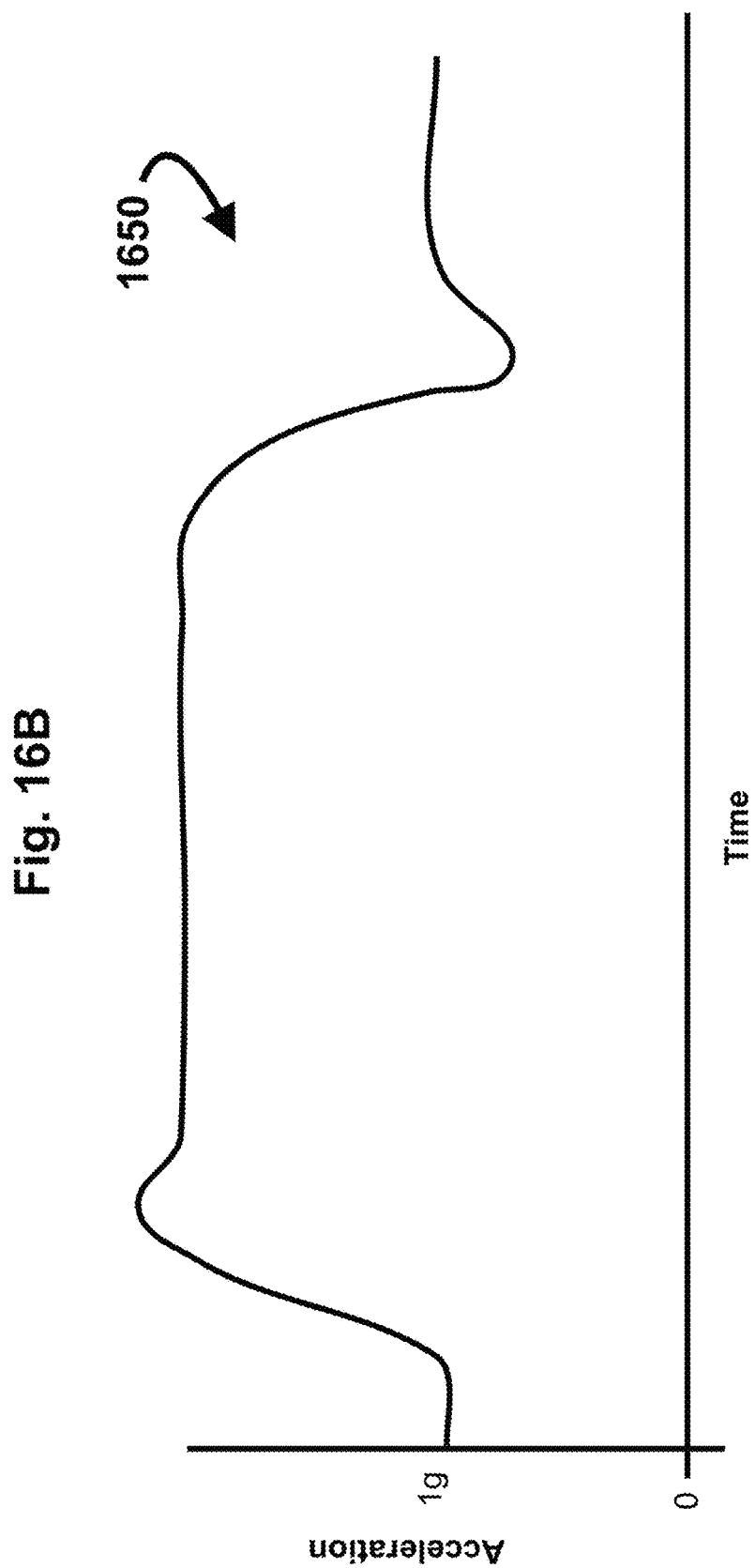

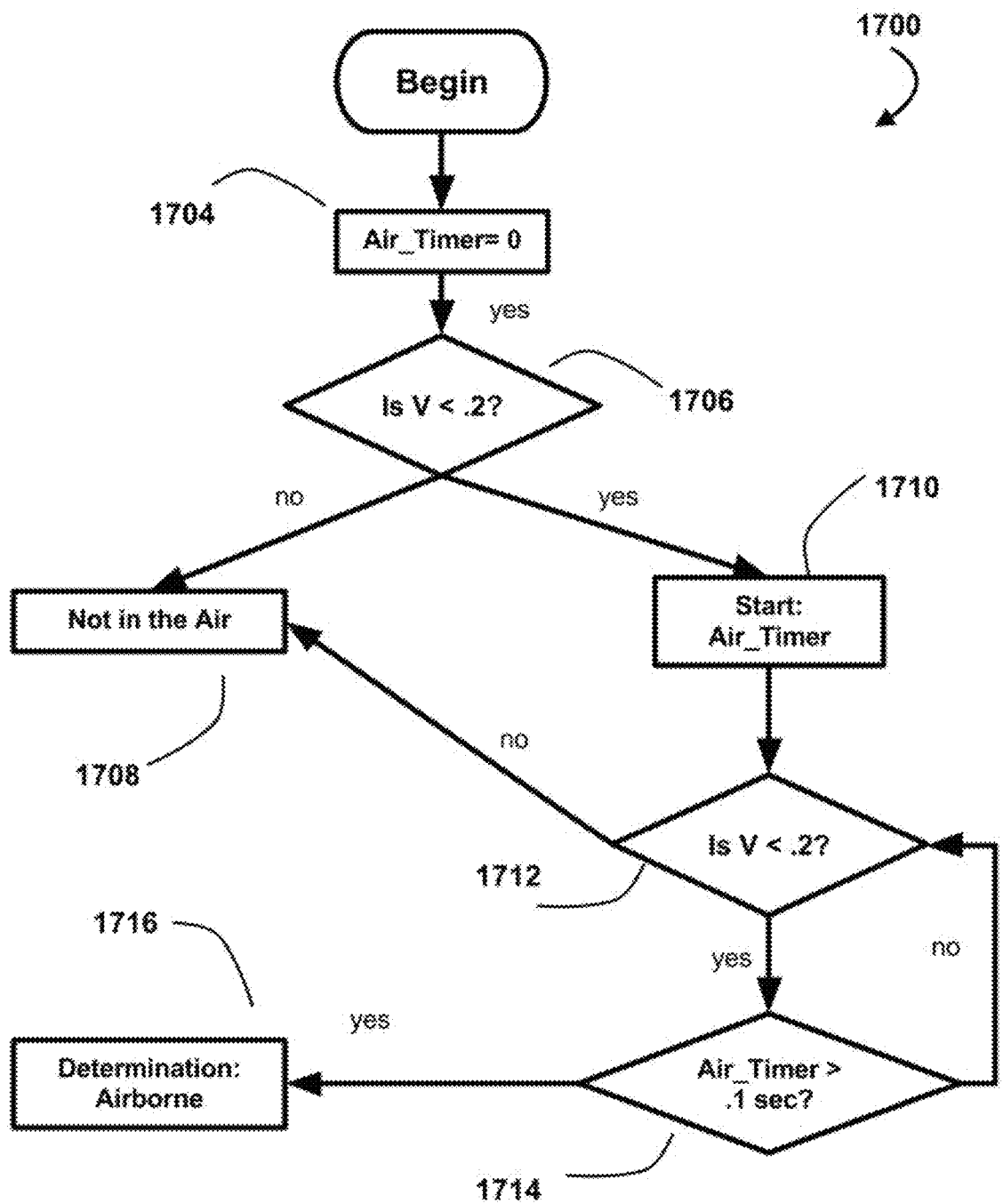

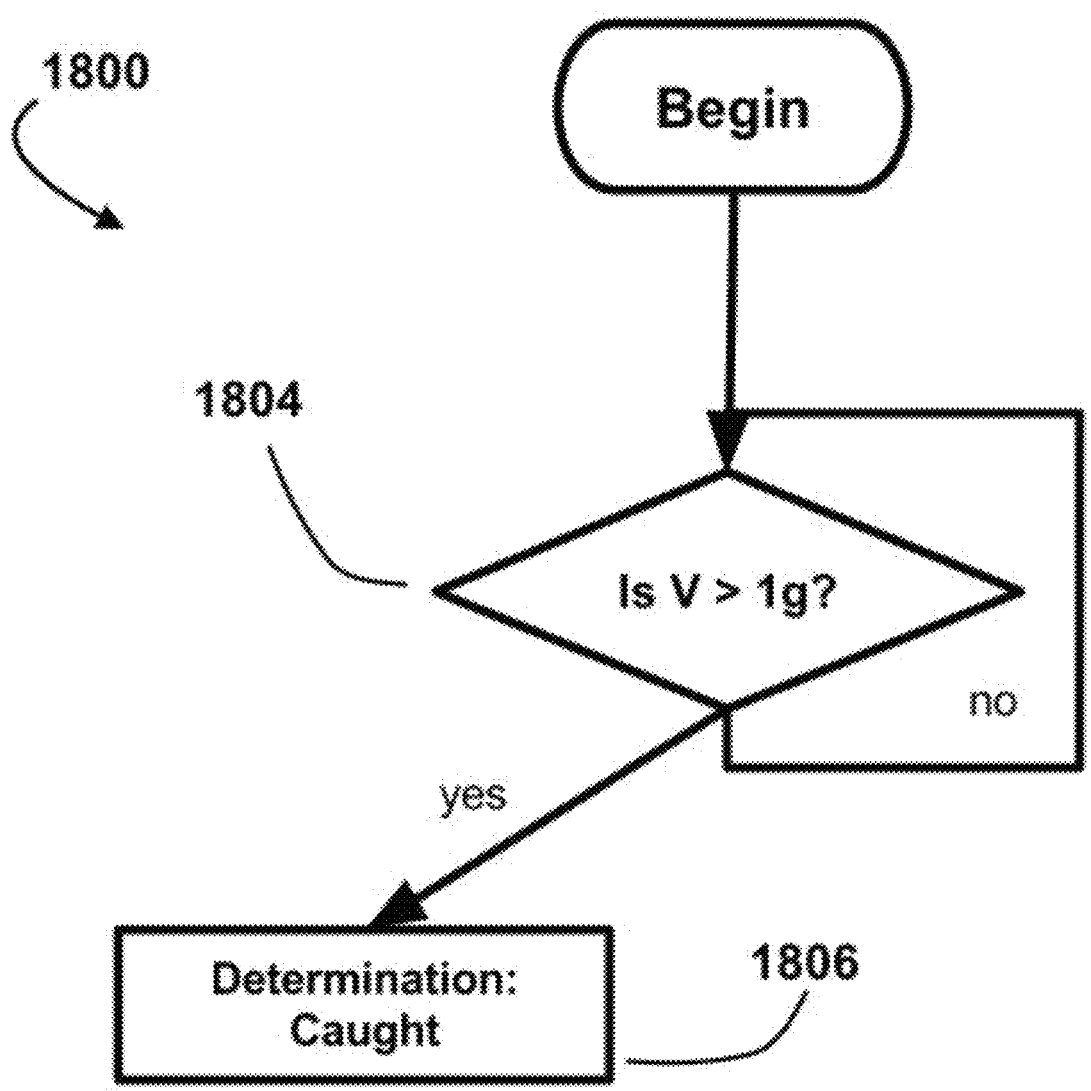

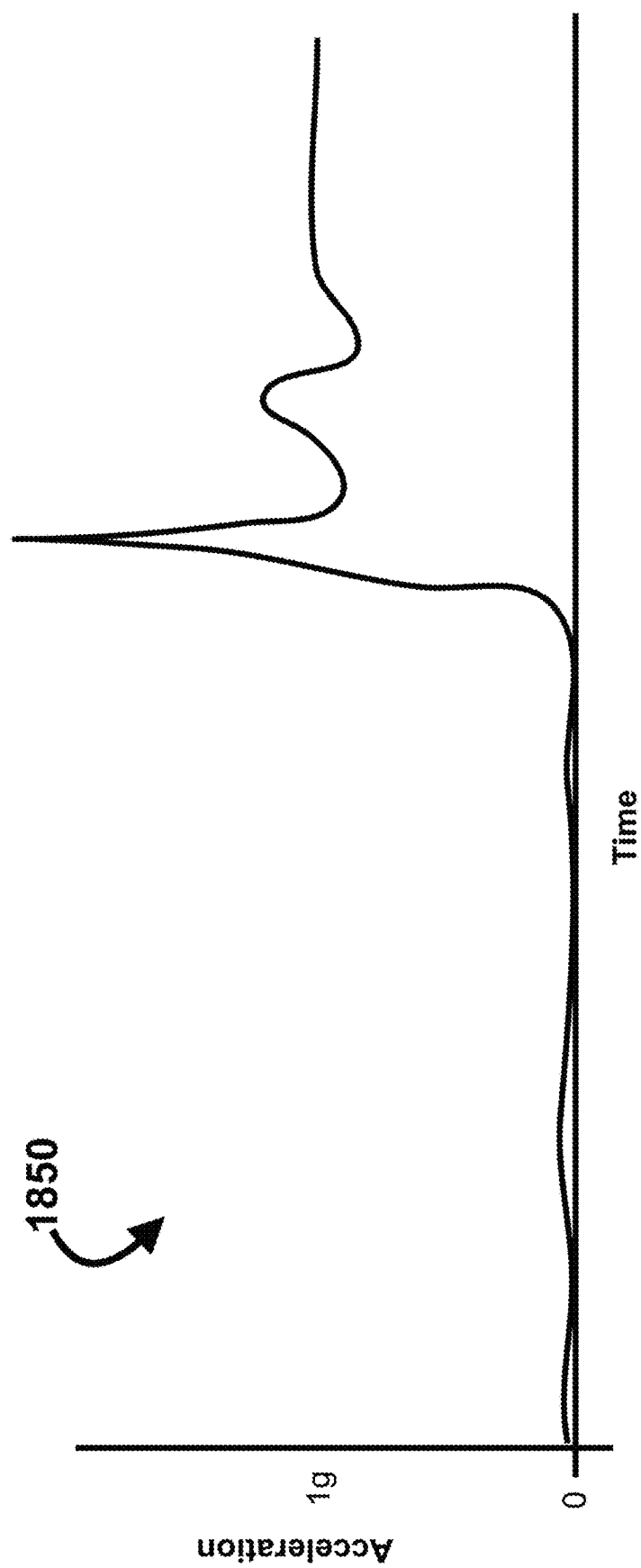

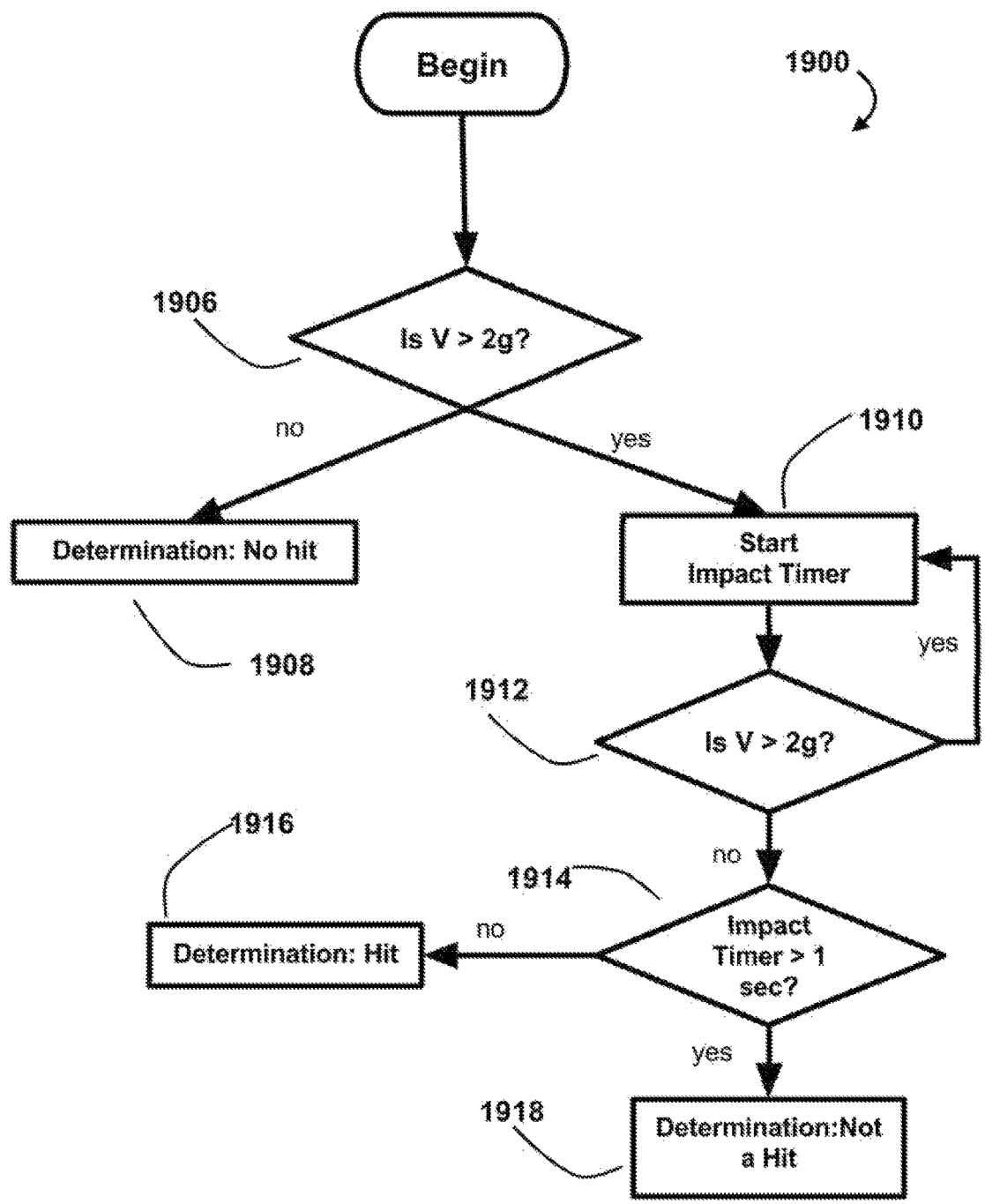

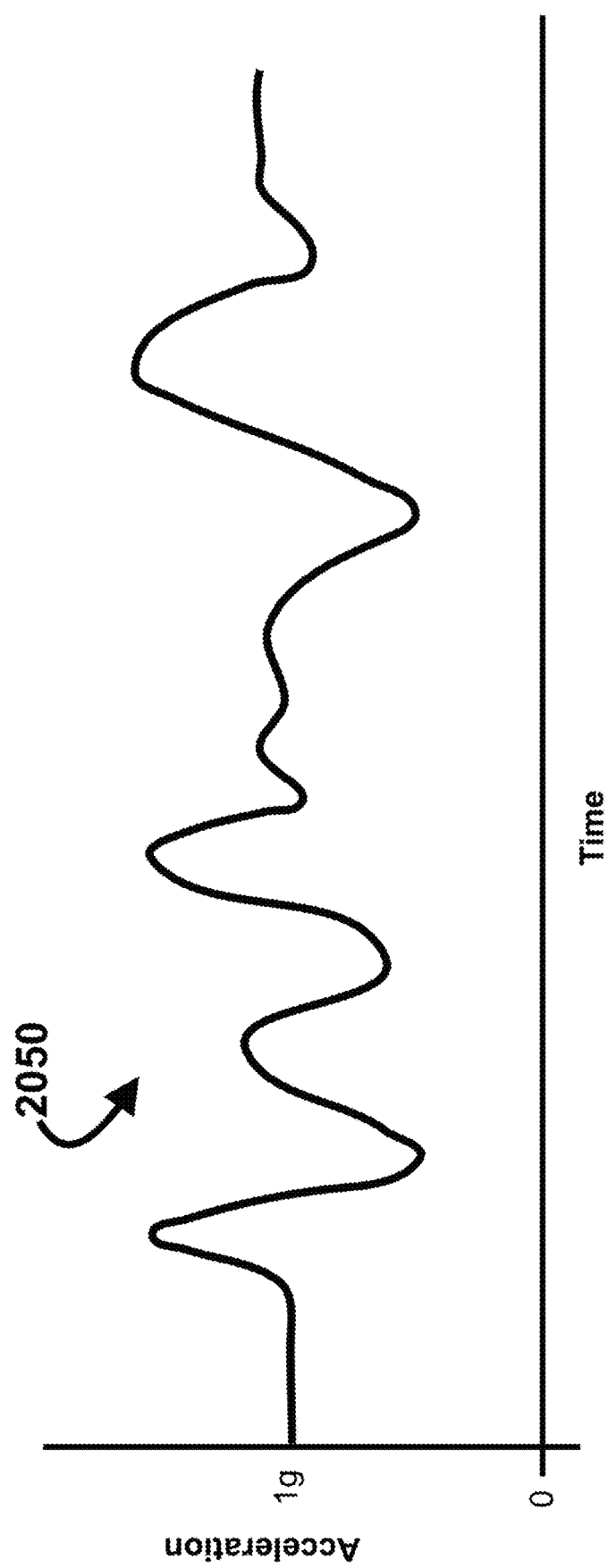

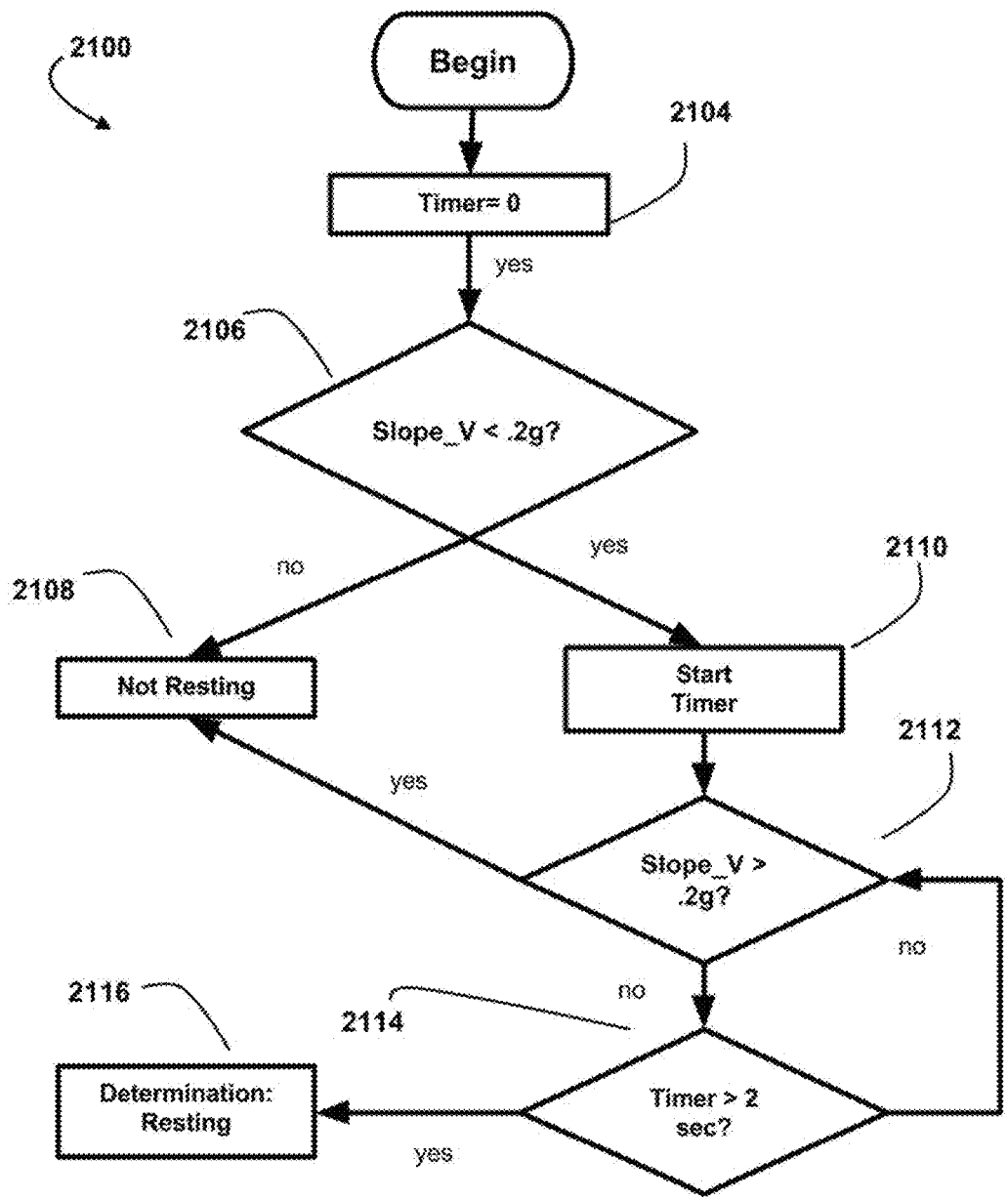

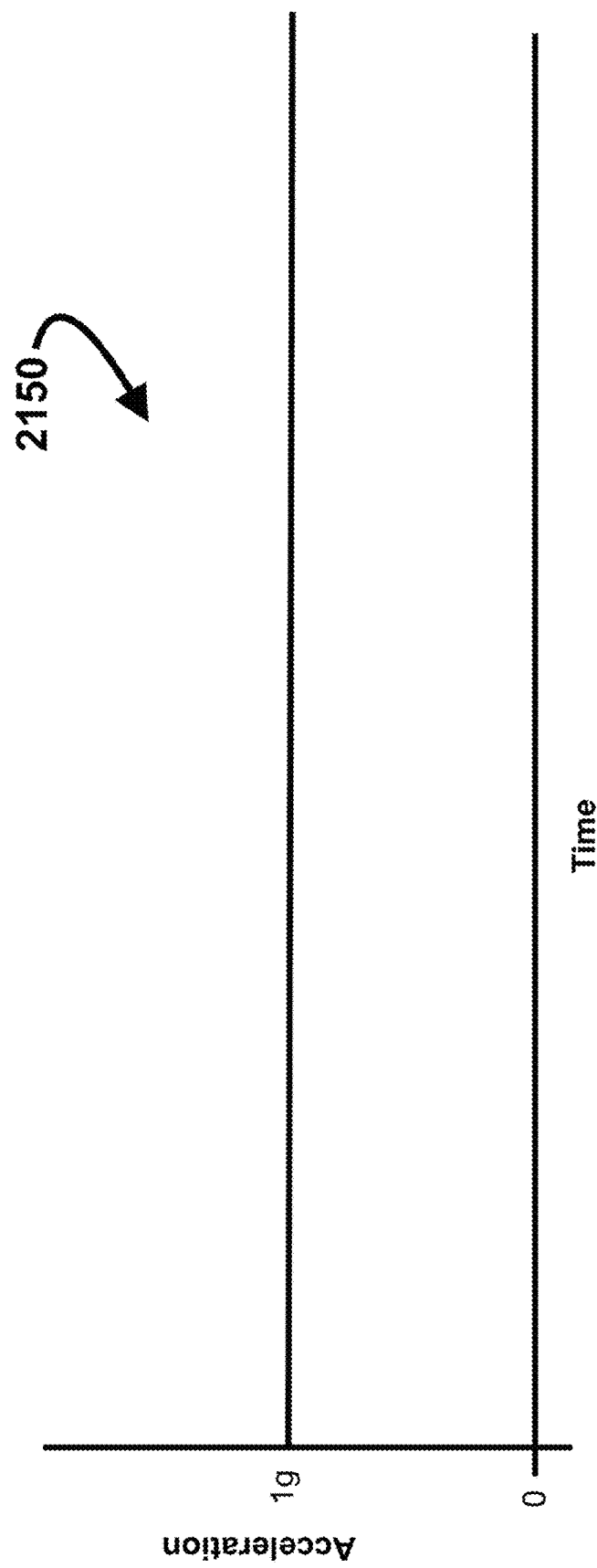

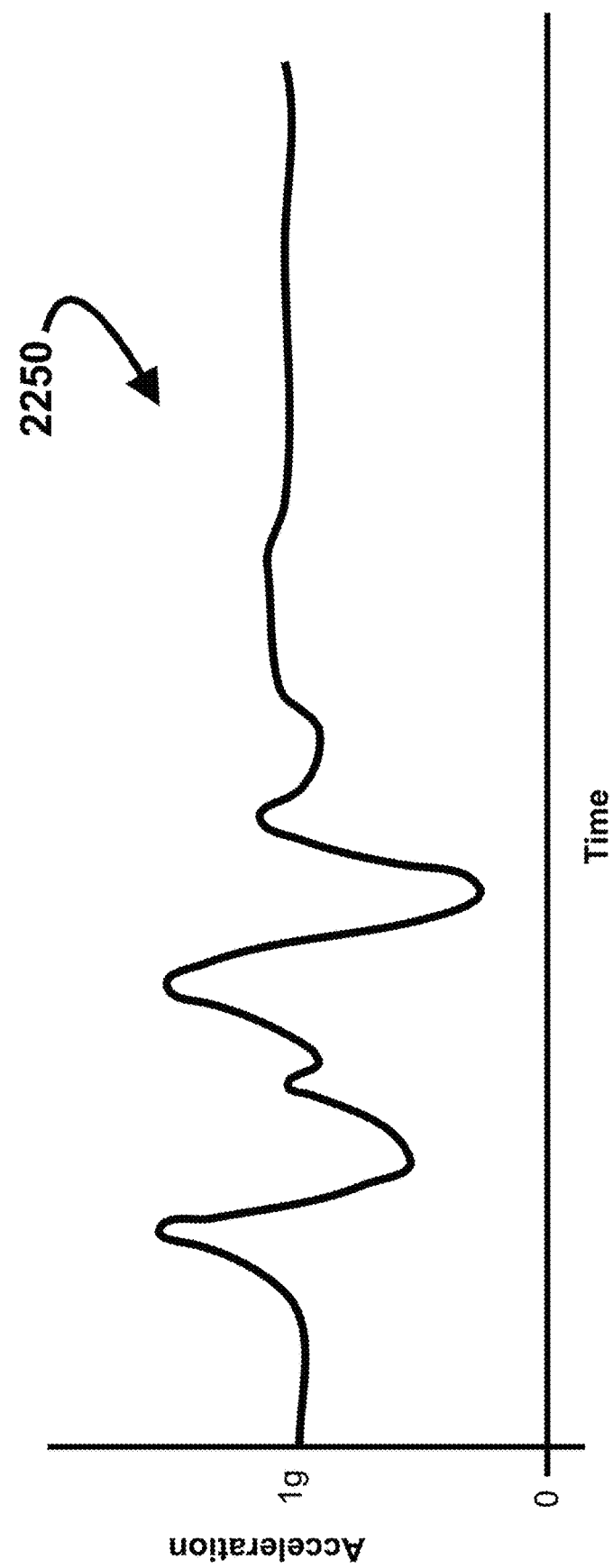

THROW-AND-CATCH BASED TOY WITH FREE FALL SENSING, IMPACT SENSING, AND SPEAKER OUTPUT

FIELD OF INVENTION

Embodiments of the present disclosure relate generally to electronic toys, and specifically to a throw-and-catch based toy with free-fall sensing, impact sensing, speaker output and other features as disclosed herein.

BACKGROUND DESCRIPTION OF RELATED ART

Current plush characters often do not hold children's attention and do not encourage social play. They are limited to push-button interaction or static play. Furthermore, video game culture is consuming an ever-younger demographic and physical toys are doing little to compete. Current plush toys serve a massive global user base, yet severely lack innovation. Little improvement has been made to the first randomized sound box introduced by Mattel in the 1950's whose basic function still serves as the industry standard. Children may be momentarily entranced by how they spew sayings for a couple days, then relegate the toys in a pile at the foot of their beds.

Physical and social interactions with current plush toys are also limited. Parents tend to buy toy after toy in an attempt to keep their kids occupied and away from video games. They rely on school and camps to force social interactions and organized after-school programs to keep their kids from endless hours of screen time. Brick-type toys (such as LEGOs™), while popular and expensive, are built in a day and left on the shelf. Few toys facilitate physical interaction. More and more, parents give in to the "video game play-date" as parents do not have time to supervise a physical alternative.

In addition, many electronic toys are available on the market that offer various modes of gameplay. However, certain modes of play that require detection of fine movement are not available due to the prohibitive cost of such detection. Thus, there is a need in the art for a low-cost, motion-sensitive plush toy to enable these modes of play and encourage physical and social interaction.

SUMMARY

Embodiments disclosed herein include a system, method and device for detecting a pre-determined motion from an accelerometer, comparing a sensed accelerometer information to a pre-determined accelerometer signature information, producing a sound based on the comparison of sensed accelerometer information to a pre-determined accelerometer signature information.

Embodiments disclosed herein also serve as a versatile platform for gameplay centered around physical interaction with the device. At the core of this platform is the ability to sense several movement states, including but not limited to: free fall, or the state of being "in air", "hit" (when the device has been hit), "shake" (when the device has been shaken), "resting" (when the device is not moving), "moving" (when the device is moving), "catch" (when the device exits the "in air" state), and more. The previous physical states are identified through analysis of sensor readings which at least include an accelerometer. The ability to accurately sense these states, in conjunction with the mechanical design of the device, affords unique individual and multi-user gameplay opportunities not achievable with any prior invention.

Embodiments of the invention are designed to encourage movement, sustain attention, and provide an alternative to "screen time" (e.g., video games and the like). A brief list of the advantages offered by the invention include but are not limited to: (1) Advanced physical interaction: the device is not limited to squeezing a button to elicit various responses from the toy. The device can detect and differentiate a variety of physical interactions and play entertaining sound responses. Users may interact with the device by tapping, shaking, or tossing the device, and in response, the device may play numerous sayings and sound effects. (2) Novel gameplay: the ability to sense and identify physical states allows for unique gameplay opportunities. The user can play games like "egg toss" that require the device to detect when it has entered the air, been caught, and how hard the device has been caught. (2) Encouraging movement: through both interactive and game modes, Embodiments of the invention encourage the user to be active. The more the device is moved, the more engaging the device may be to the user. Children have an abundance of energy and aspects of this disclosure may provide a match for this energy. (4) Promoting social play: This disclosure includes games which are designed to encourage group play and teamwork. Users can play games like "sky bird" that allow groups of children to toss the toy back and forth and attempt for the high score as a team.

The construction and method of operation of the invention, however, together with additional objectives and advantages thereof will be best understood from the following description of specific embodiments when read in connection with the accompanying drawings.

BRIEF DESCRIPTION OF THE DRAWINGS

FIG. 5A illustrates a flowchart describing a startup routine, according to one or more embodiments of the invention;

FIG. 5B illustrates a flowchart describing a startup routine, according to one or more embodiments of the invention;

FIG. 6A illustrates a flowchart describing a mode of gameplay, according to one or more embodiments of the invention;

FIG. 7A illustrates a flowchart describing a mode of gameplay, according to one or more embodiments of the invention;

FIG. 8A illustrates a flowchart describing a mode of gameplay, according to one or more embodiments of the invention;

FIG. 12A illustrates a flowchart describing a mode of gameplay, according to one or more embodiments of the invention;

FIG. 13A illustrates a flowchart describing a mode of gameplay, according to one or more embodiments of the invention;

FIG. 16A illustrates a flowchart describing a mode of detection according to one or more embodiments of the invention;

FIG. 16B illustrates a graph describing a mode of detection according to one or more embodiments of the invention;

FIG. 17A illustrates a flowchart describing a mode of detection according to one or more embodiments of the invention;

FIG. 18A illustrates a flowchart describing a mode of detection according to one or more embodiments of the invention;

FIG. 18B illustrates a graph describing a mode of detection according to one or more embodiments of the invention;

FIG. 19A illustrates a flowchart describing a mode of detection according to one or more embodiments of the invention;

FIG. 20B illustrates a graph describing a mode of detection according to one or more embodiments of the invention;

FIG. 21A illustrates a flowchart describing a mode of detection according to one or more embodiments of the invention;

FIG. 21B illustrates a graph describing a mode of detection according to one or more embodiments of the invention;

FIG. 22B illustrates a graph describing a mode of detection according to one or more embodiments of the invention;

DESCRIPTION

Generality of Invention

Figure 1:
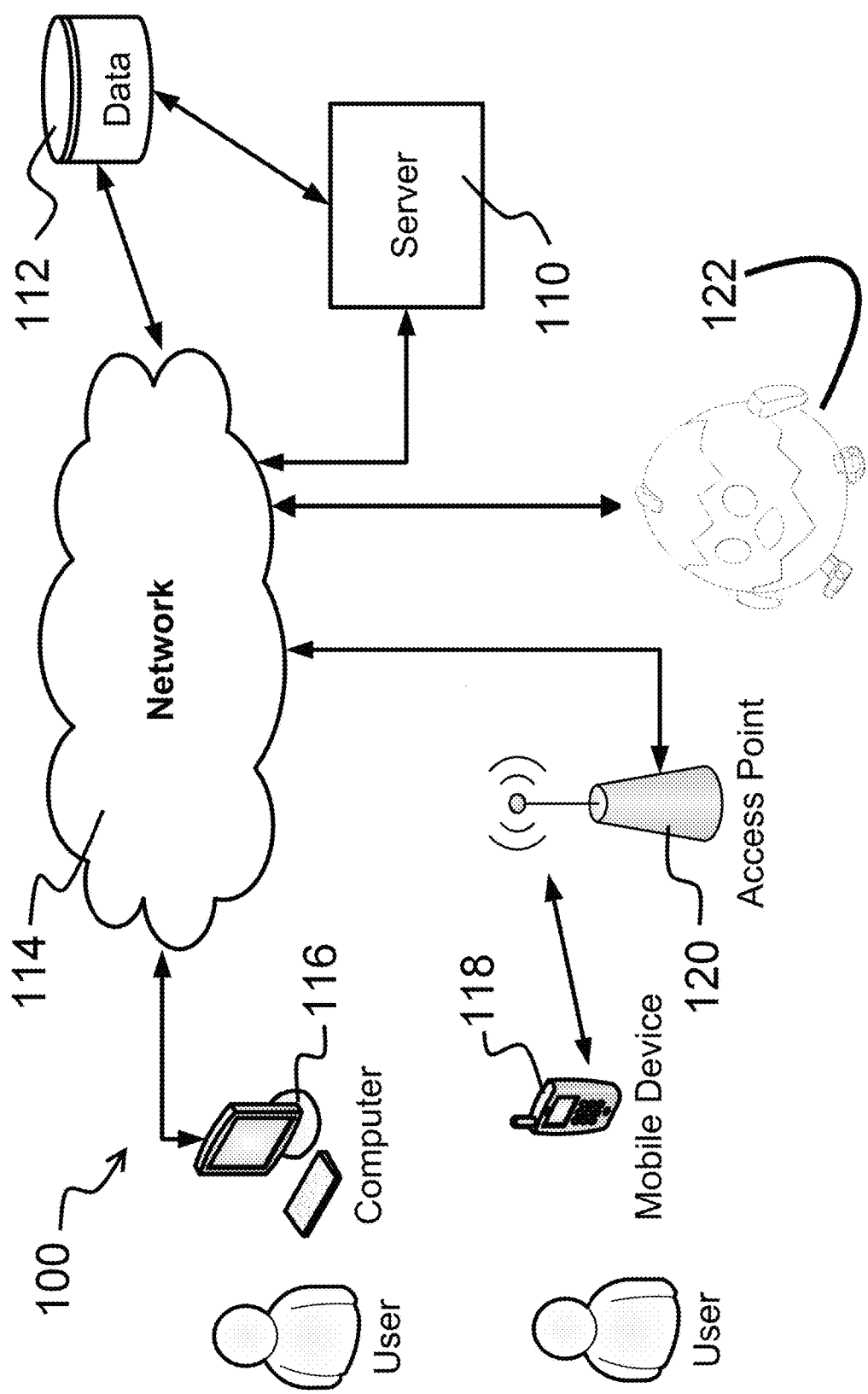
FIG. 1 illustrates a functional block diagram of a client server system.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments, devices and examples disclosed herein. Many other variations are possible which remain within the content, scope and spirit of the invention, and these variations would become clear to those skilled in the art after perusal of this application.

Variable Listing

Level-Count—This variable may define the level number that the user is on. In one embodiment, if the user passes a level, this value may increase by 1. If the user loses, this value may will reset to 0.

Counter—This variable may be used to measure the amount of "time" the device has spent in the user's hands versus in the air. While in the air the counter variable may decrease, but while resting in the user's hands, it will increase. In some embodiments, if the counter reaches chosen percentages of the maximum allowed value, the device may change the sound output to "warn" the user. If the counter variable reaches a chosen maximum allowed values, the user may lose.

Count-Rate (e.g., Air_Count_Rate, Ground_Count_Rate)—This variable may be used to increase or decrease the speed of the counter, i.e., the count rate variable may set the rate which the counter variable will increase for a given interval of time. Thus, this variable may be used to set the difficulty of each level.

Variable-Rate (e.g., Variable_Rate_Air, Variable_Rate_Ground)—This variable may be used as a coefficient to increase the count rate to count faster or slower. This variable may be used to adjust the difficulty of a chosen game.

Timer—This variable may regulate the amount of time each level lasts. In one embodiment, when the timer reaches a predefined maximum value, the user may pass the level and the next level may start.

Max_Accel—This variable may set the maximum acceleration that the device can detect before the player loses. In some embodiments, this value can be increased or decreased to change the difficulty. By way of example and not limitation, in a first level of a chosen game, the Max_Accel variable may be set to 20 g. In second level, the Max_Accel variable could be decreased to 15 g to make the second level more difficult to complete.

Movement_Threshold—This variable may represent the accelerometer value that determines when the device has crossed from resting to movement.

Freeze_Threshold—This variable may represent the accelerometer value that determines when the device has crossed from movement to resting.

Freeze_Time—This variable may represent the amount of time that the device has to be held below the freeze_threshold value to determine a "frozen" state.

Lexicography

The term "Indicia" may include, by means of example and not limitation, a sound file, flashing lights, notifications on a screen associated with the hit action, or any other indicia known in the art.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Processing System

The methods and techniques described herein may be performed on a processor based device. The processor based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover, any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively, the entire processing system may be self-contained on a single device.

The methods and techniques described herein may be performed on a processor based device. The processor based device will generally comprise a processor attached to one or more memory devices or other tools for persisting data. These memory devices will be operable to provide machine-readable instructions to the processors and to store data, including data acquired from remote servers. The processor will also be coupled to various input/output (I/O) devices for receiving input from a user or another system and for providing an output to a user or another system. These I/O devices include human interaction devices such as keyboards, touchscreens, displays, pocket pagers and terminals as well as remote connected computer systems, modems, radio transmitters and personal communication devices such as cellular phones, "smart phones" and digital assistants.

The processing system may also include mass storage devices such as disk drives and flash memory modules as well as connections through I/O devices to servers containing additional storage devices and peripherals. Certain embodiments may employ multiple servers and data storage devices thus allowing for operation in a cloud or for operations drawing from multiple data sources. The inventor contemplates that the methods disclosed herein will operate over a network such as the Internet, and may be effectuated using combinations of several processing devices, memories and I/O.

The processing system may be a wireless device such as a smart phone, personal digital assistant (PDA), laptop, notebook and tablet computing devices operating through wireless networks. These devices may include a processor, memory, displays, keypads, WiFi, Bluetooth, GPS and other I/O functionality.

Client Server Processing

FIG. 1 shows a functional block diagram of a client server system 100 that may be employed for some embodiments according to the current disclosure. In the FIG. 1 a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively, the user may access the server 110 through the network 114 by using a smart device such as a telephone or PDA 118. The smart device 118 may connect to the server 110 through an access point 120 coupled to the network 114. The mobile device 118 includes a sound capture device such as a microphone. A user device 122, according to embodiments of this disclosure, may be connected to this network. By way of example and not limitation, user device 122 is shown as a toy resembling a bird, however, user device 122 may take any form, including but not limited to shell 300 or 350 (described herein). In this manner, user device 122 may communicate with other devices on network 114 including but not limited to, computer 116, mobile device 114, databases 112 and the Internet generally. It is contemplated that a user of user device 122 may upload, by way of example and not limitation, high scores of games played, user data and may download software updates or new games to user device 122.

Conventionally, client server processing operates by dividing the processing between two devices such as a server and a smart device such as a cell phone or other computing device. The workload is divided between the servers and the clients according to a predetermined specification. For example, in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Machine readable instructions are conventionally known including applets and written in languages such as C, Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on a client device (such as user device 122) to be transmitted to the server for processing. The result is then sent back to the client for action.

One having skill in the art will recognize that client devices, such as user device 122, may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine, a data engine, an execution engine, a user interface (UI) engine and the like may be employed. These engines may seek and gather information about events from remote data References in the specification to one embodiment", an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Housing Component Assembly

Figure 2:
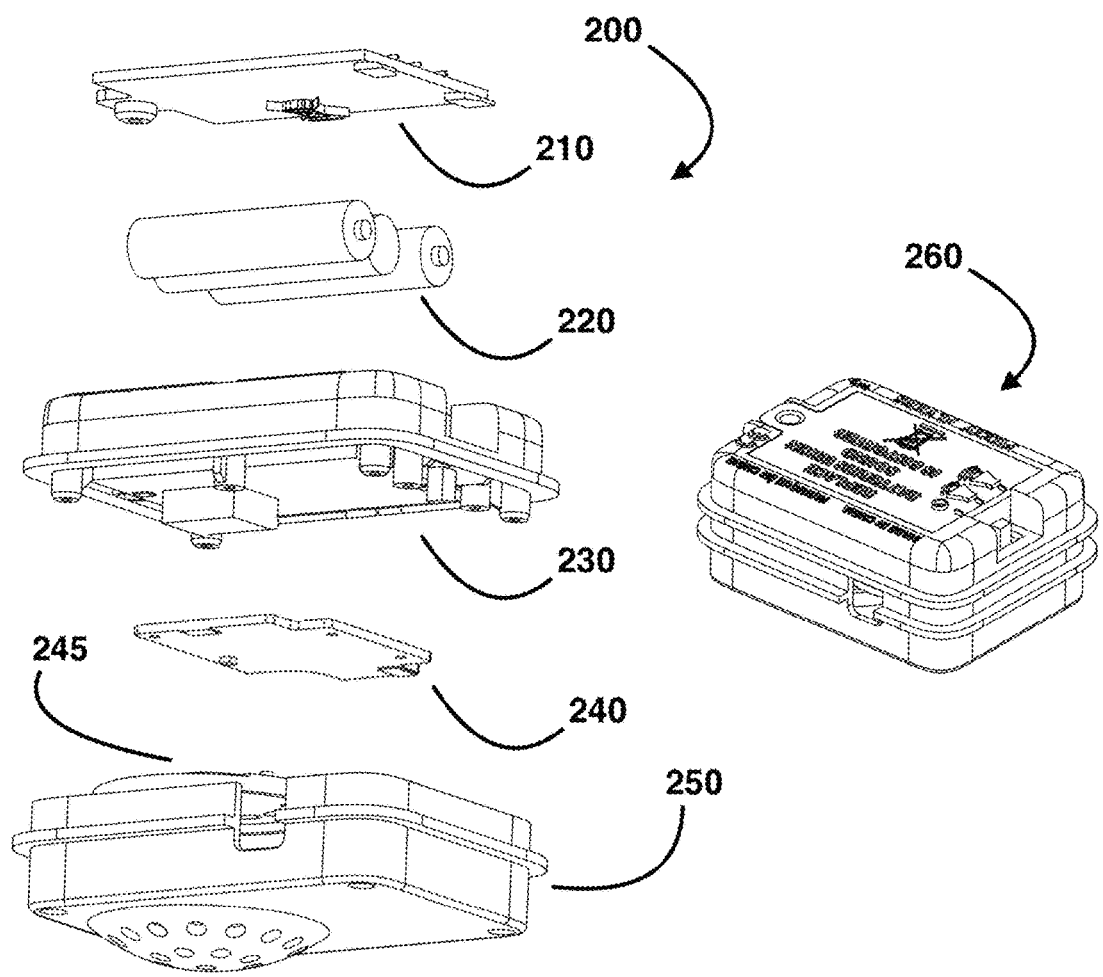
FIG. 2 illustrates a housing component assembly, according to one or more embodiments of the invention.

FIG. 2 illustrates a housing component assembly in both disassembled 200 assembled forms 260. Housing component assembly 200 includes battery cover 210, batteries 220, battery housing 230, PCB 240, speaker 245 (partially obscured), speaker housing 250 and switch 255 (not shown). In one embodiment, batteries 220 power circuit board 240. By way of example and not limitation, batteries 220 are represented by three 'AAA' batteries, but various power sources are contemplated. In one embodiment, speaker 245 is used to output sounds generated by PCB 240.

In one embodiment, speaker 245 may take the form of any number of devices number of different sound-producing devices, such as: piezoelectric devices, transducer, haptic, electrostatic devices, plasma devices and the like. In one embodiment, speaker housing 250 may feature a concave, perforated shape to both protect speaker 245 as well as amplify and distribute sound.

In one embodiment, PCB 240 may include accelerometer 255 (not shown). In other embodiments, accelerometer 255 may be a separate device. In some embodiments, accelerometer 255 may be placed in housing component assembly 200 such that accelerometer 255 is positioned in a distinct location in the device. In one embodiment, this distinct location located approximately in the center of gravity of the device. In another embodiment, the distinct location is located approximately in the centroid or center of the device such that when the device is spun (e.g., 'twirled'), the device is most likely to rotate in one or more dimensions about the location in which accelerometer 255 is positioned inside the device. In this manner, accelerometer 255 may be better positioned to accurately detect various types of movements of the device by avoiding a spinning effect that may prevent accelerometers from accurately detecting an airborne status.

In one embodiment, internal housing 200 serves to protect and contain elements including but not limited to: 210, 220, 230, 240, 245 and 250. Internal housing 200 may include rounded form factors with thick walls to protect against hard impacts. In some embodiments, internal housing 200 is made from plastic. In some embodiments, internal housing 200 includes high force springs (not shown) to ensure contact of batteries 220 even during impact and other movements.

In one embodiment, switch 255 may take the form of a three-position slide switch that allows a user to change the volume setting from low to high, or turn the device off completely. In further embodiments, one or more of the battery cover and three position slide switch are accessible to the user by opening up the back of the toy.

Circuit Diagram

Figure 3:
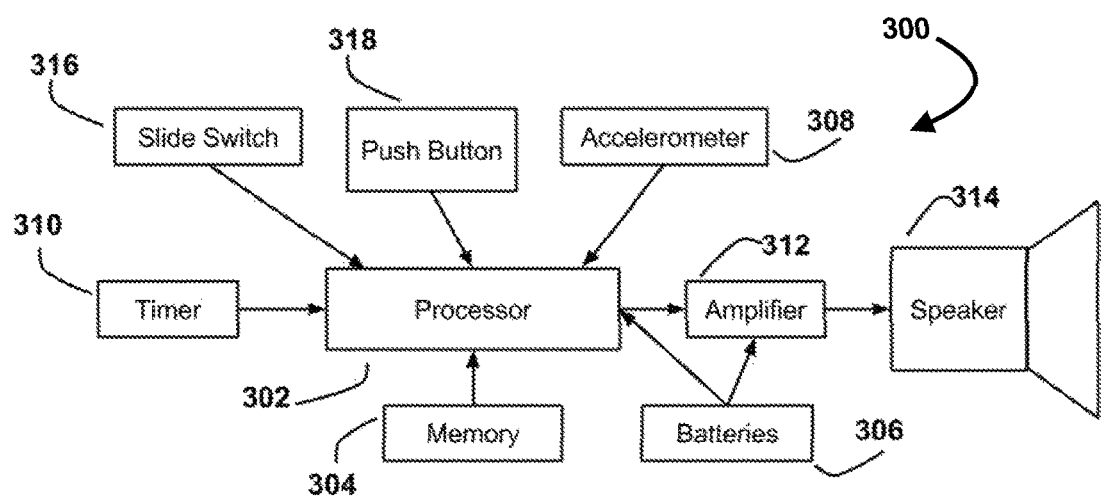
FIG. 3 illustrates an exemplary circuit layout, according to one or more embodiments of the invention.

FIG. 3 illustrates a circuit diagram, according to embodiments of the invention. PCB 300 includes processor 302, memory 304 and may be powered by a power source such as batteries 306. PCB 300 may be connected to accelerometer 308 and one or more timers 310. PCB 300 may produce sounds using amplifier 312 and speaker 314. In one embodiment, speaker 314 may be placed in a speaker housing. PCB 300 may be interfaced with using slide switch 316 and push button 320.

In some embodiments, either slide switch 316 or push button 320 is used to power on the device, either by sliding slide switch 316 or pressing or holding push button 320. In other embodiments, either slide switch 316 or push button 320 may be used to start or switch game modes described elsewhere herein. In some embodiments, either slide switch 316 or push button 320 may be used to wake the device from a low power or "sleep mode" or as a volume control.

In some embodiments, either slide switch 316 or push button 320 may be located in the ear or wing of, by way of example and not limitation, shells 300 and 350, as appropriate. In other embodiments, either slide switch 316 or push button 320 may be located inside, by way of example and not limitation, shells 400 or 450.

In some embodiments, accelerometer 308 may be placed in PCB 300 such that accelerometer 308 is positioned in a distinct location in the device. In one embodiment, this distinct location located approximately in the center of gravity of the device. In another embodiment, the distinct location is located approximately in the centroid or center of the device such that when the device is spun (e.g., 'twirled'), the device is most likely to rotate in one or more dimensions about the location in which accelerometer 308 is positioned inside the device. In this manner, accelerometer 308 may be better positioned to accurately detect various types of movements of the device by avoiding a spinning effect that may prevent accelerometers from accurately detecting an airborne status.

Shell

Figure 4:
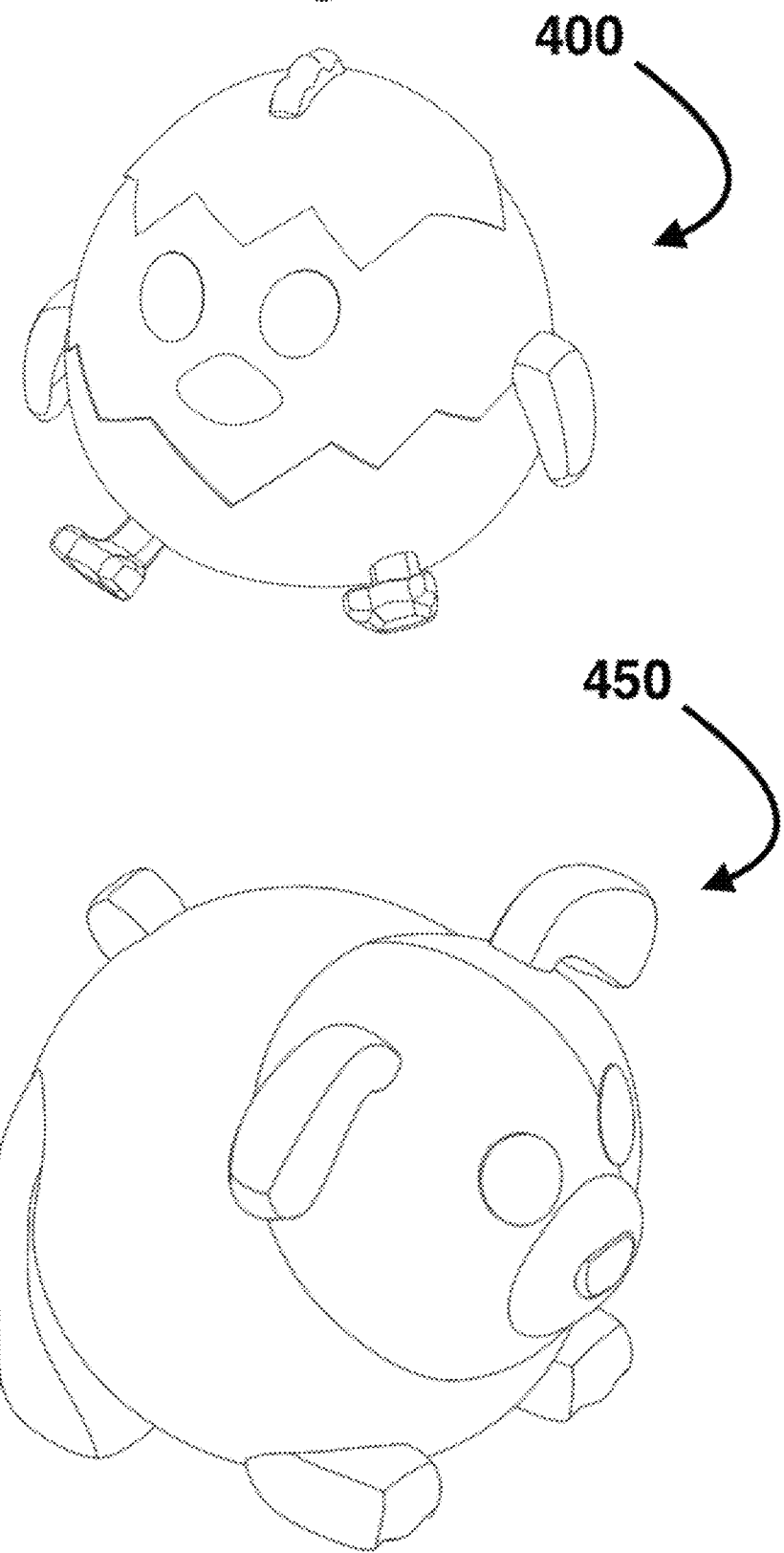
FIG. 4 illustrates a shells, according to one or more embodiments of the invention.

FIG. 4 illustrates shells, according to embodiments of the invention. Bird 300 and dog 350 are, by way of example and not limitation, exterior shells in which embodiments of the invention may be installed inside of. In one embodiment, children may play games described herein via the microcontroller, and other elements described herein by interfacing with the shell. While shells such as bird 300 and dog 350 are shown, the inventors contemplate that the shell may take any form. For example, a shell may take the form of a monkey, a person, a cat, and may be anthropomorphized or zoomorphized in any manner. In a further embodiment, the shell may take any form, including but not limited to: a ball, a shape that children may find visually engaging or enticing of affection or any shape.

Interactive Code (Includes Startup Routine)

FIGS. 5A and 5B illustrate a flow chart of method steps for an interactive startup routine, according to one embodiment of the present disclosure. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

The method begins at a step 502, in which the device powers up. This step may be in response to, by way of example and not limitation, a power-on function, such as a push button or connecting a power supply such as batteries or AC adapter.

At a step 504, a check of the status of a sleep timer is performed. A sleep timer may be employed to allow for ease of shut down of the device, in other embodiments, a power-off button may be employed. In further embodiments, a user input such as a shake, hit, or other recognized action may be used to power off the device. In this step, if the sleep timer is zero or negative, the method progresses to step 506.

At step 506, a shut down step may be employed as a result of, among other functions, step 504. At a step 508, a push button or other electrical switch known in the art may be used to power on the device, among other functions.

If the check of the sleep timer from step 504 results in a pass (e.g., is positive), at a step 510, the device may begin searching for user input. By way of example and not limitation, a child user may hit, shake, toss or otherwise interact with the device while the device is running this interactive startup routine.

A first type of user input occurs at a step 512, which, in some embodiments, takes the form of the user may press and quickly release an push button. This push button may start a game at a step 514, selected from a game library, shown in Table 5.1, below.

TABLE 5.1

Games Library

"Catch and Command Game"
"Continuous In Air Game"
"Dance Game"
"Keep it Moving #1"
"Keep it Moving #2"
"Maximum Acceleration Game #1"
"Maximum Acceleration Game #2"
"Noise Bomb"
"Thumper Game #1"
"Thumper Game #2"

A second type of user input occurs at a step 516, in which the push button may be held for a predetermined minimum amount of time. Step 516 results in, at a step 518, switching to a different game from the game library shown in Table 5.1, above. In some embodiments, part or all of the method described in this figure may run when the device is first powered on, may run continuously in the background, or as a subprocess called upon by other methods described herein. In further embodiments, the steps 512, 514, 516 and 518 may occur during one or more of the other methods described herein. In these embodiments, while another method is running, a user may press or hold a push button on the device to switch to one or more other methods. By way of example and not limitation, a user may be in the midst of playing "Dance Game" and hold down the push button, resulting in the device switching to "Noise Bomb." In this manner, the user is free to stop playing one game and start another game. In these embodiments it is important to note that the device need not be in interactive mode (i.e., running the current method) in order for the user to switch games.

A third type of user input occurs at a step 520, in which the device may be hit as defined herein. Based on the detection of a hit in step 520, the device may, at a step 522, play indicia such as a sound file associated with a hit. Indicia may include, by means of example and not limitation, a sound file, flashing lights, notifications on a screen associated with the hit action, or any other indicia known in the art. Afterwards, the device may return to step 510.

A fourth type of user input occurs at a step 524, in which the user throws or otherwise makes the device airborne. The airborne sensing system from embodiments described elsewhere herein may sense that the device is airborne, thus, at a step 526, the device may play indicia such as a sound file associated with the device being airborne. While the device is airborne, or while the device is playing a sound file associated with the device being airborne, or subsequently, the device may, at a step 528 wait for impact with, for example, the ground or the user's hands. At at a step 530, the device may play indicia such as a sound file associate with impact as defined herein. Afterwards, the device may return to step 510.

A fifth type of user input occurs at a step 532, in which the user may shake the device. A shake may be defined approximately as a rapid, back-and-forth movement in one or more of the x- , y- or z-dimensions with the forces, acceleration and frequency that may be expected from an adult or child. At a step 534, the device may play indicia such as a sound file associate with a shake. At a step 536, if the device detects the device is still being shaken, the device may loop back to step 534 and play a sound associated with a shake. If the device detects the device is not being shaken, the device may return to step 510.

Movements undergone by the device include but are not limited to: hitting, twirling, shaking, tossing, catching, freezing and resting. Movement detection includes (such as decision trees and comparison blocks described in the associated figures), the device may compare the sensed accelerometer information to one or more accelerometer signature information in order to determine the movement underwent by the device.

Dance Games

Figure 6B:
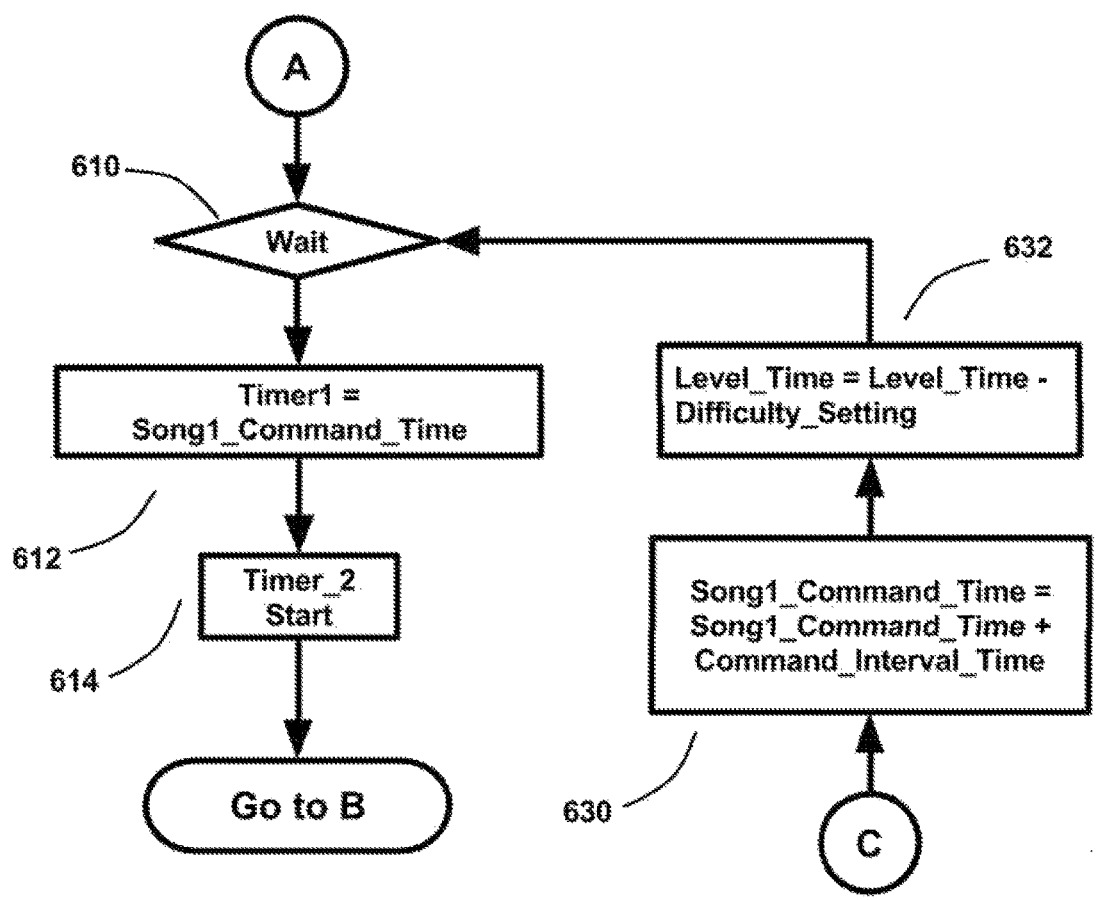
FIG. 6B illustrates a flowchart describing a mode of gameplay, according to one or more embodiments of the invention.
Figure 6C:
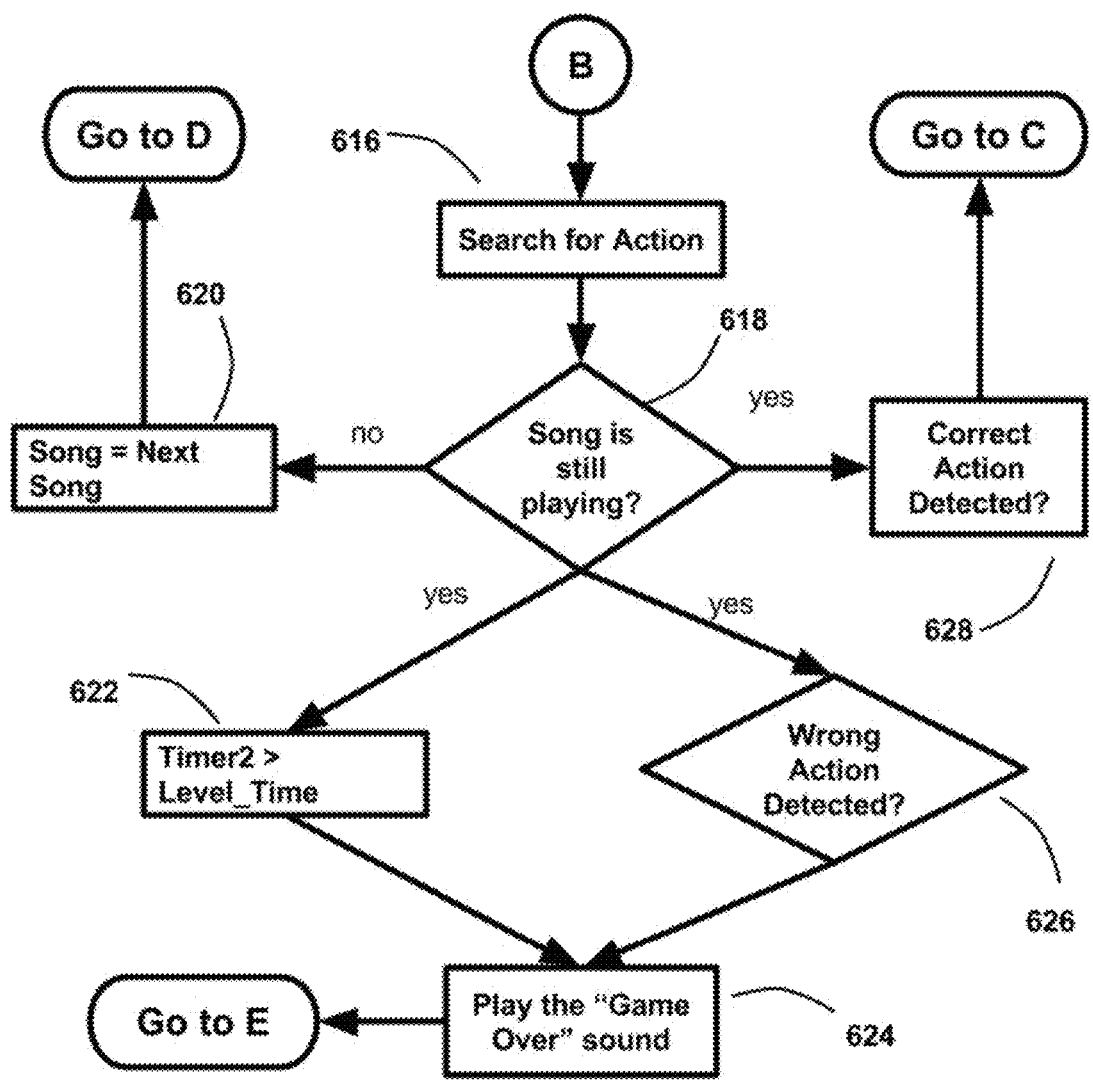
FIG. 6C illustrates a flowchart describing a mode of gameplay, according to one or more embodiments of the invention.

FIGS. 6A, 6B and 6C illustrate flow charts for a game titled "Dance Game," according to embodiments of the invention. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

In one embodiment, "Dance Games" encourage players to dance with the device as it plays a song. The lyrics of the song will give commands to the players on what actions to do with the device, e.g., juggle, spin, bounce, pass to the next person, etc. In further embodiments, the user must do the action indicated by the device at certain periods of the music, perhaps in order to keep the music going or to earn points. The routine may culminate in a "pass me" command that directs the device to the next user and resets the routine. For instance, commands could be "shake me over your head," "hit me to the beat," "spin me in the air," or finally "pass me to a friend."

The method 600 begins at a step 602, in which the game starts. In some embodiments, the device may already be in interactive mode as described herein when method 600 begins. At an optional step 604, the game may begin via a push button or connecting a power supply such as batteries or AC adapter. At a step 606, the device selects a song and beings playing the song. The song has an associated command (e.g., hit, toss, etc.). At a step 608, a first timer starts. At a step 610, the device waits. At a step 612, the first timer is set equal time value associated with the song. At a step 614, a second timer starts. At a step 616, the device enters an action searching mode. At a step 618, the device determines whether the song is still playing (i.e., whether the song is over). If the song is not still playing, at a step 620, the next song is queued for play and the method returns to step 606.

If the song is still playing, a comparison is made between the second timer and the level time. If the second timer exceeds the level time, the user loses, and at a step 624, the device may play a sound associated with a "game over." The method returns to the beginning. If a wrong action is detected at a step 626, the user loses, and at step 624, the device may play a sound associated with a "game over." The method returns to the beginning. If however, the second timer does not exceed the level time and a correct action is detected at a step 628, the method proceeds to a step 630 where the command time value of song is incremented by command interval time. At a step 632, the level time is decremented by the difficulty setting, and the method returns to step 610 to wait.

"Noise Bomb"

Figure 7B:
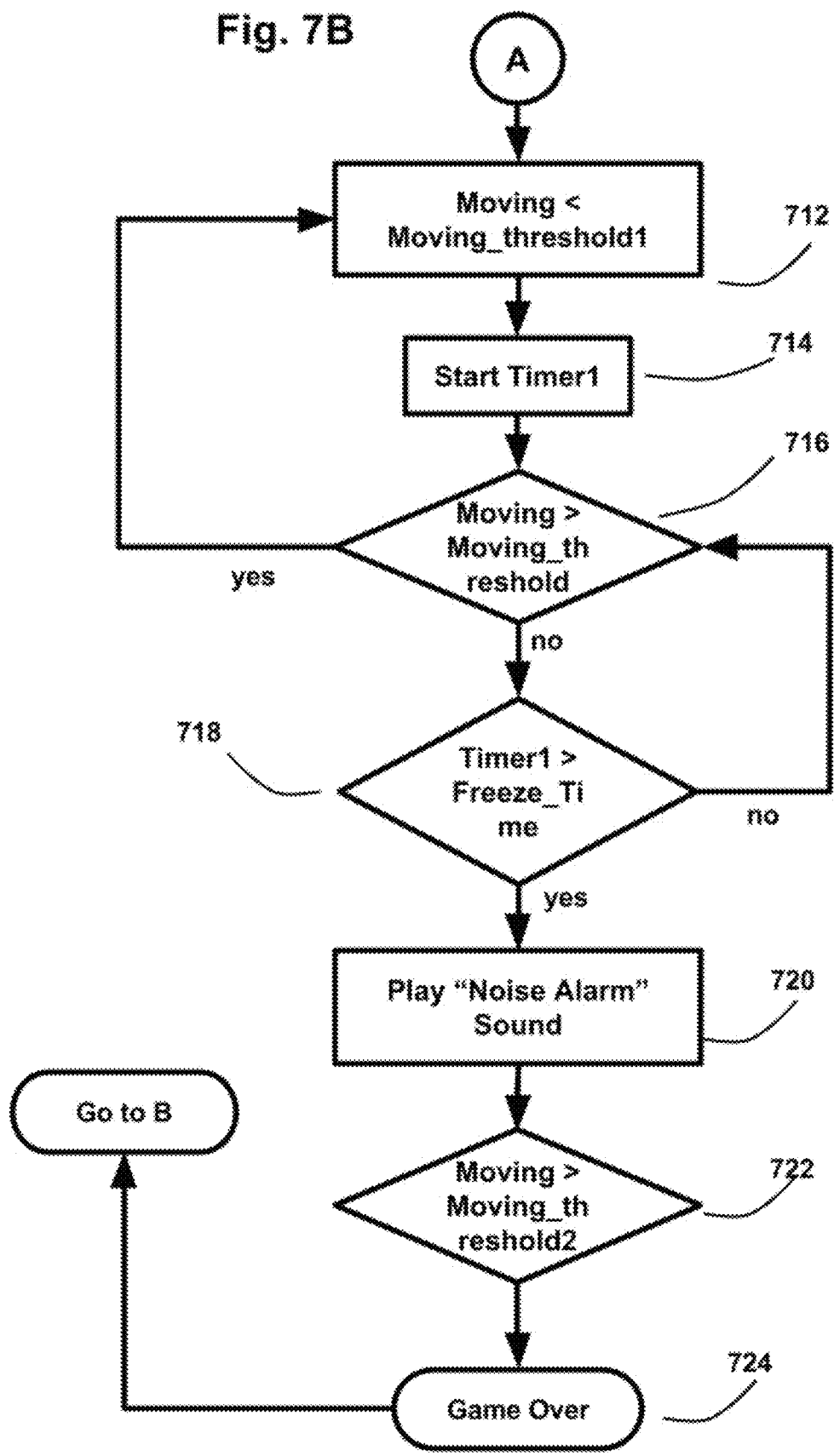
FIG. 7B illustrates a flowchart describing a mode of gameplay, according to one or more embodiments of the invention.

FIGS. 7A and 7B illustrate a flow chart for a game titled "Noise Bomb," according to embodiments of the invention. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

"Noise bomb" is a simple game in which, after a predetermined amount of time or series of actions after the start of the game, the device may begin playing one or more sound recordings until input occurs. By way of example and not limitation, one example of "noise bomb" may be as follows: a child powers on the device, starts the "noise bomb" game, throws the device into a crowded room and hides. The device begins emitting attention-garnering or obnoxious sounds causing surprise or general amusement. This may ensue until another user interacts with the device out of curiosity or attempts to turn the device off.

The method 700 begins at a step 704, in which the device begins the game. In some embodiments, the device may already be in interactive mode as described herein when method 700 begins. This step may be in response to the user holding down a push button (as in an optional step 706), or a power-on function, such as a push button or connecting a power supply such as batteries or AC adapter.

At a step 708, the device determines whether it is airborne. At a step 710, the device searches for impact.

At a step 712, a subroutine for sustained movement detection, described in greater detail herein, is executed in order to determine whether the device is moving and as to whether moving exceeds the moving threshold.

At a step 714, a timer is started. At a step 716, a determination by the subroutine for sustained movement detection determines whether the device is moving based on a moving threshold. If the device is still moving, the method 700 returns to step 712. If the device is not still moving, at a step 714, a second subroutine is run to determine if the device is moving, in which a determination is made whether the timer has exceeded a Freeze_Time. If the check from step 712 results in a 'no,' the method 700 returns to step 716.

If the check from step 712 results in a 'yes,' at a step 720, the device begins playing one or more "Noise Alarm" sounds. In some embodiments, the noise alarm sounds are designed to attract attention or be obnoxious to other users. At a step 722, a subroutine for sustained movement, described in greater detail herein, is executed in order to determine whether the device is moving and as to whether moving exceeds the moving threshold.

Finally, at a step 724, the game is over and the method 700 may return to a step 704 or enters interactive mode, according to embodiments of the invention.

"Catch and Command Game"

Figure 8B:
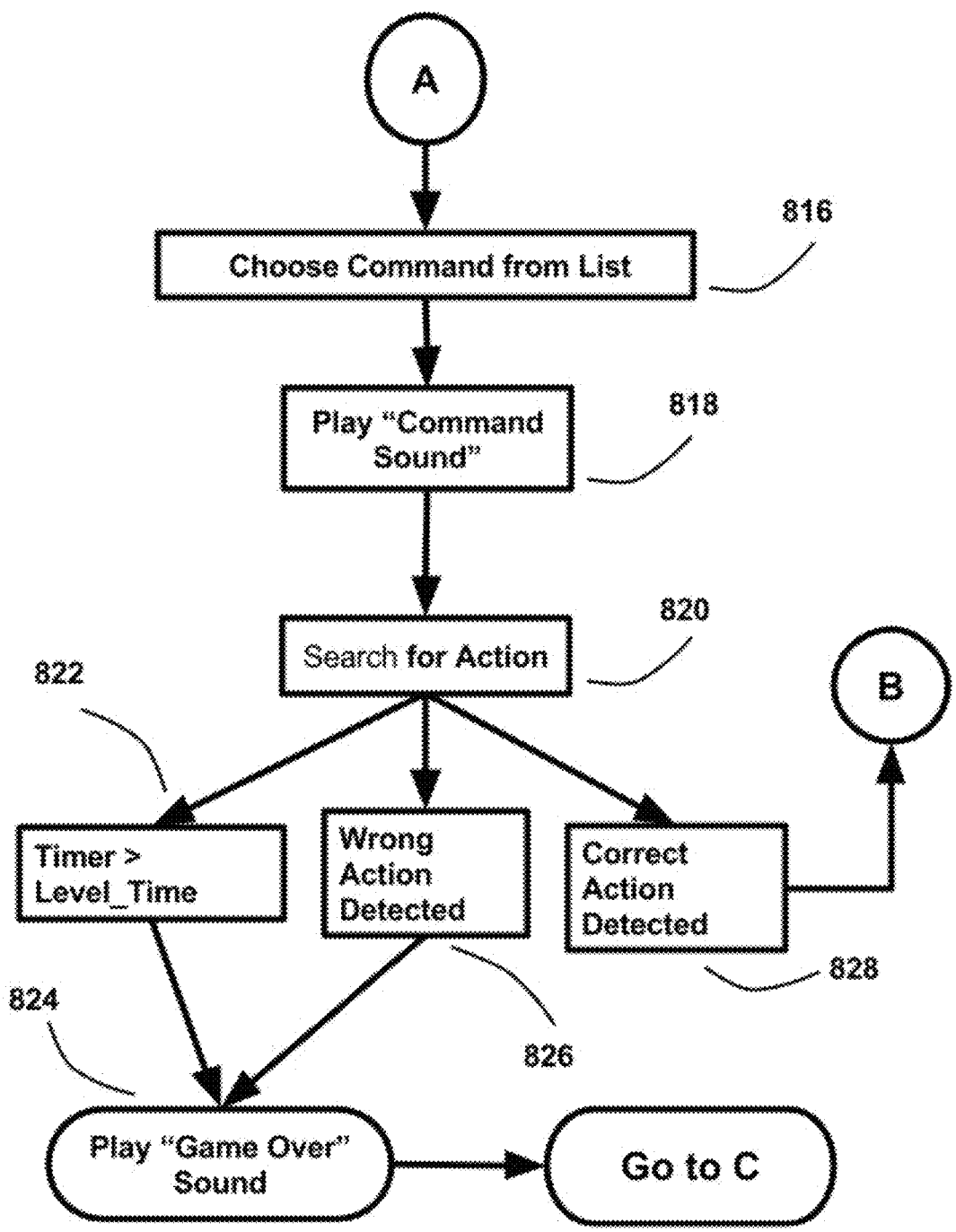
FIG. 8B illustrates a flowchart describing a mode of gameplay, according to one or more embodiments of the invention.

FIGS. 8A and 8B illustrate a flow chart for a game titled "Catch and Command," according to embodiments of the invention. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

In one embodiment, "Catch and Command" is a game in which the device senses the device has entered the air, prepares a command, waits until the device is no longer in air (most likely because the device has been caught by a user), then outputs the command through the speaker. Myriad different games can played that follow this format, but one such game is "red-green." The user catches the device and waits for the command which will either be "red" or "green" in various tones of voice. If the "green" sound is played the user must quickly pass the device to another player, while the "red" sound requires the user to hold onto the device and await the next command. Failure to perform the action within the allotted time, or doing the wrong action could result in a "game over." In some embodiments, "Catch and Command" may be viewed as similar in structure to "Dance Games," one difference being that the command generated in "Catch and Command" may be random, whereas in some embodiments, commands may be fixed in "Dance Games," depending on the song played.

The method 800 begins at a step 804, in which the device begins the game. In some embodiments, the device may already be in interactive mode as described herein when method 800 begins. This step may be in response to the user pressing a push button as in an optional step 806, or a power-on function, such as a push button or connecting a power supply such as batteries or AC adapter.

At a step 810, the time to complete the level (Level_Time) is set as a default time subtracted from a time associated with a difficulty level (Difficulty_Setting). In one embodiment, the higher the difficulty the game is set, the less time the user has to complete the level. At a step 812, a timer is started. At a step 814, a command is generated, and by way of example and not limitation, the command may be selected from the following table, which is not an exhaustive list of commands.

TABLE 8.1

Command Table

Spin
Hit
Twirl
Freeze
Shake
Toss
Green
Red

At a step 816, a command is chosen from Table 8.1. In some embodiments, commands selected may be a single command, or multiple commands in combination: any and all permutations of commands are contemplated.

At a step 818, a sound file associated with the chosen command from step 816 is played. In one embodiment, this sound file may alert the user as to the action to perform with the device (e.g., a sound file associated with the action 'twirl' may be produced, suggesting to the user that the user should twirl the device).

At a step 820, the device begins searching for actions performed by the user. In one embodiment, the action performed by the user may mirror the command expected by the device (i.e., the command generated from in Table 8.1). At a step 822, if the timer is greater than the level time, the game ends. At a step 824, the device plays a sound associate with a "game over" and the method ends, returns to step 802 or enters interactive mode, according to embodiments of the invention. In some embodiments, the timer functions as a motivator for the user to discern and perform the action expected by the device before the time to complete the level is spent.

At a step 826, the device may determine that the user has performed an incorrect action. In some embodiments, this step may occur regardless of whether the timer has run out. At a step 824, the device plays a sound associate with a "game over" and the method ends, returns to step 802 or enters interactive mode, according to embodiments of the invention.

At a step 828, the device may determine that the user has performed a correct action. In this case, the method returns to step 810 and the level time is decreased. In some embodiments, by performing the correct action, the user 'passes' the level and the next level is entered, and the time to complete the next level is reduced compared to the time to complete the previous level. In this manner, successive levels may be played by the user on the device. Each of these levels is more challenging than the next due to the reduced amount of time the user has to determine which action the device is expecting, again, based on the sound associated with the action that is produced by the device in step 818.

"Keep it Moving #1"

Figure 9:
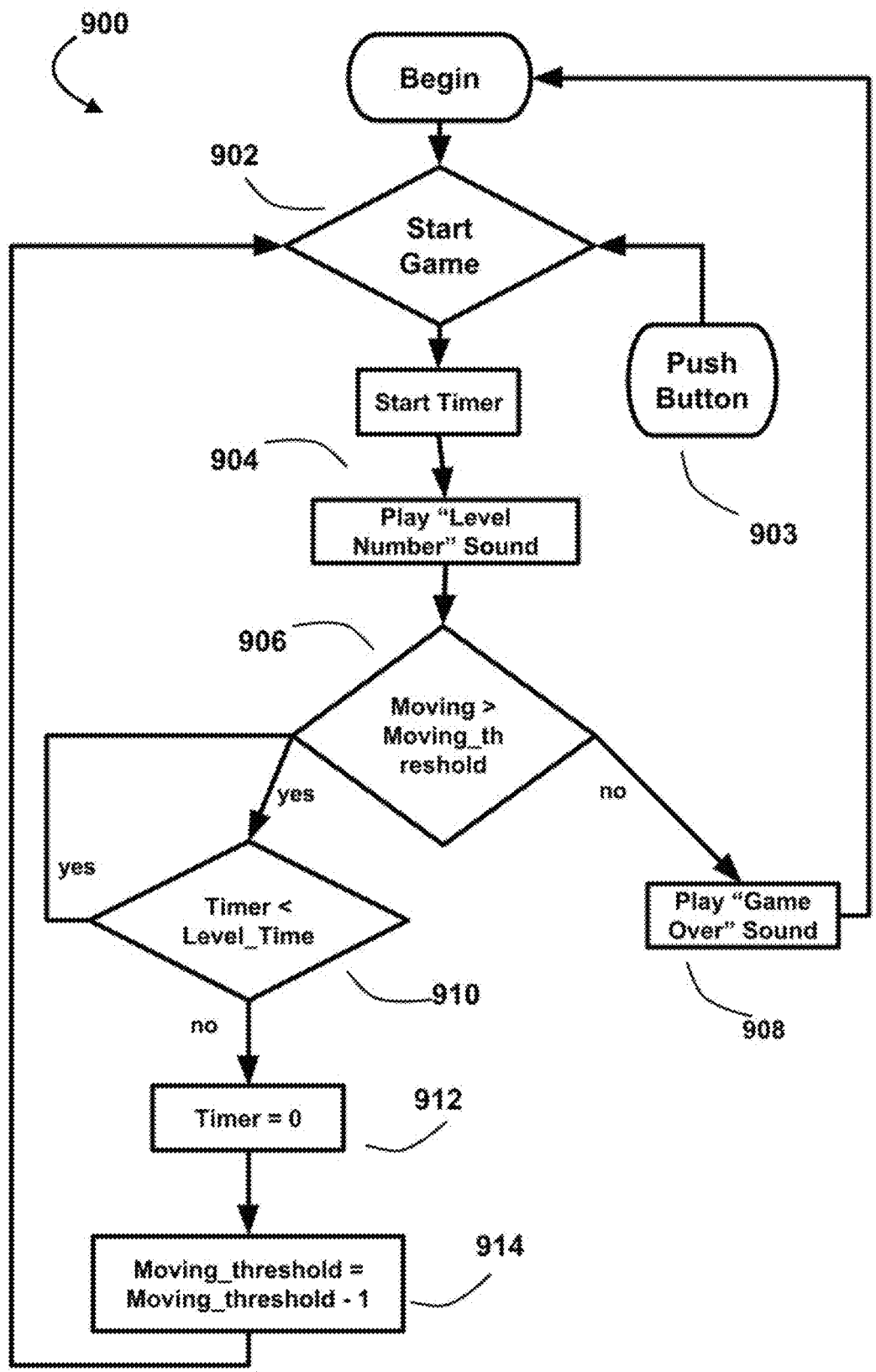
FIG. 9 illustrates a flowchart describing a mode of gameplay, according to one or more embodiments of the invention.

FIG. 9 illustrates a flow chart for a game titled "Keep it Moving #1." Persons skilled in the art will understand that any system configured to perform the method steps, in any order, falls within the scope of the present disclosure. The steps in this method are illustrative only and do not necessarily need to be performed in the order they are presented. Some steps may be omitted.

In one embodiment, "Keep it Moving #1" is intended to be a simple game for youngsters to keep the device moving for a predetermined amount of time. In this embodiment, movement may be generally defined as shaking, hitting, or other actions mentioned herein. The user may 'pass' a level of the game by moving the device in a manner greater than a predetermined moving threshold for a predetermined amount of time, and successive levels may increase in difficulty by altering the moving threshold and level time.

The method 900 begins at a step 902 in which the game begins. In some embodiments, the device may already be in interactive mode as described herein when method 900 begins. At an optional step 903, the game may begin in response to a user input such as using a push button, or a power-on function, such as connecting a power supply such as batteries or AC adapter. At a step 904, the device may play a sound associated with the current level number.

At a step 906, a subroutine for sustained movement, described in greater detail herein, is executed in order to determine whether the device is moving and as to whether moving exceeds the moving threshold. If movement of the device has not exceeded a predetermined minimum moving threshold, then, at a step 908, a "game over" sound may play and the method 900 returns to the beginning.

If, on the other hand, movement of the device has exceeded a predetermined minimum moving threshold, then, at a step 910, a check is performed as to whether the time played thus far exceeded the allotted time the user has to keep the device moving to complete the level. If the time played thus far has not exceeded the allotted time the user has to complete the level, then, the method returns to step 906.

If the time has exceeded the level time, at a step 912 the timer is set to zero. At a step 914, the moving threshold is reduced by a predetermined amount, in some embodiments, in anticipation of the next level. In this manner, the difficulty of the next level is increased by decreasing the moving threshold such successively played levels increase in challenge. The method 900 then returns to step 902.

"Keep it Moving #2"

Figure 10A:
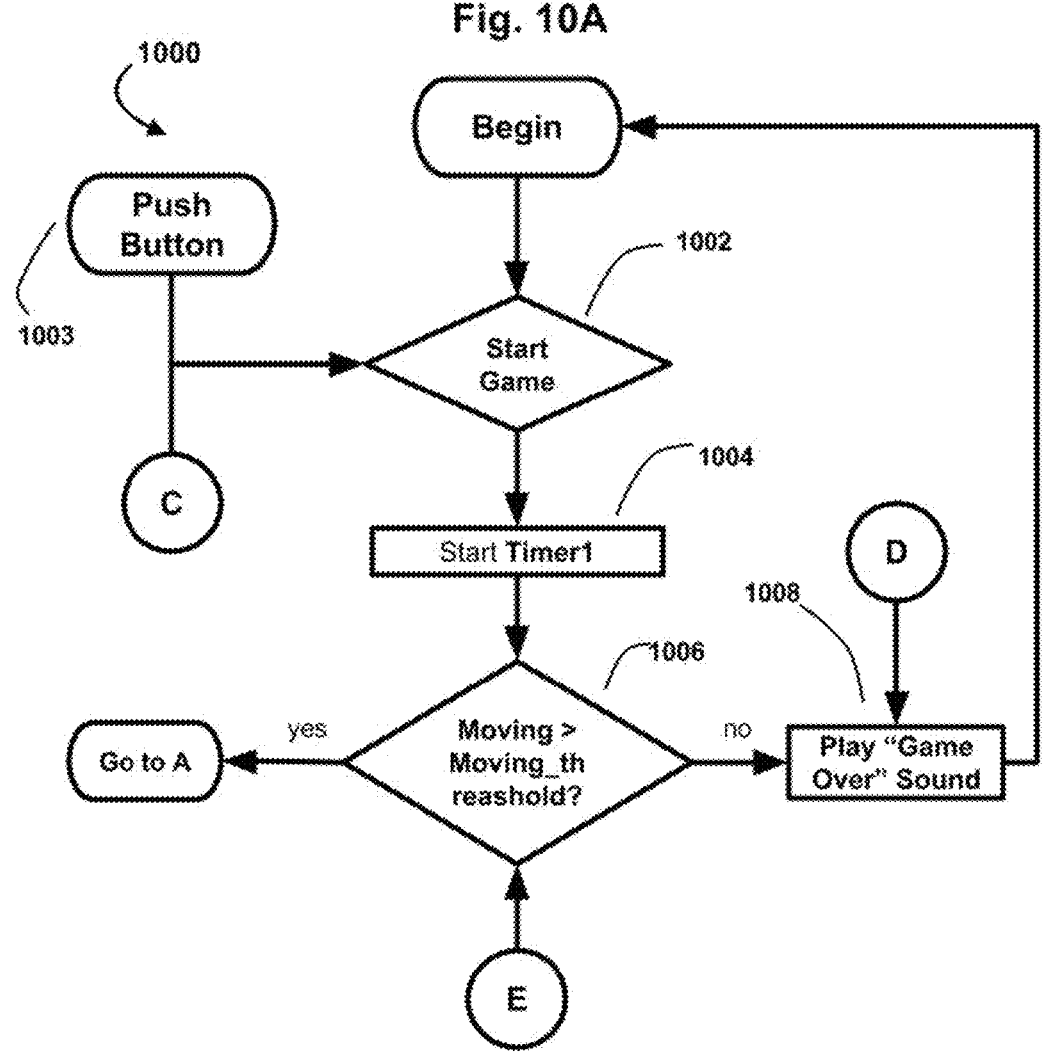
FIG. 10A illustrates a flowchart describing a mode of gameplay, according to one or more embodiments of the invention.
Figure 10B:
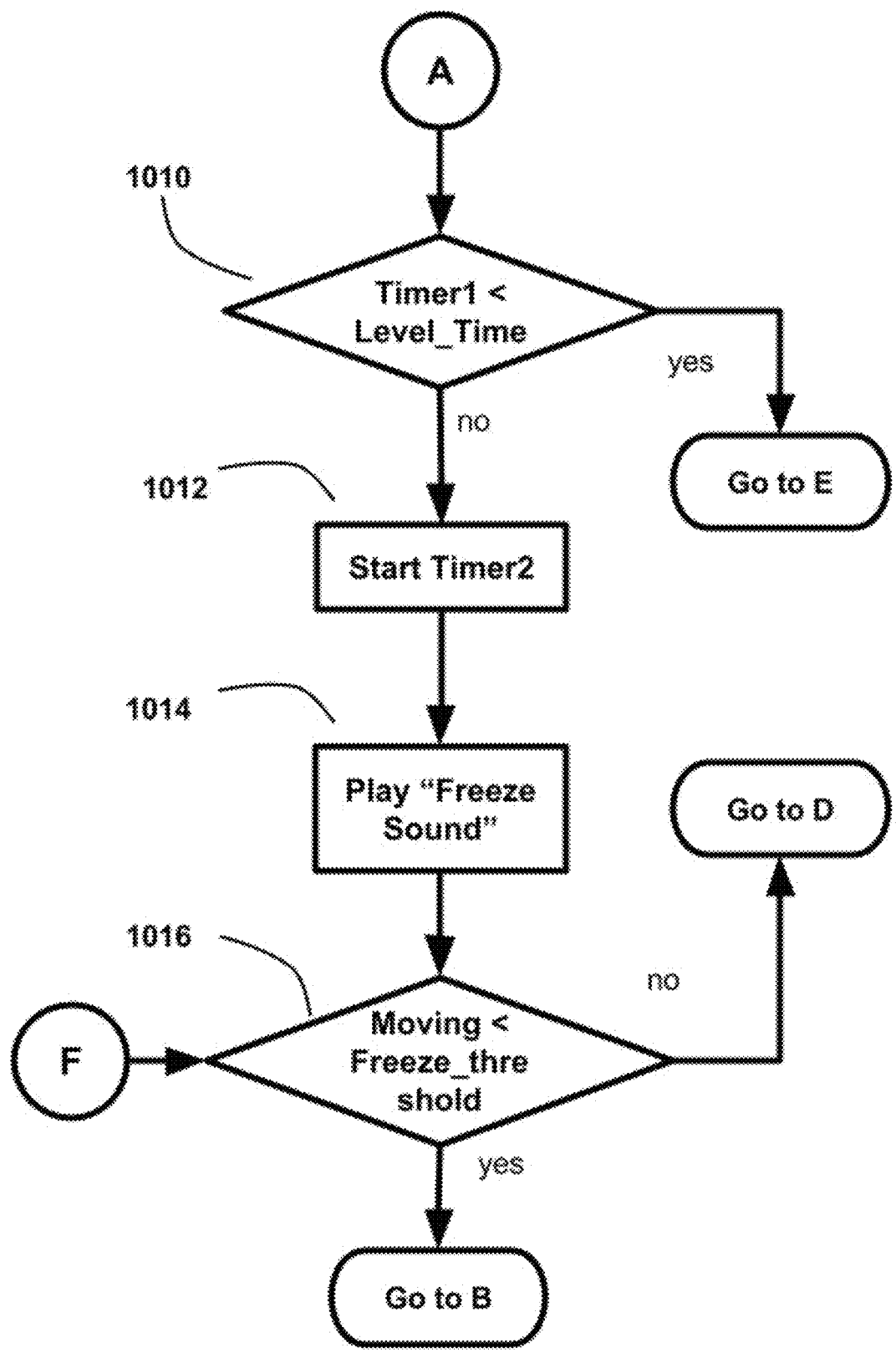
FIG. 10B illustrates a flowchart describing a mode of gameplay, according to one or more embodiments of the invention.
Figure 10C:
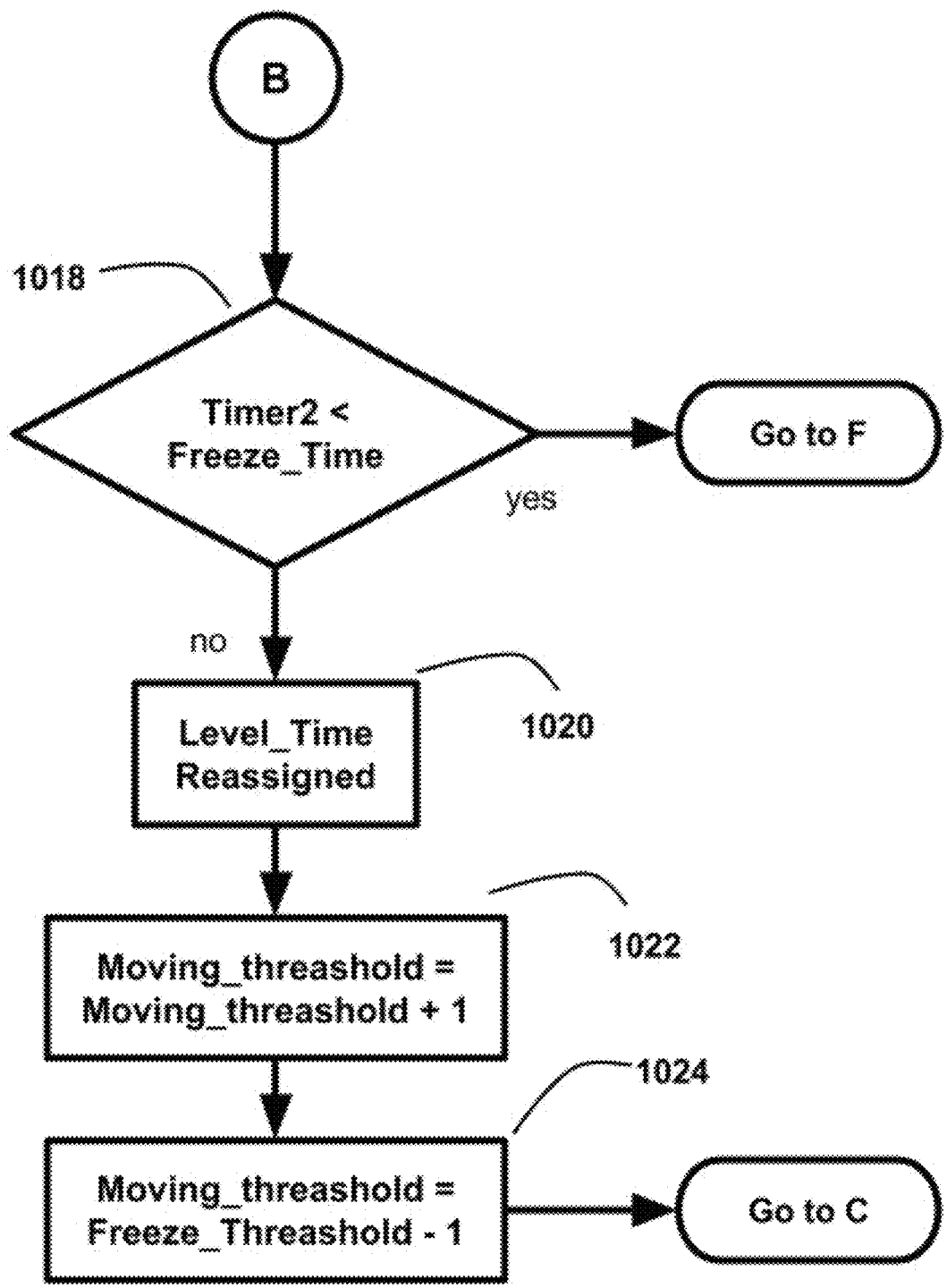
FIG. 10C illustrates a flowchart describing a mode of gameplay, according to one or more embodiments of the invention.

FIGS. 10A, 10B and 10C illustrate flow charts for a game titled "Keep it Moving #2" The steps in this method are illustrative only and do not necessarily need to be performed in the given order they are presented herein. Some steps may be omitted.

In one embodiment, "Keep it Moving #2" is intended to be a simple game for youngsters to keep the device moving for a predetermined amount of time. In this embodiment, movement may be generally defined as shaking, hitting, or other actions mentioned herein. The user may 'pass' a level of the game by moving the device in a manner greater than a predetermined moving threshold for a predetermined amount of time, and successive levels may increase in difficulty by altering the moving threshold and level time.

"Keep it Moving #2" differs from "Keep it Moving #1" in at least the following aspects: by employing a 'freeze time,' and a 'freeze threshold.' A player must keep the device moving (e.g., by hitting, shaking, etc.) until a 'freeze' sound is played. At this point, the goal is to stop moving the device. The player has a limited amount of time to react to the freeze sound, and if this time is exceeded, the player loses. If the player stops moving the device within the time allotted, the player passes the level and the next level is reached. This next level may have a shorter freeze time, thereby increasing the difficulty of successive levels.

The method 1000 begins at a step 1002, in which the game begins. In some embodiments, the device may already be in interactive mode as described herein when method 1000 begins. This step may be in response to the user pressing a push button as in an optional step 1003, or a power-on function, or connecting a power supply such as batteries or AC adapter. At a step 1004, a first timer is started. At a step 1006, a subroutine for sustained movement, described in greater detail herein, is executed in order to determine whether the device is moving and as to whether moving exceeds the moving threshold. If moving has not exceeded the moving threshold, at a step 1008, user loses, the game ends and the method 1000 returns to the beginning.

If, on the other hand, moving has exceeded the moving threshold, at a step 1010, a check is performed as to whether the first timer has exceeded the allotted level time. If the first timer not has exceeded the allotted level time, the method 1000 returns to step 1006 to ensure the device is still moving.

If the check from step 1010 results in the fact that the first timer has not exceeded the allotted level time, the method continues to a step 1012 in which a second timer is started. At a step 1014, a sound file associated with a "freeze" is played. In one embodiment, this sound may indicate to the player, who is currently moving the device, to stop moving the device.

At a step 1016, a check is performed to determine whether movement of the device exceeds a freeze threshold. If the check in step 1016 results in a 'no,' the method 1000 returns to step 1008 for a 'game over.' If the check in step 1016 results in a 'yes,' at a step 1018, a check is performed as to whether the second timer has exceeded a freeze time. If the check from step 1018 results in a 'yes,' the method 1000 returns to step 1016. If the check from step 1018 results in a 'no,' at a step 1020, the level time is reassigned. In one embodiment, if the method 1000 has progressed to the freeze section, the device may begin playing sound associated with freeze and checks to see if the user has moved the device at any point while the freeze sound is playing (this freeze sound may correspond to the countdown of the freeze timer). In this embodiment, when the freeze time has been spent (in one embodiment, the freeze sound may stop playing) and the user still hasn't moved the device, the user may pass the level.

At a step 1022, the moving threshold is adjusted, and at a step 1024, the freeze threshold is adjusted. In some embodiments, one or more of these thresholds are adjusted to increase the difficulty of play (e.g., the freeze thresholds are decreased such that the user has less time to react to a freeze sound before losing).

Maximum Acceleration Game #1

Figure 11A:
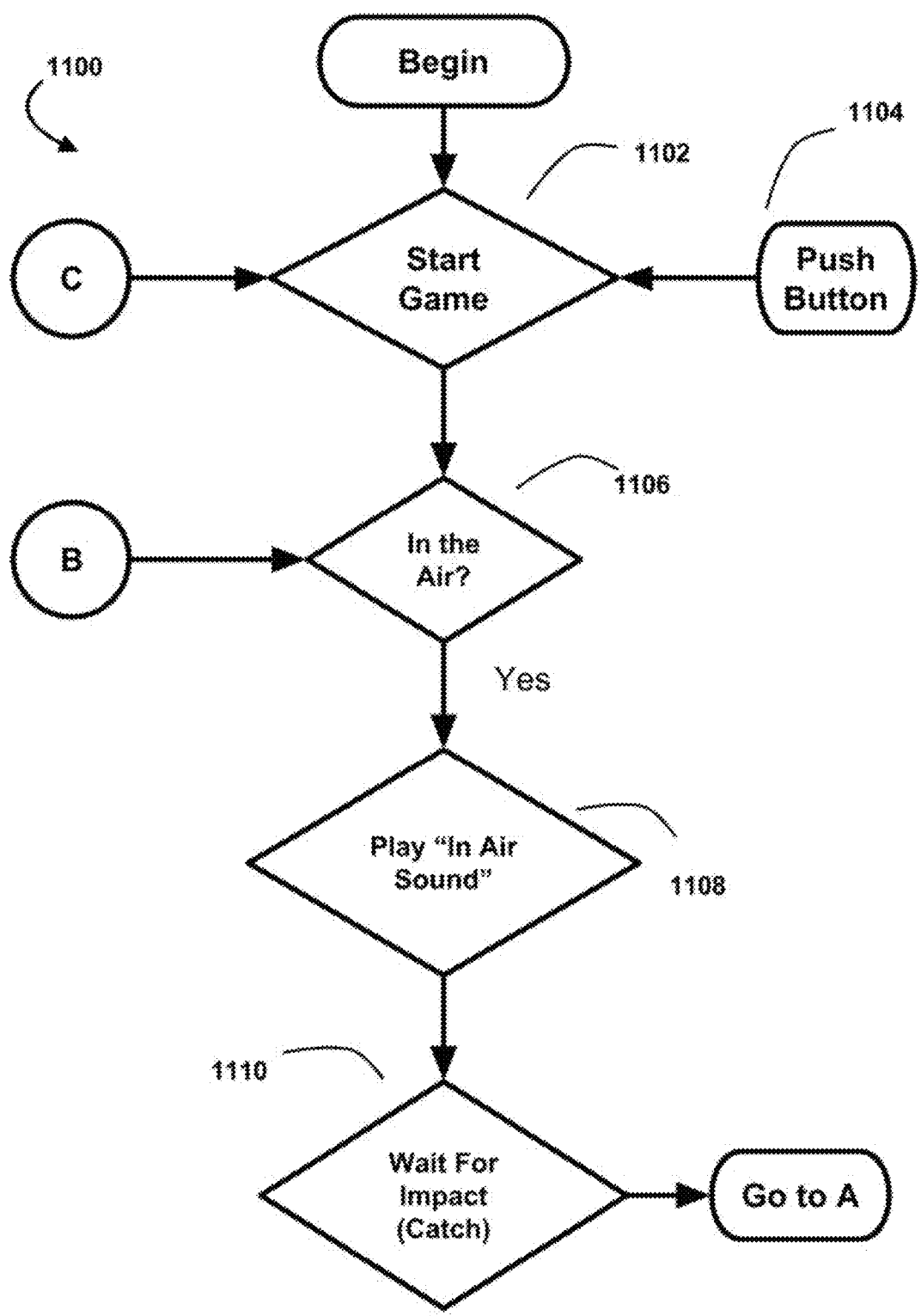
FIG. 11A illustrates a flowchart describing a mode of gameplay, according to one or more embodiments of the invention.
Figure 11B:
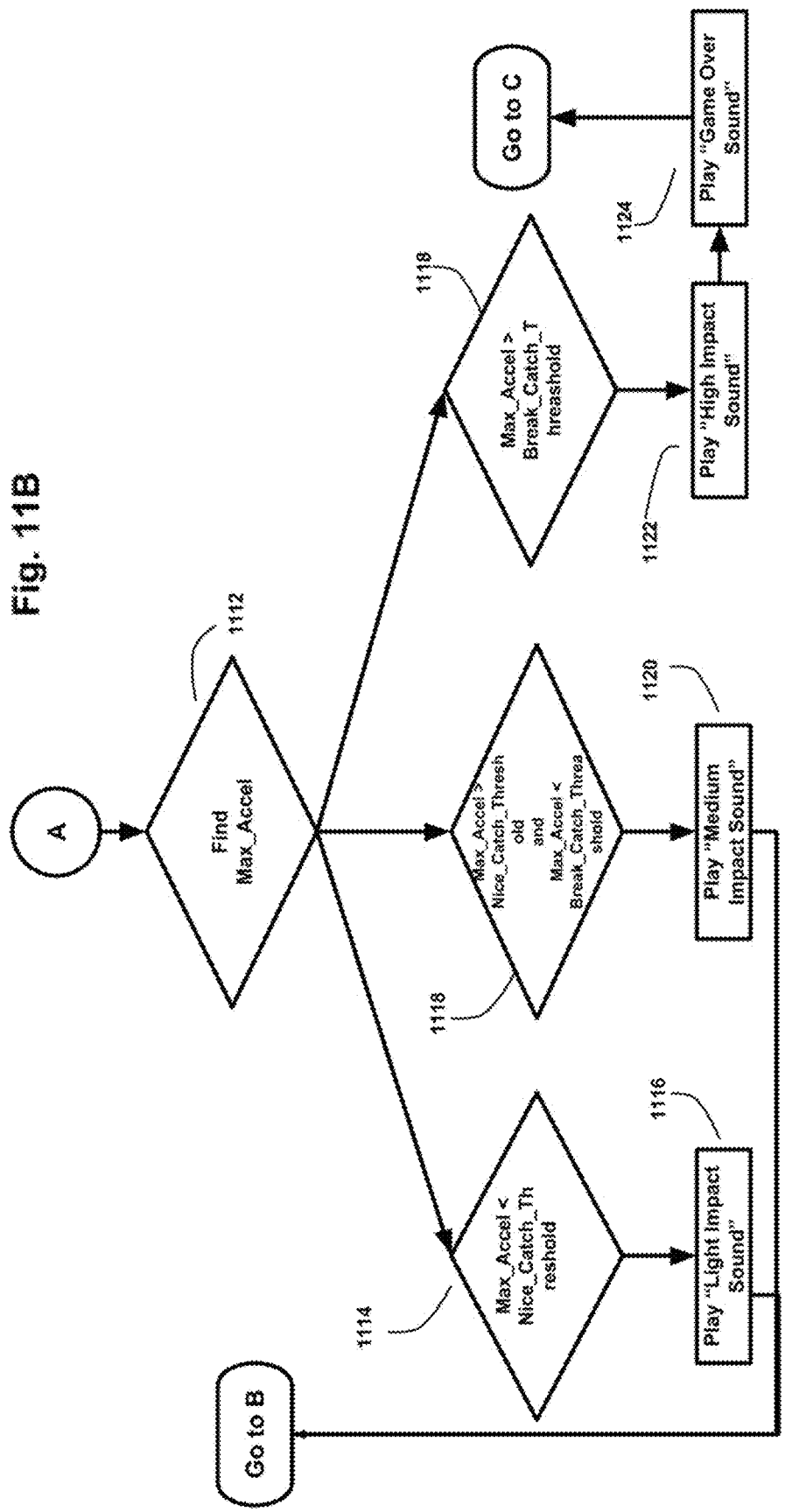
FIG. 11B illustrates a flowchart describing a mode of gameplay, according to one or more embodiments of the invention.

FIGS. 11A and 11B illustrate flow charts for a game titled "Maximum Acceleration Game #1," according to embodiments of the invention. Persons skilled in the art will understand that any system configured to perform the method steps, in any order, falls within the scope of the present disclosure. The steps in this method are illustrative only and do not necessarily need to be performed in the given order they are presented herein. Some steps may be omitted.

In one embodiment, "Maximum Acceleration Game #1," is intended to be a simple game for youngsters to throw the device into the air and catch the device lightly, with an amount of force less than a predetermined amount of force (e.g., a minimum acceptable catch force). Generally, if the device hits the ground (e.g., the youngster misses the catch), the peak force measured from the ground landing will exceed the minimum acceptable catch force by a measurable margin, and may be followed by indicia suggesting that the user has lost (e.g., the device may play an "egg-cracking" sound in response to impact with the ground). However, if the youngster can achieve a 'soft enough' landing (e.g., by gently catching the device) the youngster wins, and progresses to a higher difficulty level. In further embodiments, a "win" may be associated with an increase in challenge may be achieved by decreasing a minimum acceptable catch force, such the youngster is encouraged to throw the device in the air and catch it more gently than required in the previous level.

The method 1100 begins at a step 1102, in which the game begins. In some embodiments, the device may already be in interactive mode as described herein when method 1100 begins. At an optional step 1104, a push button or other function, such as connecting a power supply such as batteries or AC adapter, may cause the game to start. At a step 1106, the device performs a check to determine whether the device is airborne. If the device is not airborne, the device may remain in step 1106 until the device is airborne. If the device is airborne, at a step 1108, the device plays a sound file associated with being airborne. At a step 1110, the device waits until the device is no longer airborne.

At a step 1112, the device determines a peak force reading (maximum acceleration) associated with being caught or falling on the ground, recording said peak force reading as "Max_Accel." At a step 1114, Max_Accel is compared to a predetermined acceleration value associated with a "Light Catch" (i.e., Nice_Catch_Threshold). If Max_Accel is determined to be approximately equal to or less than the Nice_Catch_Threshold, then, at step 116, the device plays a sound file associated with a Light Catch (i.e., "Light Impact Sound") and the method returns to step 1106 to detect whether the device is airborne (as a result of an additional toss). In some embodiments, the device increases the difficulty before beginning the game routine anew, by modifying one or more values as discussed herein. By way of example and not limitation, values that may be modified to increase difficulty level include decreasing one or more of Nice_Catch_Threshold or Break_Catch_Threshold in order to encourage the user to catch the device ever more gently after successive tosses.

At a step 1118, if Max_Accel is determined to be greater than to Nice_Catch_Threshold, then Max_Accel is compared to Break_Catch_Threshold. If Max_Accel is greater than Nice_Catch_Threshold and less than Break_Catch_Threshold, then, at step 1120, the device plays the sound file associated with a "Medium Catch" (i.e., "Medium Impact Sound") and the method returns to step 1106 to detect whether the device is airborne (as a result of an additional toss). In some embodiments, the device increases the difficulty before beginning the game routine anew, by modifying one or more values as discussed herein. It is contemplated that medium catches may result in a different amount of points or a result of other rewards-based system than a light catch or a hard catch, and such rewards may be recorded and tracked for display on, by way of example and not limitation, social media websites or leaderboards and the like.

At a step 1120, if Max_Accel is determined to be greater than to Break_Catch_Threshold, the user loses. At a step 1122, the device plays a sound file associated with a "Hard Catch" (i.e., "High Impact Sound," e.g., an "egg-cracking" sound). This is followed by step 1124 in which a sound file associated with "Game Over." Finally, the method returns to step 1102 to begin the game routine again or enters interactive mode, according to embodiments of the invention. In one embodiment, the device maintains the current difficulty level to allow the user another attempt to pass the current level.

Maximum Acceleration Game #2

Figure 12B:
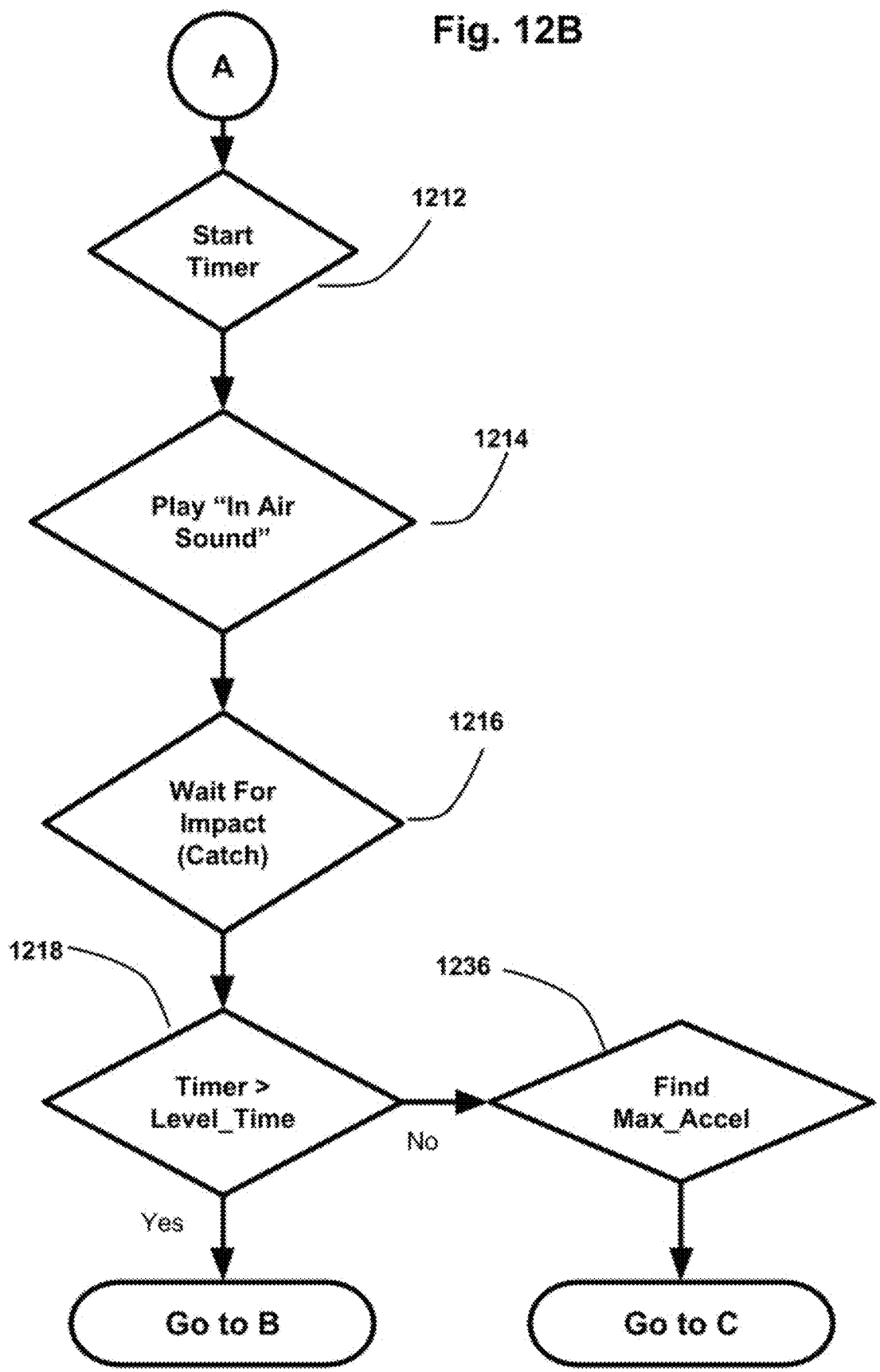
FIG. 12B illustrates a flowchart describing a mode of gameplay, according to one or more embodiments of the invention.
Figure 12C:
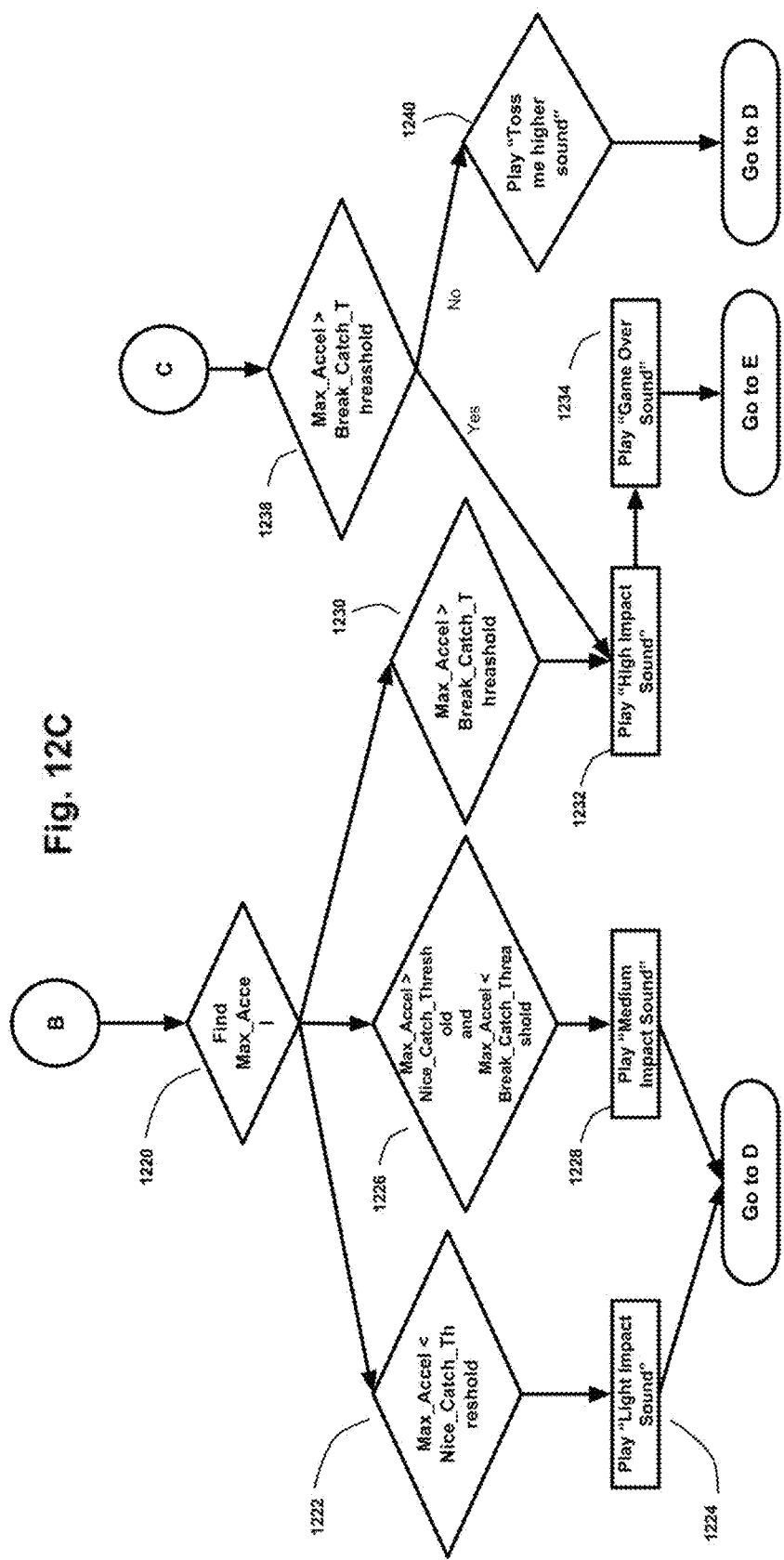
FIG. 12C illustrates a flowchart describing a mode of gameplay, according to one or more embodiments of the invention.

FIGS. 12A, 12B and 12C illustrate flow charts for a game titled "Maximum Acceleration Game #2," according to embodiments of the invention. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

In one embodiment, "Maximum Acceleration Game #2," is similar to "Maximum Acceleration Game #1," with one difference being that the device suggests to the user that the user toss the device higher and higher. The height of the toss may be measured by an in-air timer combined with a determination as to whether the device is airborne. If the user tosses the device and catches the device with too much force, the user loses, as in "Maximum Acceleration Game #1." If the user tosses the device at an insufficient height, but catches the device lightly, the device may suggest to the user to toss the device higher and or catch the device lightly. If the user tosses the device at a sufficient height and catches the device with a catch force less than a predetermined minimum acceptable catch force, the user 'wins' and may progress to the next level. Successive levels may require ever-higher tosses.

The method 1200 begins at a step 1202, in which the game begins. In some embodiments, the device may already be in interactive mode as described herein when method 1200 begins. At an optional step 1204, the game may begin using a push button or other function, such as connecting a power supply such as batteries or AC adapter. At a step 1206, the device plays a sound file associated with beginning the current level. In one embodiment, the device may play a sound associated with a first or zeroth level. At a step 1208, the level in incremented to start the player at a first level. At a step 1210, the device performs a check to determine whether the device is airborne. If the device is airborne, the method proceeds to step 1212 in which a timer is started. At a step 1214, the device may play indicia such as a sound file associated with being airborne. At a step 1216, the device waits for impact, such as from the user catching the device or the device hitting the ground. At a step 1218, after impact, a check is performed to determine whether the time in air has exceeded the predetermined time value for being airborne (Level_Time). In this step, the Level_Time may be the amount of time the device must spend in the air for the user to win the level.

If step 1218 results in a pass (the time the device spent airborne is sufficient), the method proceeds to step 1220, in which the device determines a peak force reading (maximum acceleration) associated with the recent impact recording said peak force reading as Max_Accel. At a step 1222, Max_Accel is compared to a predetermined acceleration value associated with a "Light Catch" (e.g., Nice_Catch_Threshold). If Max_Accel is determined to be approximately equal to or less than the Nice_Catch_Threshold, then, at step 1224, the device plays a sound file associated with a Light Catch (e.g., "Light Impact Sound"). Then, the method progresses to step 1250, in which a "pass level" sound may be played, indicating to the user that the user has completed the level. The device may increase the difficulty before beginning the game routine anew, by modifying one or more values as discussed herein. By way of example and not limitation, values that may be modified to increase difficulty level include decreasing one or more of Nice_Catch_Threshold or Break_Catch_Threshold or increasing Level_Time in order to encourage the user to catch the device ever more gently after successive, increasingly higher tosses.

At a step 1226, if Max_Accel is determined to be greater than Nice_Catch_Threshold, then Max_Accel is compared to Break_Catch_Threshold. If Max_Accel is greater than Nice_Catch_Threshold and less than Break_Catch_Threshold, then, at step 1228, the device plays a sound file associated with a "Medium Catch" (e.g., "Medium Impact Sound"). Again, then, the method progresses to step 1250, in which a "pass level" sound may be played, indicating to the user that the user has completed the level. The device may increase the difficulty before beginning the game routine anew, by modifying one or more values as discussed herein. It is contemplated that medium catches may result in a different amount of points or a result of other rewards-based system than a light catch or a hard catch, and such rewards may be recorded and tracked for display on, by way of example and not limitation, social media websites or leaderboards and the like.

At a step 1230, if Max_Accel is determined to be greater than to Break_Catch_Threshold, the user loses. At a step 1232, the device plays a sound file associated with a "Hard Catch" (i.e., "High Impact Sound," e.g., an "egg-cracking" sound). This is followed by step 1234 in which a sound file associated with "Game Over." Finally, the method returns to step 1202 to begin the game routine again or enters interactive mode, according to embodiments of the invention. In one embodiment, the device maintains the current difficulty level to allow the user to attempt to pass the current level.

If step 1218 does not result in a pass (the time the device spent airborne is insufficient), the method proceeds to step 1236 to find the maximum acceleration of the recent impact. At a step 1238, a check of Max_Accel against Break_Catch_Threshold is performed.

If Max_Accel is determined to be less than Break_Catch_Threshold, the method progresses to a step 1240, in which the device may play indicia such as a sound file indicating to the user that the user should toss the device higher. In one embodiment, this state describes an successfully light enough catch (either a light or medium impact as described herein), but an insufficiently high enough toss, thus the user is given a chance to play again and achieve a sufficiently high toss. However, if Max_Accel is determined to be greater than to Break_Catch_Threshold, the user loses, and the method progresses to step 1232 as described herein.

"Thumper Game #1"

Figure 13B:
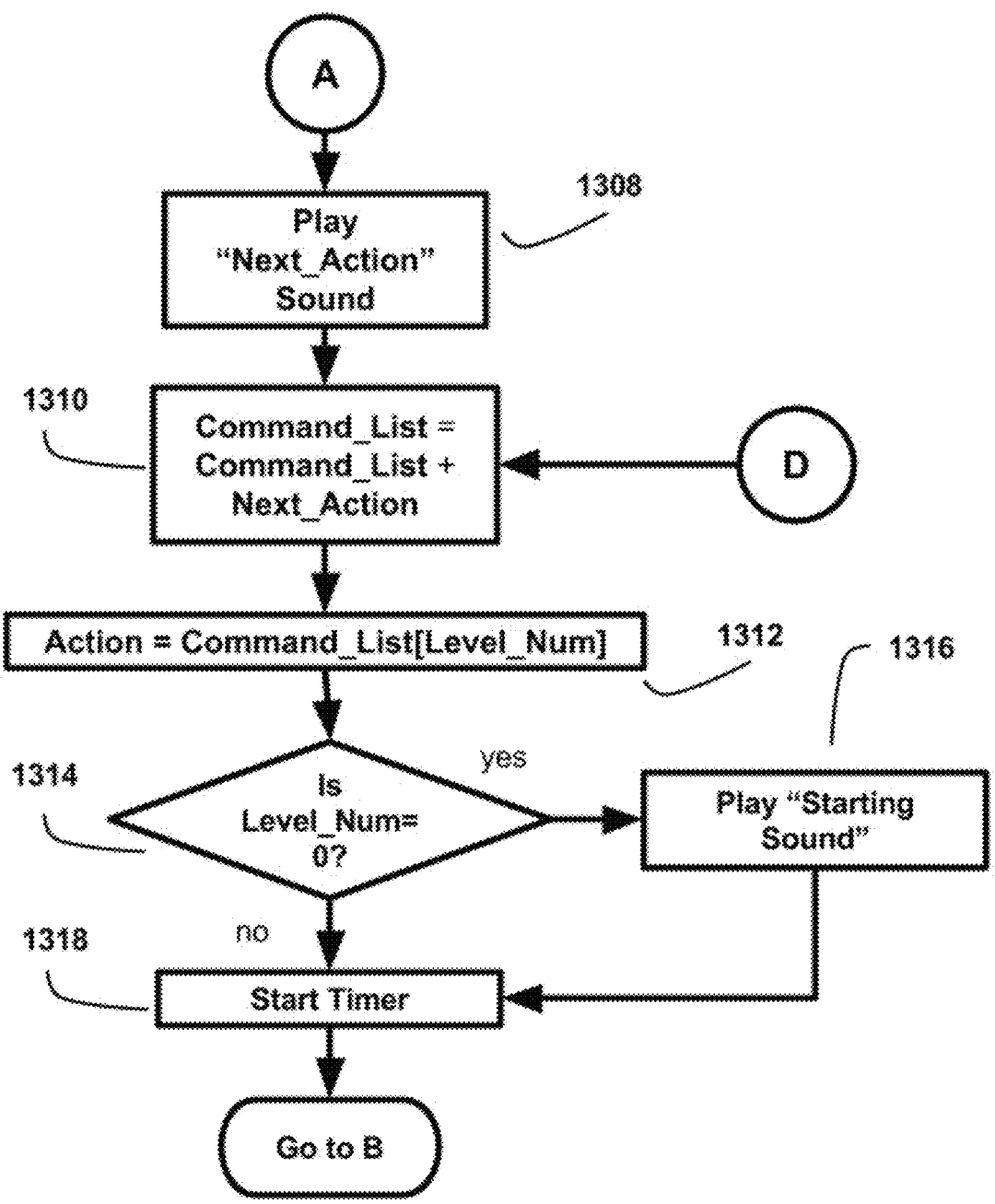
FIG. 13B illustrates a flowchart describing a mode of gameplay, according to one or more embodiments of the invention.
Figure 13C:
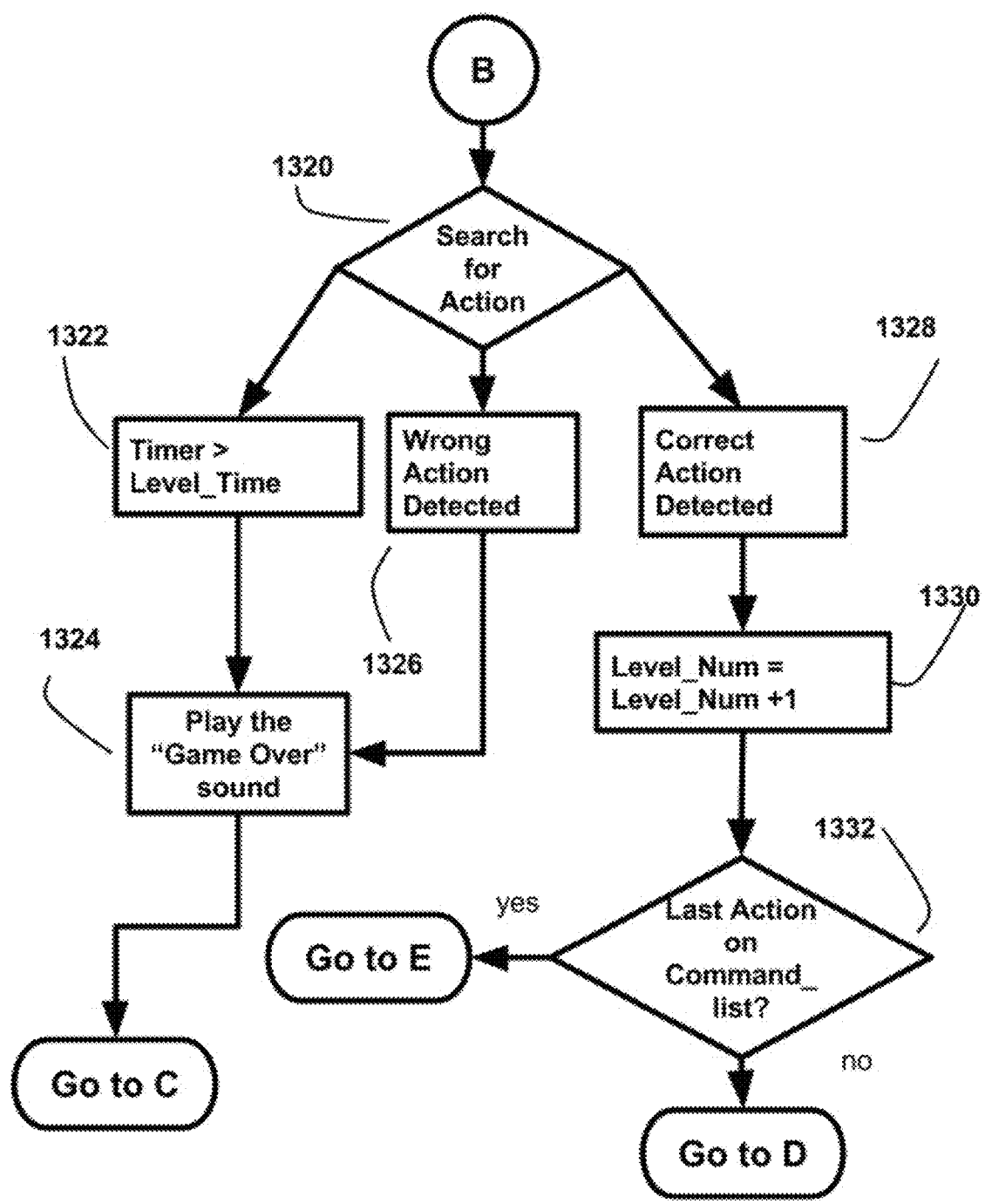
FIG. 13C illustrates a flowchart describing a mode of gameplay, according to one or more embodiments of the invention.

FIGS. 13A, 13B and 13C illustrate flow charts for a game titled "Thumper Game #1," according to embodiments of the invention. The steps in this method are illustrative only and do not necessarily need to be performed in the given order they are presented herein. Some steps may be omitted completely.

In this embodiment, "Thumper Game #1" may be viewed as a game that challenges multiple types of learning styles, including bodily-kinesthetic and musical intelligences. In this embodiment, "Thumper Game #1," the device chooses actions and pushes them on to a stack. Then, the device encourages the user to perform one or more actions from the stack by playing sounds associated with the actions to be performed. Thus, the user is enticed into to remembering the actions to be performed, based on sounds emitted by the device and/or previous inputs the user has given, and then perform them on the device. If a wrong action is detected, the game ends and the user loses. If the correct action is detected, the level is incremented, the player advances and the next action to be performed is pushed onto the stack. The stack of actions to be performed grows, and in one embodiment, the user is encouraged to perform all the prior actions sequentially in order to advance. In a further embodiment, the level time (time to complete the action) may be decreased, thus giving the user less time to remember the right action to perform. This is done in an effort to increase difficulty for each level.

The method 1300 begins at a step 1302, in which the game begins. In some embodiments, the device may already be in interactive mode as described herein when method 1300 begins. At an optional step 1304, the game may begin via a push button or connecting a power supply such as batteries or AC adapter. At a step 1306, the device may choose a new action to perform (i.e., Next_Action), either randomly or from a predetermined list (e.g., from Table 8.1: Command List). At a step 1308, the device plays a sound associated with the next action. At a step 1310, the action is added to a list (i.e., Command_List). At a step 1312, the current action expected by the device to be performed by the user is selected. At a step 1314, a check is performed to determine whether the game has just started (whether the level number is zero). If the game has just started, at a step 1316, the device may play a sound associated with the start of Thumper Game #1. If the game has not just started, at a step 1318, a timer is started.

At a step 1320, the device enters an action searching mode. At a step 1322, If the device spends too much time in action searching mode, i.e., if the timer exceeds the level time, the user loses. At a step 1324, a sound associated with game over is played and the method returns to the beginning. Alternatively, if the time in action does not exceed the level time, but the user performs the wrong action, at a step 1326, the device determines that a wrong action has been performed, the user loses, and the method again proceeds to step 1324. However, if the time in action does not exceed the level time, and the user performs the correct action, at a step 1330 the level number is increased and the user proceeds to the next step. At a step 1332, a check is performed to determine whether the most recent action performed by the user is the last user on the command list that remains to be performed. In one embodiment, this is the last action on the list of multiple actions that the user is encouraged to remember to perform (hence the challenge of Thumper Game #1).

If the check results in a last action on command list, the method proceeds to a step 1334, in which the difficulty may be increased by reducing the amount of time to complete the next level based on difficulty setting. At a step 1336, the level number is set to 0 so a new list of commands can be generated, since the game has been completed at this point. The method proceeds to step 1306 to choose a new first action. Alternatively, if the check results in a last action on command list, the method proceeds to step 1310 to pop the next command off of the command list for the user to perform. In one embodiment, the method continues to pop off one or more or all of the commands off command list until the user wins, or a wrong action is detected and the user loses, resulting in a "game over."

"Thumper Game #2"

Figure 14A:
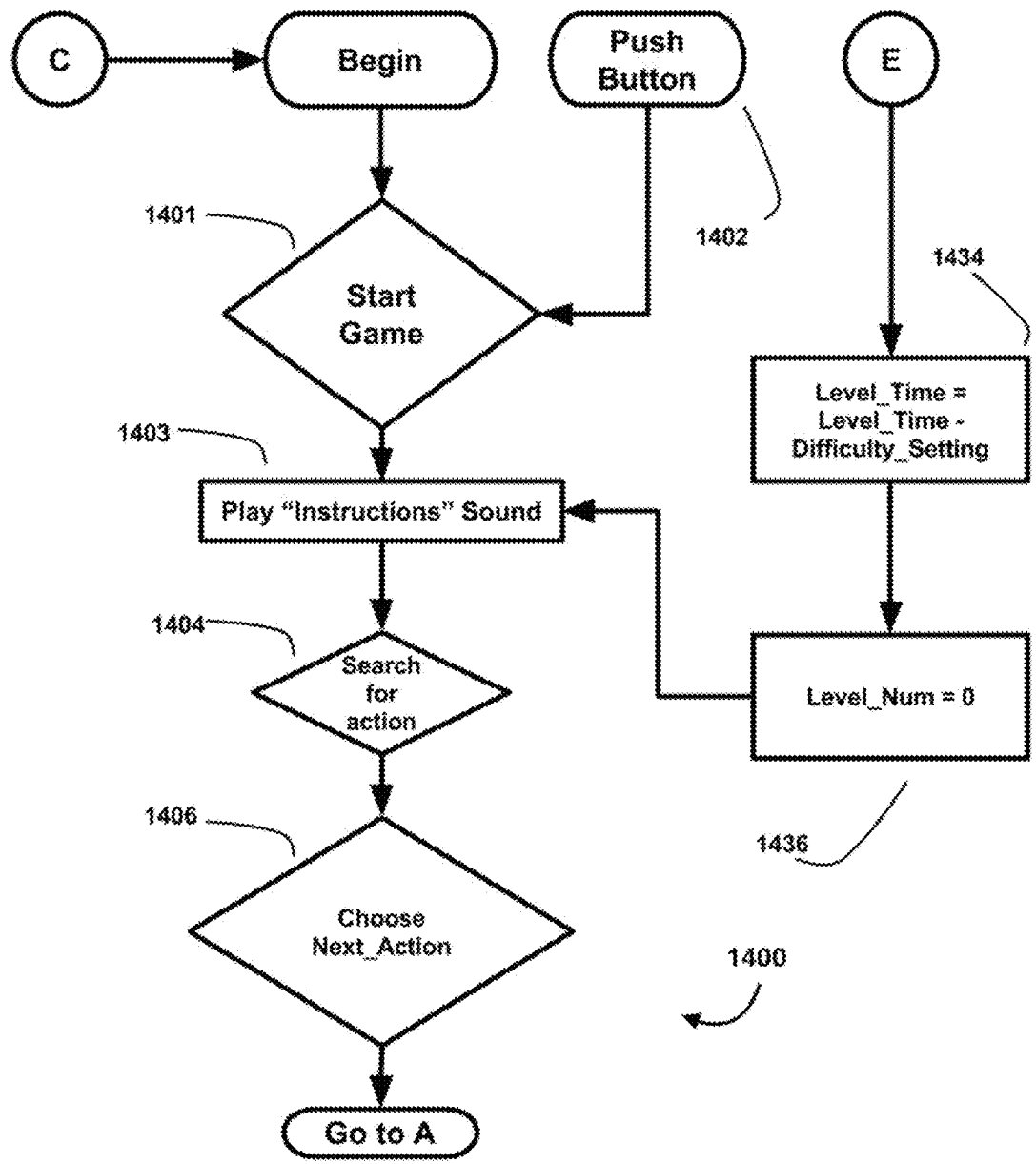
FIG. 14A illustrates a flowchart describing a mode of gameplay, according to one or more embodiments of the invention.
Figure 14B:
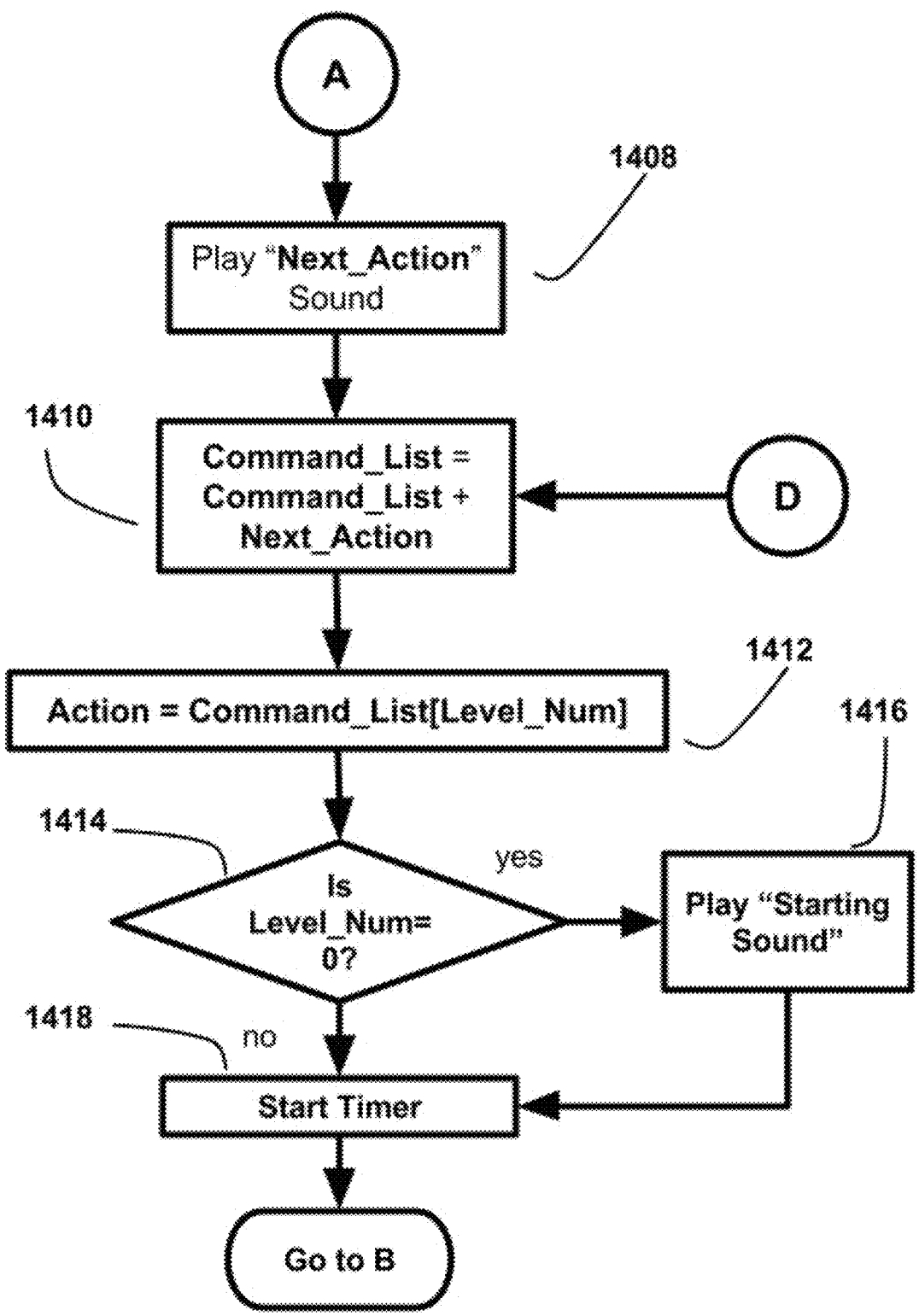
FIG. 14B illustrates a flowchart describing a mode of gameplay, according to one or more embodiments of the invention.
Figure 14C:
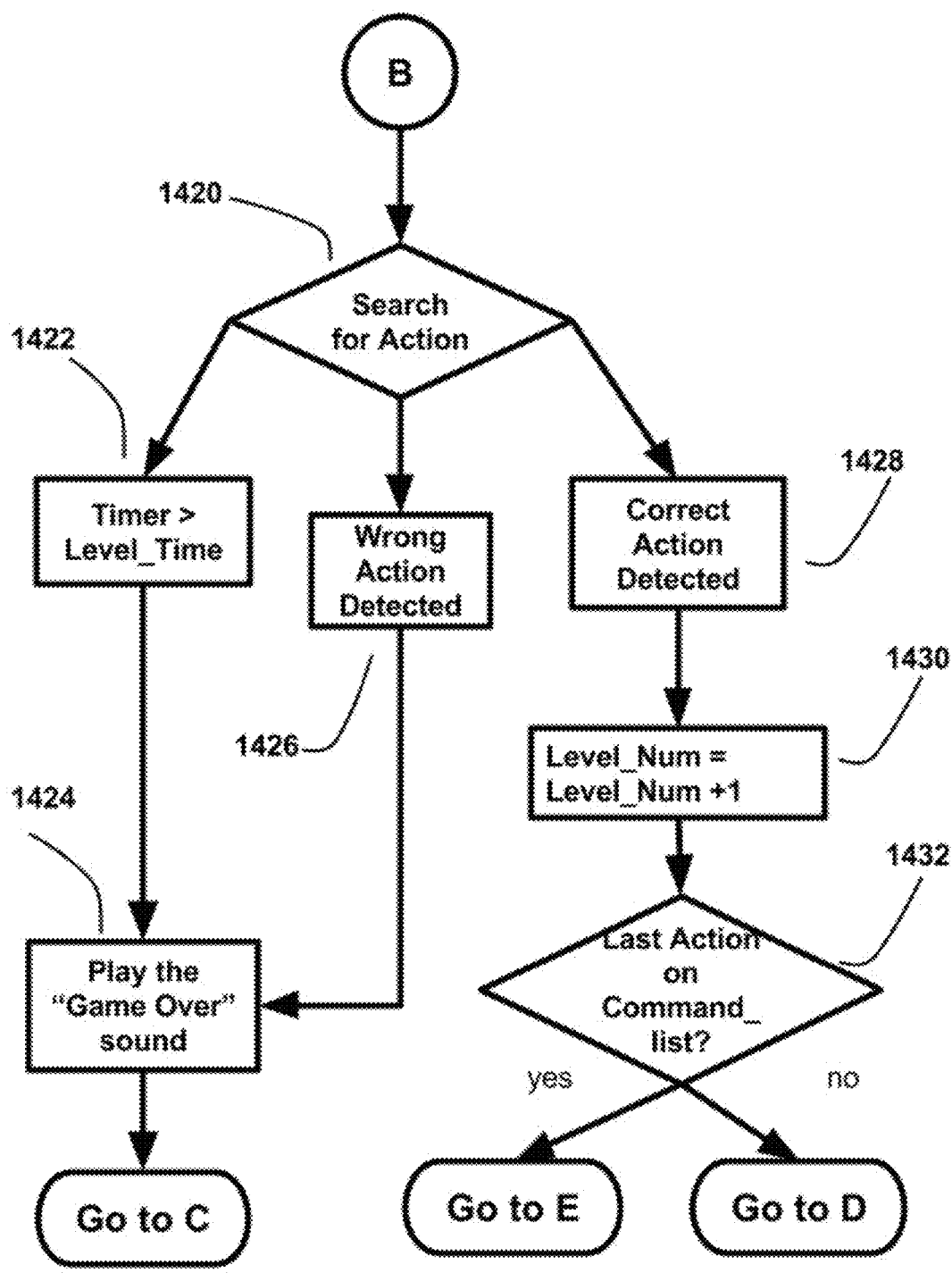
FIG. 14C illustrates a flowchart describing a mode of gameplay, according to one or more embodiments of the invention.

FIGS. 14A, 14B and 14C illustrate flow charts for a game titled "Thumper Game #2," according to embodiments of the invention. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

In one embodiment, "Thumper Game #2" is similar to "Thumper Game #1," but differs in a crucial way: instead of the device choosing the next action, the user is allowed to choose the next action. Thus the command list becomes populated with actions selected by the user rather than device-selected actions. One or more users may play this game, as the device may be passed to the next user to add to the growing list of commands after remembering and performing all the commands that the previous user(s) have performed.

The method 1400 begins at a step 1401, in which the game begins. In some embodiments, the device may already be in interactive mode as described herein when method 1400 begins. At an optional step 1402, the game may begin via a push button or connecting a power supply such as batteries or AC adapter. At a step 1403, the device may play indicia such as a sound file associated with instructions. At a step 1404, the device may search for the user to perform an action on the device (e.g., hit, shake, etc.).

At a step 1406, the device may choose the action to perform (Next_Action), based on the user's last action performed on the device. At a step 1408, the device plays a sound associated with the next action. At a step 1410, the action is added to a list (Command_List). At a step 1412, the current action expected by the device to be performed by the user is selected. At a step 1414, a check is performed to determine whether the game has started. If the game has just started, at a step 1416, the device may play a sound associated with the start of Thumper Game #2. If the game has not just started, at a step 1418, a timer is started.

At a step 1420, the device again enters an action searching mode. At a step 1422, if the device spends too much time in action searching mode, i.e., if the timer exceeds the level time, the user loses. At a step 1424, a sound associated with game over is played and the method returns to the beginning. Alternatively, if the time in action does not exceed the level time, but the user performs the wrong action, at a step 1426, the device determines that a wrong action has been performed, the user loses, and the method again proceeds to step 1424. However, if the time in action does not exceed the level time, and the user performs the correct action, at a step 1430 the level number is increased and the user proceeds to the next step. At a step 1432, a check is performed to determine whether the most recent action performed by the user is the last user on the command list that remains to be performed. In one embodiment, this is the last action on the list of multiple actions that the user is encouraged to remember to perform (hence the challenge of Thumper Game #2).

If the check results in a last action on command list, the method proceeds to a step 1434, in which the difficulty may be increased by reducing the amount of time to complete the next level based on difficulty setting. At a step 1436, the level number is set to 0 so a new list of commands can be generated, since the game has been completed at this point. The method proceeds to step 1406 to choose the a new first action. Alternatively, if the check results in a last action on command list, the method proceeds to step 1410 to pop the next command on the command list for the user to perform. In one embodiment, the method continues to pop off one or more or all of the commands off command list until the user wins, or a wrong action is detected and the user loses, resulting in a "game over."

Continuously In-Air Game

Figure 15A:
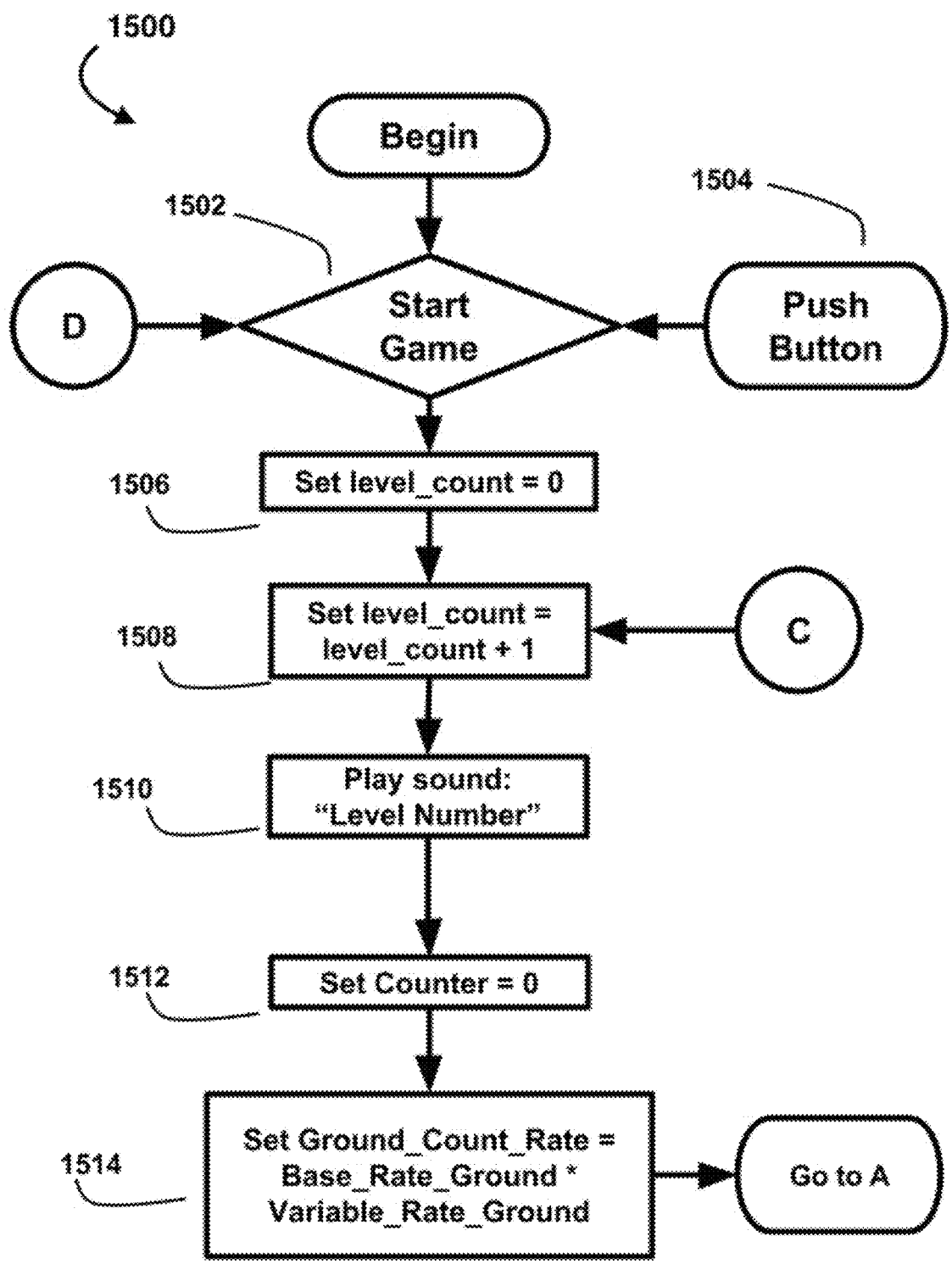
FIG. 15A illustrates a flowchart describing a mode of gameplay, according to one or more embodiments of the invention.
Figure 15B:
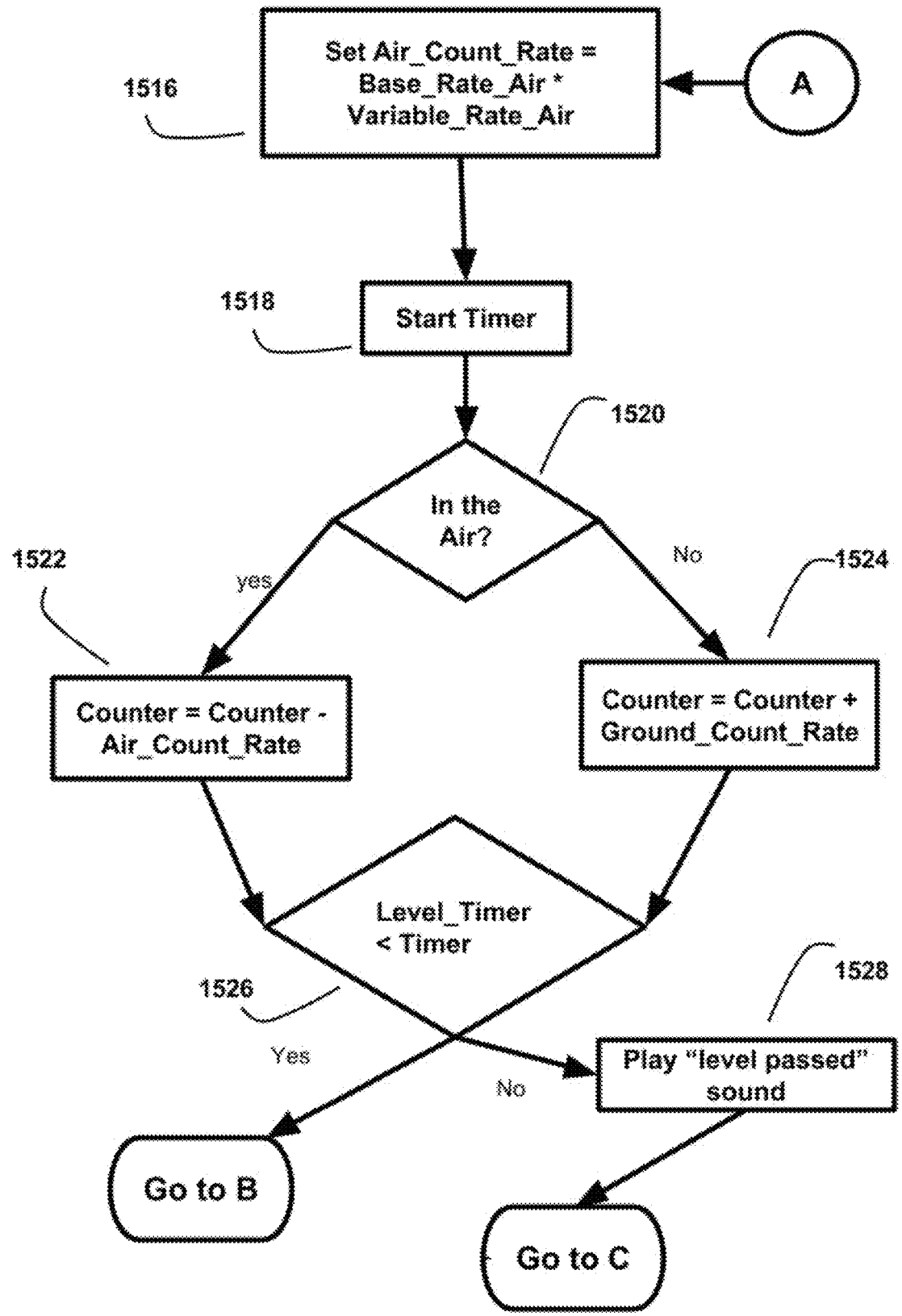
FIG. 15B illustrates a flowchart describing a mode of gameplay, according to one or more embodiments of the invention.
Figure 15C:
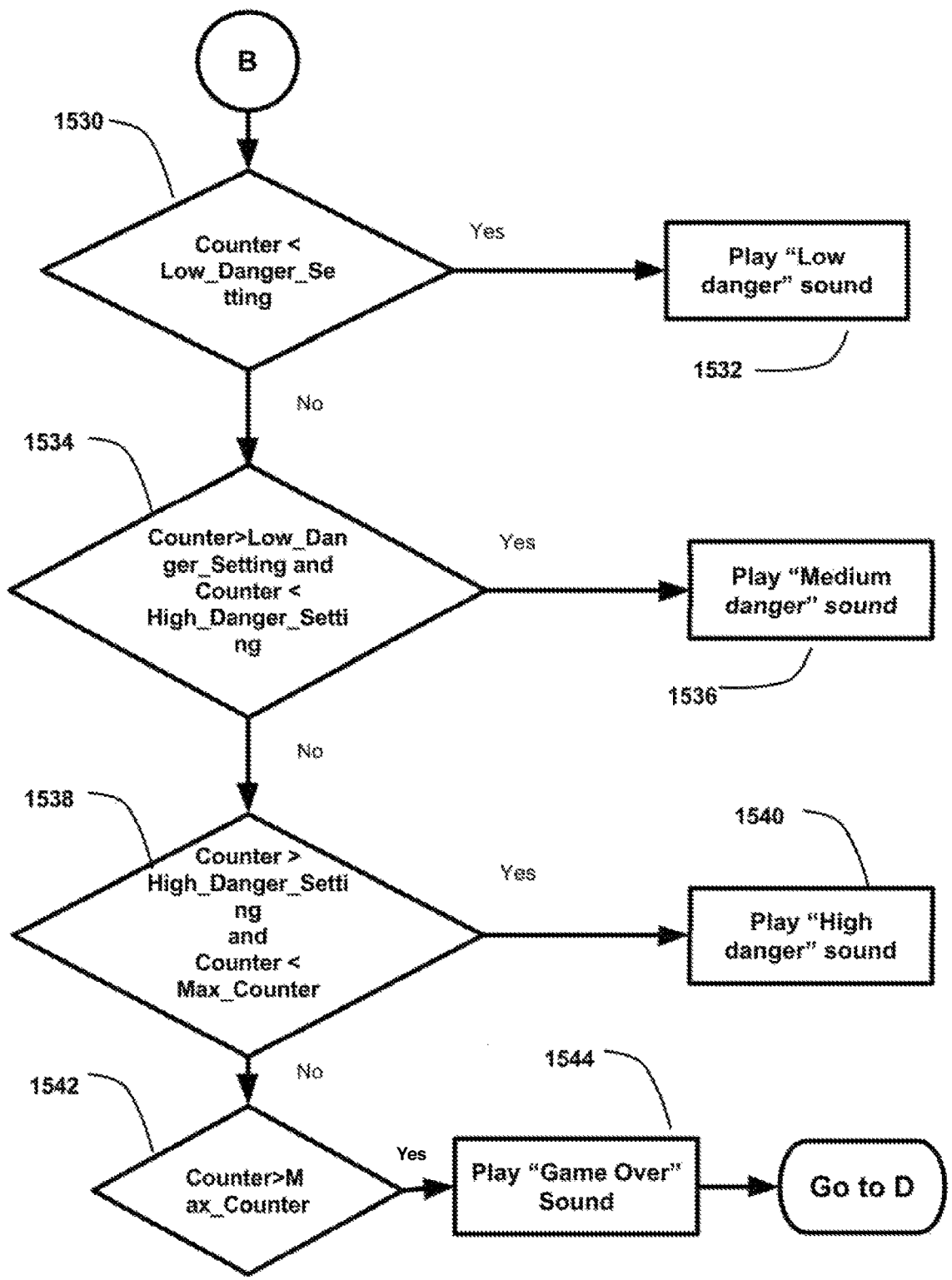
FIG. 15C illustrates a flowchart describing a mode of gameplay, according to one or more embodiments of the invention.

FIGS. 15A, 15B and 15C illustrate flow charts for a game titled "Continuously In-Air Game," according to embodiments of the invention. The steps in this method are illustrative only and do not necessarily need to be performed in the given order they are presented herein. Some steps may be omitted.

In one embodiment, the "Continuously In-Air Game" is similar to the popular game of "hot potato." The goal of this game is for the user(s) to keep the device in the air as long as possible. This can be achieved by continuously passing the device around amongst a circle of friends or for one player to keep it in the air by repeatedly tossing the device. The device may keep track of the time spent in air versus the time spent not in the air (e.g., on the ground, in the user's hands) by using a "ground count rate" and an "air count rate," respectively. In a further embodiment, the game may be determined to be won or lost based on the time spent in each, or a time-related value. The difficulty of the game may be increased by using coefficients that modify the value of the time spent in air versus the time spent on the ground.

The method 1500 begins at a step 1502 in which the game starts. In some embodiments, the device may already be in interactive mode as described herein when method 1500 begins. At an optional step 1504, the game may begin via a push button or connecting a power supply such as batteries or AC adapter. At a step 1506, the level count is set to zero. At a step 1508, the level count is incremented to a first level. At a step 1510, the device may play a sound associated with the current level. At a step 1512, the counter is set to zero. At a step 1514, the ground count rate is multiplied by a coefficient to adjust for difficulty (Variable_Ground_Rate). At a step 1516, the count rate is multiplied by a coefficient to adjust for difficulty (Variable_Air_Rate). Steps 1514 and 1516 may be performed in any order not just as described in FIG. 15A At a step 1518, a timer is started. At a step 1520, the device enters a search mode to determine whether the device is airborne. If the device is airborne, at a step 1522, the device increments the air counter. If the device is not airborne, at a step 1524, the device increments the ground counter. At a step 1526, a comparison is made between the level timer and the timer. If the level timer is greater than the timer, then the user wins the level, and at a step 1528, the device plays a sound associated with the level having been passed. The method then proceeds to step 1508, in which the level is incremented and the game continues.

If the level time is less than the timer in step 1526, the method proceeds to a step 1530 in which a comparison is made between the counter and a low danger setting. If the counter is less than the low danger setting, then at a step 1532, the device plays a sound associated with "low danger". If not, at a step 1534, the counter is compared to a range between a low danger setting and a high danger setting. If the counter falls approximately within this range, then, at a step 1536, the device may play a sound associated with "medium danger." At a step 1538, the counter is compared to a range between a high danger setting and a max danger setting. If the counter falls approximately within this range, then at a step 1540, the device may play a sound associated with "high danger." At a step 1542, a comparison is made between the counter and the max counter. If the counter is greater than the max counter, the user loses, and at a step 1544, the device may play a sound associated with game over, and the method proceeds to start at the beginning.

Flow Chart and Accelerometer Signatures, FIGS. 16-23

In some embodiments of the invention, the device may detect forces the device undergoes and make determinations of the type of motion underwent by comparing sensor readings with chosen values. Flowcharts describing the methods in which sensor readings are compared with chosen values follow.

FIG. 16: Twirl Detection

FIGS. 16A and 16B show a flow chart and accelerometer signature associated with detection of a twirl state, according to embodiments of the invention. The steps in this method are illustrative only and do not necessarily need to be performed in the given order they are presented herein. Some steps may be omitted completely.

The method 1600 begins with a step 1604, in which a twirl timer is set to zero. At a step 1606, an acceleration check is performed to determine whether the acceleration of the device is less than a chosen value. In one embodiment, this chosen value is 1.7 g. If the check from step 1606 results in a 'no,' at a step 1608, the determination is made that the device is not twirling. If the check from step 1606 results in a yes, at a step 1610, the twirl timer is started. At a step 1612, an acceleration check is performed to determine whether the acceleration of the device is less than a chosen value. In one embodiment, this chosen value is 1.7 g. If the check from step 1612 results in a 'no,' the method 1600 returns to step 1608, a determination is made that the device is not twirling, and the method 1600 ends.

If the check from step 1612 results in a yes, at a step 1614, a determination is made as whether an air timer is greater than a chosen value. In one embodiment, this chosen value is 0.5 seconds. If the check from step 1614 results in a 'no,' the method 1600 returns to step 1612. If the check from step 1614 results in a 'yes,' in a step 1616, the determination that the device is twirling is made, and the method 1600 ends.

FIG. 16B shows an accelerometer signature associated with the device in a twirl state, according to embodiments of the invention. In one embodiment, a sensed accelerometer information may be data recorded by the accelerometer during, by way of example and not limitation, a movement of the device such as a child throwing the device in the air.

The device may also be held by the user while the user rotates in place, which may be referred to herein as a 'twirl.' Such a twirl will result in a recognizable sensed accelerometer information, which appear as a brief increase in acceleration (positive jerk), followed by a constant acceleration, followed by a deceleration (negative jerk). By way of example and not limitation, twirling may be viewed as if the user has created an environment for the device where gravity has been slightly elevated. The accelerometer values may increase above 1 g as the user is exerted an acceleration (via a change in direction), but then these elevated values may remain relatively constant.

In one embodiment, an accelerometer signature information may include a generalized set of accelerometer or other sensor data that represent movements undergone by the accelerometer. Such movements include but are not limited to: twirling, tossing (making airborne), catching, hitting, sustained movement, shaking and rest/freeze.

In the same vein as the twirling example above, the corresponding accelerometer signature information for a twirl may be a brief increase in acceleration (positive jerk), followed by a constant acceleration, followed by a deceleration. Graph 1650 shows an illustration of an exemplary accelerometer signature information for twirling of the accelerometer.

Various comparison blocks described herein detect movements of the device as part of a decision tree. In one embodiment, these decision trees are based on the following mechanism: a sensed accelerometer information may be compared to a list of accelerometer signature information in order to determine the movement undergone by the accelerometer.

By way of example and not limitation, we will examine the logic executed during twirl detection comparison blocks. A movement undergone by the accelerometer, such as spinning the device in the air, may be detected by an accelerometer and data output by the accelerometer as an accelerometer signature information. This accelerometer signature information may be compared to graph 1650 and the device may make the determination as to whether the user executed a twirl upon the device. If the determination results in a confirmed twirl, the device may, for example, play a sound or allow the user to pass a level, as described herein. if the determination results in a failed twirl, the device may compare the sensed accelerometer information to other accelerometer signature information in order to determine the movement underwent by the device. In general, during movement detection (such as decision trees and comparison blocks described in the associated figures), the device may compare the sensed accelerometer information to one or more accelerometer signature information in order to determine the movement underwent by the device.

FIG. 17: In-Air Detection

Figure 17B:
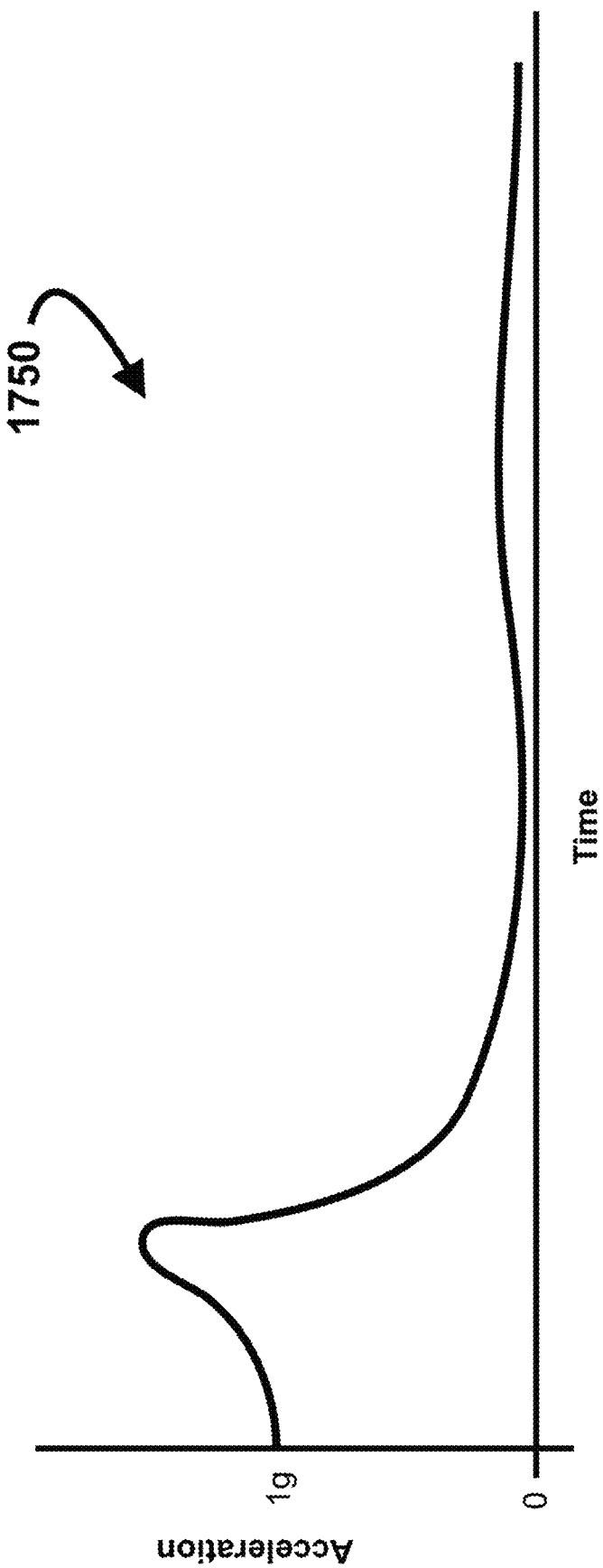
FIG. 17B illustrates a graph describing a mode of detection according to one or more embodiments of the invention.

FIGS. 17A and 17B show a flow chart and accelerometer signature associated with detection of an airborne state, according to embodiments of the invention. The steps in this method are illustrative only and do not necessarily need to be performed in the given order they are presented herein. Some steps may be omitted.

In one embodiment, games described herein may be played in which one way the user may interact with the device is to cause the device to become airborne, by way of example and not limitation, by throwing the device in the air or to a friend.

The method 1700 begins with a step 1704, in which an air timer is set to zero. At a step 1706, an acceleration check is performed to determine whether the acceleration of the device is less than a chosen value. In one embodiment, this chosen value is 0.2 g. If the check from 1706 results in no, at a step 1708, a determination is made that the device is not airborne and the method ends. If the check from 1706 results in a yes, at a step 1710, the air timer is started.

At a step 1712, a velocity check is performed to determine whether the acceleration of the device is less than a chosen value. In one embodiment, this chosen value is 0.2 g. At a step 1714, a check is performed to determine whether the air timer is greater than a chosen value. In one embodiment, this chosen value may be 0.1 seconds. If the check from step 1714 results in a 'yes,' at step 1716, the device determines that the device is indeed airborne and the method ends. If not, the method returns to step 1712.

FIG. 17B shows an accelerometer signature associated with the device being tossed, according to embodiments of the invention. Various comparison blocks described herein detect movements of the device as part of a decision tree to determine an airborne state. In one embodiment, these decision trees are based on the following mechanism: a sensed accelerometer information such as graph 1750 may be compared to a list of accelerometer signature information to determine the movement undergone by the accelerometer. In one embodiment, if the sensed accelerometer information matches accelerometer signature information for being tossed, the device may determine that the device has been tossed. In some embodiments, the accelerometer may read a constant '1 g' which represents the acceleration due to gravity. In other embodiments, the accelerometer may read a near-zero acceleration (approximately zero g), and if this reading is maintained for a predetermined amount of time, the device may determine that it is in air.

FIG. 18: Catch or Impact Detection

FIGS. 18A and 18B show a flow chart and accelerometer signature associated with detection of an caught state, according to embodiments of the invention. The steps in this method are illustrative only and do not necessarily need to be performed in the given order they are presented herein. Some steps may be omitted.

In one embodiment, games described herein may be played in which one way the user may interact with the device is to catch the device, by way of example and not limitation, after throwing the device in the air or to a friend.

The method 1800 begins at a step 1804, in which a self-looping determination is made comparing the acceleration of the device with that of gravity (1G or 9.8 (newtons*meters)/seconds$^2$). If this determination results in a fail, step 1804 self-loops until the determination results in a pass. Once passed, at a step 1806, a determination that the device has been caught is made.

FIG. 18B shows an accelerometer signature associated with the device being caught, according to embodiments of the invention. In one embodiment, a "light impact" may be more than 2 g with a slope greater than 2 g, and a "medium impact" may be more than 14 g.

Various comparison blocks described herein detect movements of the device as part of a decision tree to determine a caught or impact state. In one embodiment, these decision trees are based on the following mechanism: a sensed accelerometer information such as graph 1850 may be compared to a list of accelerometer signature information in order to determine the movement undergone by the accelerometer. In one embodiment, if the sensed accelerometer information matches accelerometer signature information for being tossed, the device may determine that the device has been caught or impacted has occurred. In one embodiment, accelerometer values may spike quickly (high values over a short period of time), then return to the resting state nearly as fast, thus delineating a catch or impact.

FIG. 19: Hit Detection

Figure 19B:
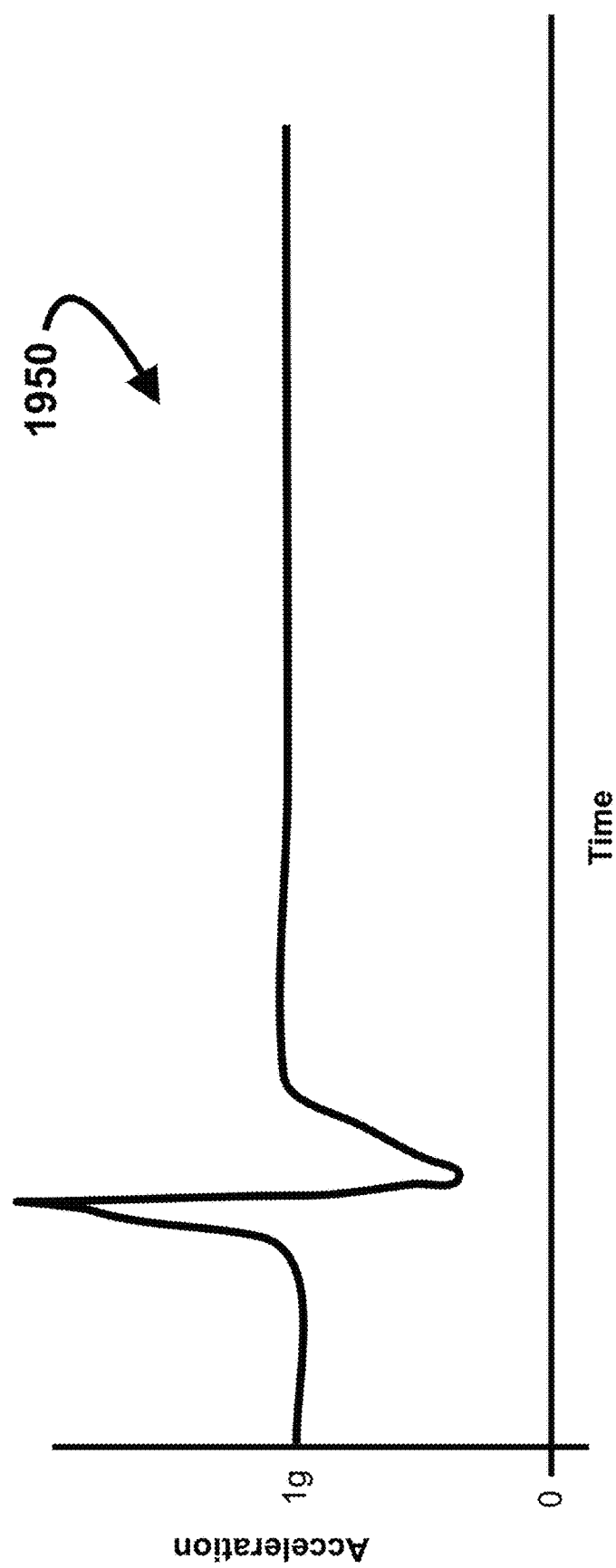
FIG. 19B illustrates a graph describing a mode of detection according to one or more embodiments of the invention.

FIGS. 19A and 19B show a flow chart and accelerometer signature associated with detection of a hit state, according to embodiments of the invention. The steps in this method are illustrative only and do not necessarily need to be performed in the given order they are presented herein. Some steps may be omitted.

In one embodiment, games described herein may be played in which one way the user may interact with the device is to catch the device, by way of an unlimited example, after throwing the device in the air or to a friend.

The method 1900 begins at a step 1906, in which a check is performed to determine whether the acceleration of the device is greater than a chosen value. In one embodiment, this chosen value is 2 g. If the acceleration of the device is less than the chosen value, at a step 1908, the device determines that the device has not been hit, and the method ends. If the acceleration of the device is less than the chosen value, at a step 1910 an impact timer is started. At a step 1912, a check is performed to determine whether the acceleration of the device is greater than a chosen value. In one embodiment, this chosen value is 2 g. If the check results in a yes, the method returns to step 1910. If the check from step 1912 results in a no, at a step 1914 a determination as to whether the impact timer is greater than a chosen value. In one embodiment, the chosen value is 1 second. If the check from step 1914 results in a no, at a step 1916, the device determines that the device has been hit and the method ends. If the check from step 1914 results in a no, at a step 1918, the device determines that the device has not been hit and the method ends.

FIG. 19B shows an accelerometer signature associated with the device being hit, according to embodiments of the invention. Various comparison blocks described herein detect movements of the device as part of a decision tree to determine an airborne state. In one embodiment, these decision trees are based on the following mechanism: a sensed accelerometer information such as graph 1950 may be compared to a list of accelerometer signature information in order to determine the movement undergone by the accelerometer. In one embodiment, if the sensed accelerometer information matches accelerometer signature information for being hit or struck, the device may determine that the device has been hit. In one embodiment, accelerometer values may spike quickly (high values over a short period of time), then return to the resting state nearly as fast, thus delineating a hit.

FIG. 20: Sustained Movement Detection

Figure 20A:
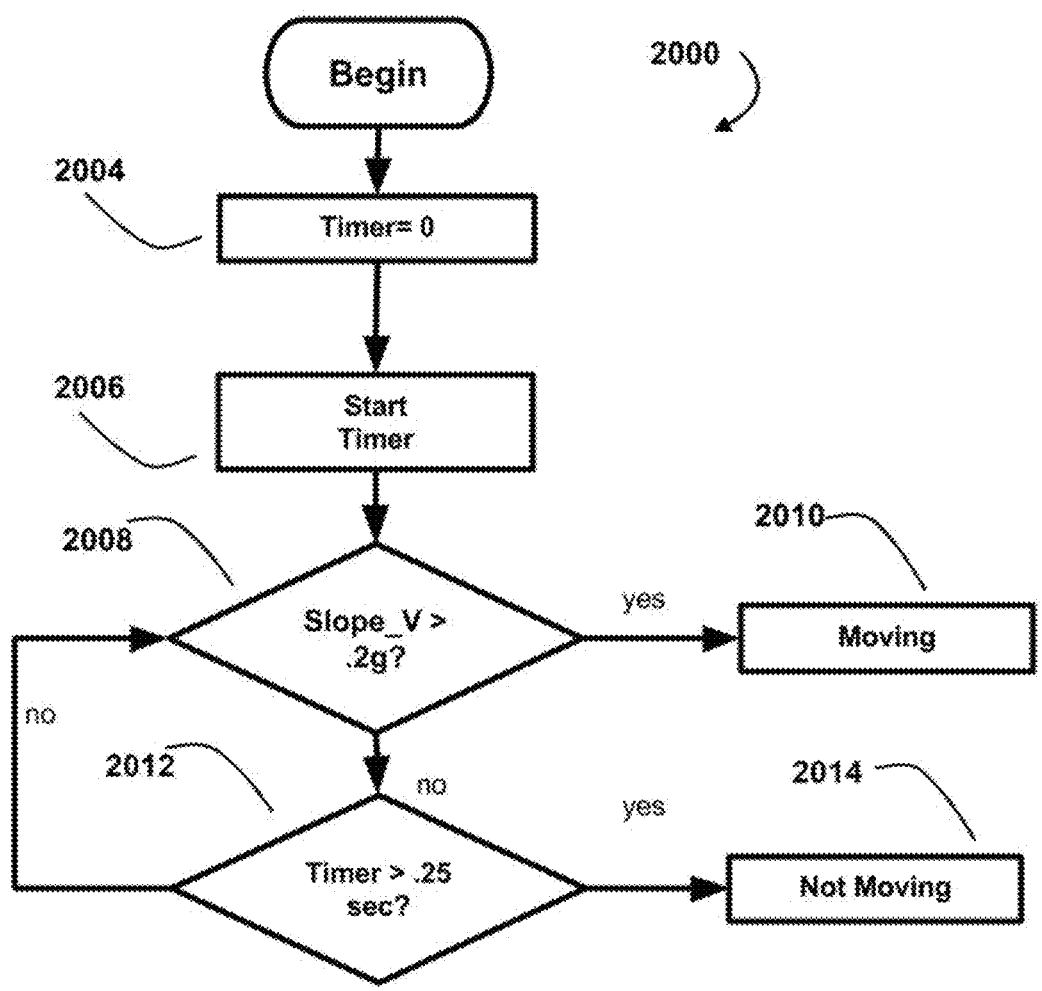
FIG. 20A illustrates a flowchart describing a mode of detection according to one or more embodiments of the invention.

FIGS. 20A and 20B show a flow chart and accelerometer signature associated with detection of a state of sustained movement, according to embodiments of the invention. The steps in this method are illustrative only and do not necessarily need to be performed in the given order they are presented herein. Some steps may be omitted.

In one embodiment, games described herein may be played in which one way the user may interact with the device is cause the device to undergo sustained movement, by way of example and not limitation, by throwing or rolling the device.

The method 2000 begins at a step 2004, in which a timer is set to zero. At a step 2006, the timer is started. At a step 2008, a check is performed as to whether the slope of acceleration is compared to a chosen value. In one embodiment, this chosen value is 0.2 g. It this check from step 2008 results in a yes, at a step 2010, the device determines that the device is undergoing sustained movement, and the method ends. If the check results in a no, at a step 2012, a check is made in which the timer is compared to a chosen value, say for example, 0.25 seconds. If the check from step 2012 results in no, the method returns to step 2008. If the check from step 2012 results in a yes, at a step 2014, the device determines that the device is not moving and the method ends.

FIG. 20B shows an accelerometer signature associated with sustained movement of the device, according to embodiments of the invention. In some embodiments, sustained motion is determined when a slope of the acceleration is greater than 0.1 g.

Various comparison blocks described herein detect movements of the device as part of a decision tree to determine a state of sustained movement. In one embodiment, these decision trees are based on the following mechanism: a sensed accelerometer information such as graph 2050 may be compared to a list of accelerometer signature information in order to determine the movement undergone by the accelerometer. In one embodiment, if the sensed accelerometer information matches accelerometer signature information for sustained movement, the device may determine that the device is undergoing sustained movement.

In one embodiment, movement may be determined by accelerometer readings shown as a large slope of acceleration (changes in acceleration). If the change of acceleration is beyond a predetermined time period (in some embodiments, this may be referred to as the moving threshold), then the device is most likely in motion. If there no large slopes over a period of time (the "movement threshold"), the device was most likely "resting" (or "frozen") for that time period.

FIG. 21: Rest Detection

FIGS. 21A and 21B show a flow chart and accelerometer signature associated with detection of a rest state, according to embodiments of the invention. Although the method steps are described in conjunction with FIGS. 1-23, persons skilled in the art will understand that any system configured to perform the method steps, in any order, falls within the scope of the present invention. The steps in this method are illustrative only and do not necessarily need to be performed in the given order they are presented herein. Some steps may be omitted completely.

In one embodiment, games described herein may be played in which one way the user may interact with the device is cause the device to come to rest, by way of example and not limitation, by throwing or rolling the device.

The method 2100 begins at a step 2104, in which a timer is set to zero. At a step 2106, a check is performed as to whether the slope of acceleration is compared to a chosen value. In one embodiment, this chosen value is 0.2 g. If the slope of acceleration is less than the chosen value, at a step 2108, the determination is made that the device is not resting. If slope of acceleration is greater than the chosen value, at a step 2110, a timer is started. At a step 2112, a check is performed as to whether the slope of acceleration is compared to a chosen value. In one embodiment, this chosen value is 0.2 g. If the check from step 2112 results in a yes, at a step 2108, the determination is made that the device is not resting. If the check from step 2112 results in a no, at a step 2114, a comparison is made between the timer and a chosen value, say 2 seconds. If the check from step 2114 results in a no, the method returns to step 2112. If the check form step 2114 results in a yes, at at a step 2116, the device determines that device is in a rest state.

FIG. 21B shows an accelerometer signature associated with the device in a rest state, according to embodiments of the invention. Various comparison blocks described herein detect movements of the device as part of a decision tree to determine a state of rest. In one embodiment, these decision trees are based on the following mechanism: a sensed accelerometer information such as graph 2150 may be compared to a list of accelerometer signature information in order to determine the movement undergone by the accelerometer. In one embodiment, if the sensed accelerometer information matches accelerometer signature information for rest, the device may determine that the device is at rest.

In one embodiment, if the accelerometer senses a near-zero acceleration, the output reading may be a constant 1 g (which represents the acceleration due to gravity). Thus if the accelerometer reads approximately 1 g, this may represent that the device is in a rest state and not a moving state. However, the term "moving" may be determined from multiple distinct accelerometer readings, which, in one embodiment, must be sorted from accelerometer readings from a rest state. Thus, a large slope of acceleration may represent motion of the device, and a lack of large slopes of acceleration may represent that the device is in a rest state. If the change of acceleration is beyond a predetermined time period (in some embodiments, this may be referred to as a moving threshold), then the device is most likely in motion. If there are few or no large slopes over a period of time (e.g., the abovementioned movement threshold), the device was most likely in a rest state for that time period.

FIG. 22: Shake Detection

Figure 22A:
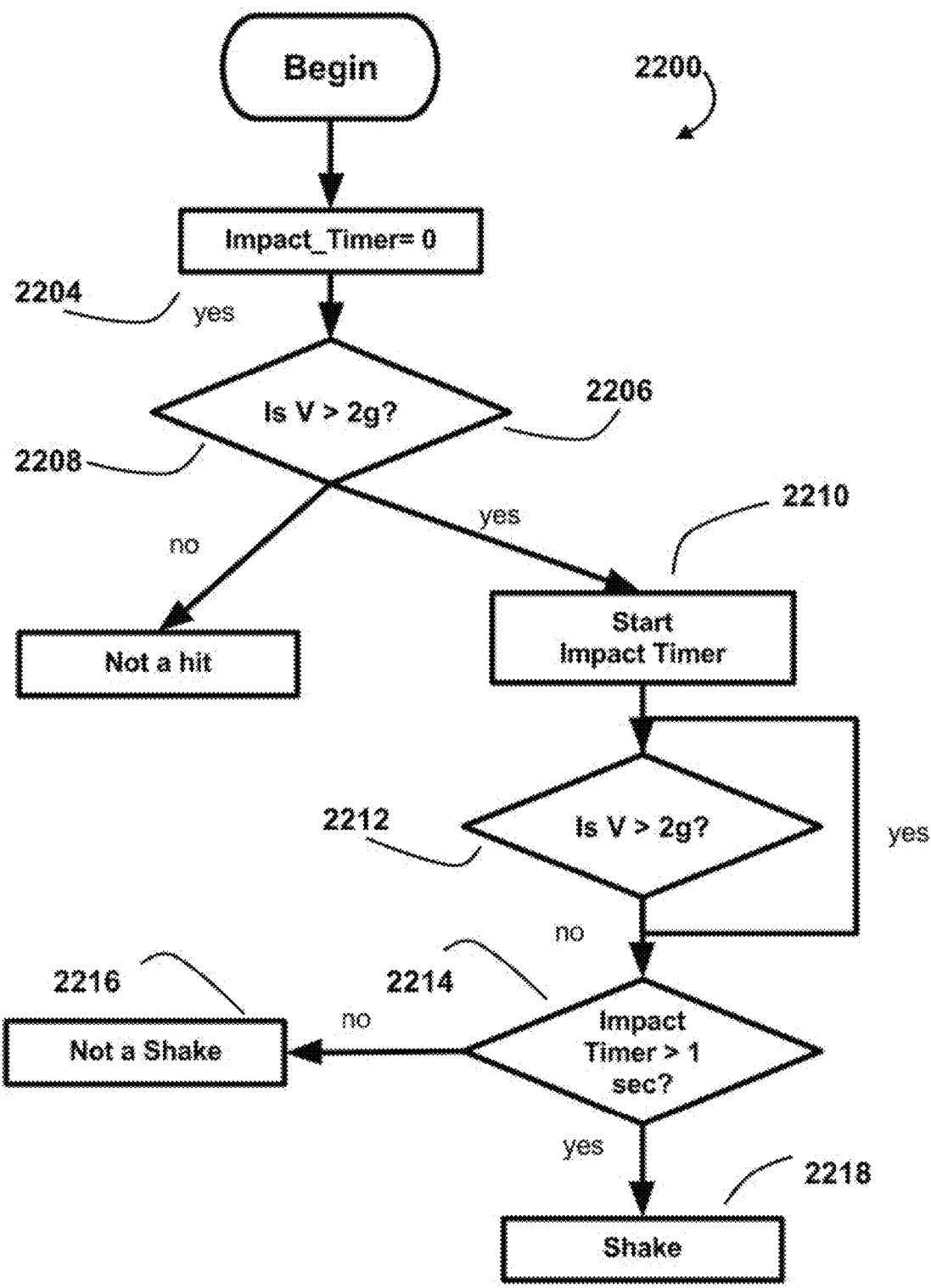
FIG. 22A illustrates a flowchart describing a mode of detection according to one or more embodiments of the invention.

FIGS. 22A and 22B show a flow chart and accelerometer signature associated with detection of being shaken, according to embodiments of the invention. The steps in this method are illustrative only and do not necessarily need to be performed in the given order they are presented herein. Some steps may be omitted.

The method 2200 begins at a step 2204, in which an impact timer is set to zero. At a step 2206, a check is performed in which acceleration is compared to a chosen value. In one embodiment, this chosen value is 2 g. If the check from step 2206 results in a no, at a step 2208, the device determines that it has not been shaken and the method ends. If the check from step 2206 results in a yes, at a step 2210, the impact timer is started. At a step 2212, a check is performed in which acceleration is compared to a chosen value. In one embodiment, this chosen value is 2 g. If the check from step 2212 results in a yes, the step self-loops. If the check from step 2212 results in a no, at a step 2214, a check is made as to whether the impact timer is greater than a chosen value. In one embodiment, this value is one second. If the check from step 2214 results in a no, at a step 2216 the device determines that the device has not been shaken and the method ends. If the check from step 2214 results in a yes, at a step 2218, the device determines that the device has been shaken and the method ends.

FIG. 22B shows an accelerometer signature associated with the device in a being shaken, according to embodiments of the invention. Various comparison blocks described herein detect movements of the device as part of a decision tree to determine being shaken. In one embodiment, these decision trees are based on the following mechanism: a sensed accelerometer information such as graph 2250 may be compared to a list of accelerometer signature information in order to determine the movement undergone by the accelerometer. In one embodiment, if the sensed accelerometer information matches accelerometer signature information for being shaken, the device may determine that the device is undergoing a shaking movement. In one embodiment, accelerometer values may spike and bottom out (e.g., decrease to zero) repeatedly. In this embodiment, accelerometer values may cross, but not remain at the 1 g resting threshold. Thus, a threshold may be set that states the number of spikes over a short period of time that determine a "shake." In some embodiments, associated accelerometer signature information can be used to differentiate a hit from a shake.

Figure 23:
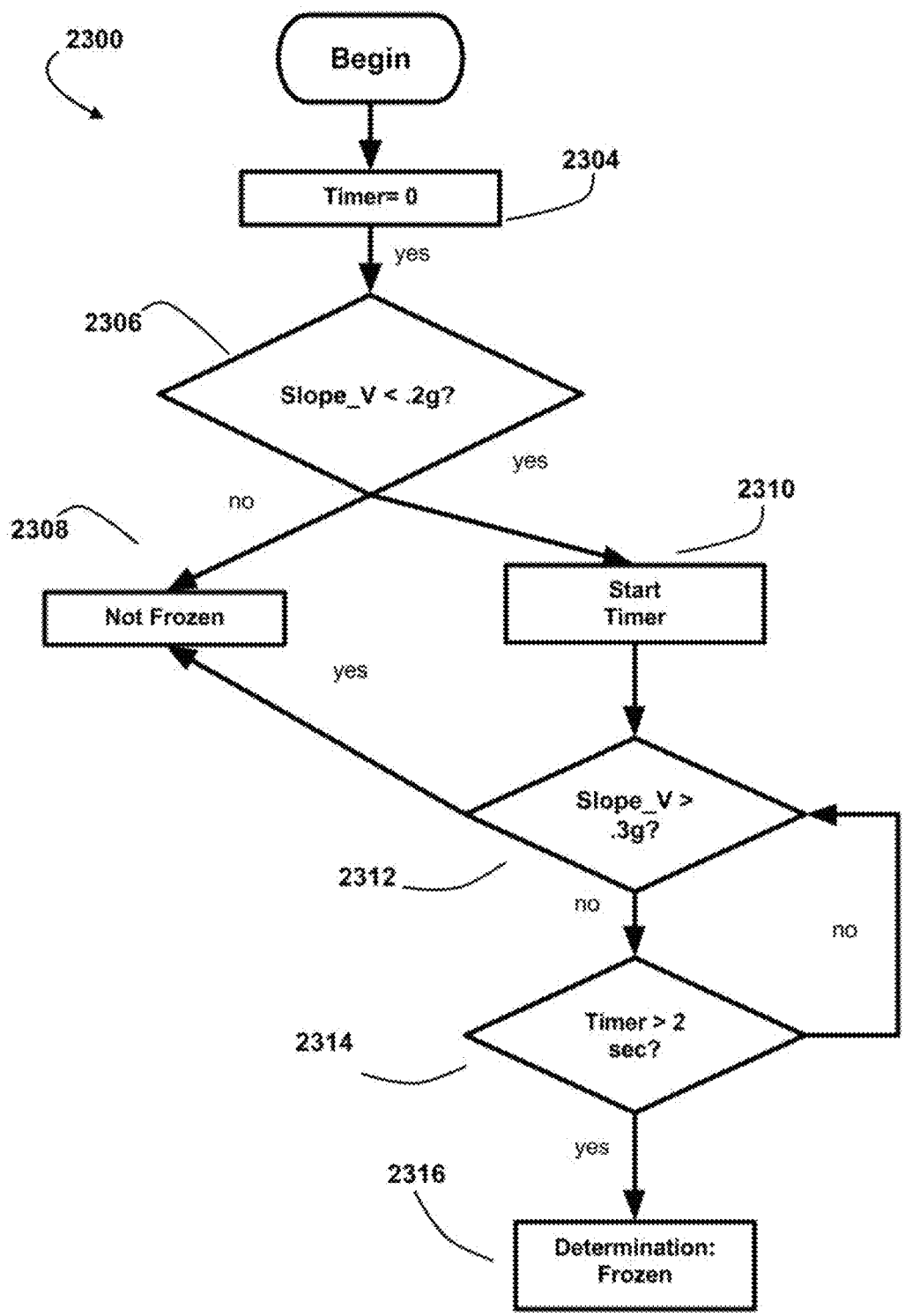
FIG. 23 illustrates a flowchart describing a mode of detection according to one or more embodiments of the invention.

FIG. 23: Freeze Detection

FIG. 23 shows a flow chart and accelerometer signature associated with detection of a frozen state, according to embodiments of the invention. The steps in this method are illustrative only and do not necessarily need to be performed in the given order they are presented herein. Some steps may be omitted.

The method 2300 begins at a step 2304, in which a timer is set to zero. At a step 2306, a check is performed as to whether the slope of acceleration is compared to a chosen value. In one embodiment, this chosen value is 0.2 g. If the slope of acceleration is less than the chosen value, at a step 2308, the device determines that the device is not frozen and the method ends. If the slope of acceleration is greater than the chosen value, at a step 2310, the timer is started. At a step 2312, the slope of acceleration is compared to a chosen value. In one embodiment, this chosen value is 0.3 g. If the check from step 2312 result in a yes, the method returns to step 2308 and device determines that the device is not frozen and the method ends. If the check from step 2312 result in a no, at a step 2314, a check is performed against the timer compared to a chosen value. In one embodiment, the chosen value is 2 seconds. If the check from step 2314 results in a no, the method returns to step 2312. If the check from step 2314 results in a yes, at a step 2316, the device determines that device is in a frozen state and the method ends.

In another embodiment, if the accelerometer senses a near-zero acceleration, the output reading may be a constant 1 g (which represents the acceleration due to gravity). Thus if the accelerometer reads approximately 1 g, this may represent that the device is in a frozen and not moving state. However, the term "moving" may be determined from multiple distinct accelerometer readings, which, in one embodiment, must be sorted from accelerometer readings from a frozen state. Thus, a large slope of acceleration may represent motion of the device, and a lack of large slopes of acceleration may represent that the device is in a frozen state. If the change of acceleration is beyond a predetermined time period (in some embodiments, this may be a moving threshold), then the device is most likely in motion. If there are few or no large slopes over a period of time (e.g., the abovementioned movement threshold), the device was most likely in a frozen state for that time period.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

We claim:

1. A device including:
   a processor;
   a speaker coupled to the processor;
   an accelerometer coupled to the processor;
   a non-transitory memory coupled to the processor, said memory including processor instructions directing the processor to perform a method comprising:
      detecting at least one of the following sensed accelerometer informations from the accelerometer:
         a shake sensed accelerometer information wherein the accelerometer detects one or more push accelerations of approximately two Gs over a duration of one second;
         a hit sensed accelerometer information wherein the accelerometer detects a strike acceleration of greater than two Gs and a rebound deceleration, wherein both strike acceleration and rebound deceleration occur within a duration of less than one second; or,
         an airborne sensed accelerometer information in which the accelerometer detects an aerial acceleration of one-fifth of one G for a duration of at least one-tenth of one second,
      comparing the sensed accelerometer information to a pre-determined accelerometer signature information,
      producing a sound output from the speaker based on the comparison of sensed accelerometer information to a pre-determined accelerometer signature information.

2. The method of claim 1 in which the predetermined accelerometer signature information is one of the following predetermined accelerometer signatures:
   a shake predetermined accelerometer signature wherein the accelerometer detects one or more push accelerations of approximately two Gs over a duration of one second;
   a hit predetermined accelerometer signature wherein the accelerometer detects a strike acceleration of greater than two Gs and a rebound deceleration, wherein both strike acceleration and rebound deceleration occur over a duration of less than one second; or,
   an airborne predetermined accelerometer signature in which the accelerometer detects an aerial acceleration of one-fifth of one G for a duration of at least one-tenth of one second.

3. The method of claim 1, in which the sound produced is one of the following:
   a shake sound;
   a hit sound; or,
   an airborne sound.

4. The method of claim 1 further including an electronic input, the electronic input operable to cause the processor to execute code related to a game.

5. The method of claim 1, in which the processor executes a timer function with a pre-determined amount of time, and if the predetermined amount of time expires before the sensed accelerometer information has been detected, the processor causes the device to enter into a low-power mode.

6. A method comprising:
   detecting a first sensed accelerometer information from an accelerometer connected to a device;
   comparing the first sensed accelerometer information to an in-air accelerometer signature information,
      wherein the in-air sensed accelerometer signature information indicates an airborne status of the device,
      wherein the in-air sensed accelerometer signature information includes an aerial acceleration of one-fifth of one G for a duration of at least one-tenth of one second;
   detecting an impact sensed accelerometer information from the accelerometer,
      wherein the impact sensed accelerometer information is one of: a light impact sensed accelerometer information or a medium impact sensed accelerometer information;
   comparing the impact sensed accelerometer information to a impact accelerometer signature information,
      wherein the impact accelerometer signature information is one of: a light impact accelerometer signature information or a medium impact accelerometer signature information;
   upon determining if both the first sensed accelerometer information approximates the in-air accelerometer signature information and the impact sensed accelerometer information approximates the impact accelerometer signature information,
   producing a sound output from the speaker based on the comparison of the impact sensed accelerometer information with the impact accelerometer signature information.

7. The method of claim 6,
   wherein the light impact sensed accelerometer information comprises a light impact acceleration of at least two Gs with a jerk greater than or equal to two Gs, and wherein the light impact acceleration is less than or equal to fourteen Gs, wherein the medium impact sensed accelerometer information comprises a medium impact acceleration of greater than fourteen Gs.

8. The method of claim 7,
wherein the sound output produced is either a congratulatory sound, an evocative sound or a vanquishment sound,
further including the steps of:
upon determining that the impact sensed accelerometer information detected approximates a light impact motion;
producing the congratulatory sound; and
upon determining that the impact sensed accelerometer information detected approximates a medium impact motion;
producing the vanquishment sound.

9. The method of claim 6, further including the steps of:
producing an evocative sound from the speaker wherein the evocative sound encourages a user to toss of the device;
initializing an in-air countdown timer to the first predetermined amount time;
detecting the in-air sensed accelerometer information from the accelerometer;
executing a premature comparison of the in-air sensed accelerometer information to the in-air accelerometer signature information before the expiration of the first predetermined amount of time on the in-air countdown timer has elapsed,
wherein the premature comparison can result in a success or failure;
executing a contemporaneous comparison of the in-air sensed accelerometer information to the in-air accelerometer signature information approximately upon the expiration of the first predetermined amount of time on the in-air countdown timer has elapsed
wherein the contemporaneous comparison can result in a success or failure; and,
executing a mature comparison of the in-air sensed accelerometer information to the in-air accelerometer signature information after the expiration of the first predetermined amount of time on the in-air countdown timer has elapsed,
wherein the mature comparison can result in success or failure.

10. The method of claim 9, further including the steps of
determining whether the contemporaneous comparison or the mature comparison results in success;
upon determining that either the contemporaneous comparison or the mature comparison results in success;
producing a congratulatory sound output from the speaker.

11. The method of claim 9, further including the steps of:
determining whether the contemporaneous comparison or the mature comparison results in failure; and,
upon determining that either the contemporaneous comparison or the mature comparison results in failure;
producing a vanquishment sound output from the speaker.

12. The method of claim 9, further including the steps of:
determining whether the premature comparison results in success; and,
upon determining that the premature comparison results in success;
producing the evocative sound output from the speaker.

13. A method comprising:
preparing a first command on a device connected to an accelerometer, wherein the first command is related to one of the following: a twirling motion, a tossing motion, a catching motion, a hitting motion, a sustained movement, an impact motion, a shaking motion or a motion of rest,
wherein the twirling motion is a twirling movement of a device around a user as the device is held by the user rotating approximately in place,
wherein the twirling motion includes an twirl positive jerk, a twirl acceleration, and a twirl negative jerk,
wherein the sustained movement includes a jerk of one-fifth of one G for a duration of one quarter of one second;
pushing the first command onto a stack;
producing a first sound output from a speaker encouraging a user to perform the first command;
detecting a first sensed accelerometer information from the accelerometer based on a first predetermined motion,
wherein the first sensed accelerometer information is related to twirling, tossing, catching, hitting, sustained movement, impact, shaking or resting,
wherein the first predetermined motion is related to one of the following: the twirling motion, the tossing motion, the catching motion, the hitting motion, the sustained movement, the impact motion, the shaking motion or the motion of rest;
comparing the first sensed accelerometer information to a first accelerometer signature information,
wherein the accelerometer signature information is related to one of the following: the twirling motion, the tossing motion, the catching motion, the hitting motion, the sustained movement, the impact motion, the shaking motion or the motion of rest; and
upon determining if the first sensed accelerometer information approximates the first accelerometer signature information,
preparing a second command, wherein the second command is be related to one of the following: the twirling motion, the tossing motion, the catching motion, the hitting motion, the sustained movement, the impact motion, the shaking motion or the motion of rest;
pushing the second command onto a stack;
producing a second sound output from the speaker encouraging a user to perform the first command.

14. The method of claim 13, wherein preparation of the first command is user-selectable.

* * * * *